United States Patent
McGehee et al.

(10) Patent No.: US 7,681,610 B2
(45) Date of Patent: Mar. 23, 2010

(54) OPTIMIZED PLANERMILL SYSTEM AND METHOD

(75) Inventors: Ronald W. McGehee, Ukiah, CA (US); Patrick Doyle, Ukiah, CA (US)

(73) Assignee: USNR/Kockums Cancar Company, Vancouver, WA (US)

( * ) Notice: Subject to any disclaimer, the term of this patent is extended or adjusted under 35 U.S.C. 154(b) by 325 days.

(21) Appl. No.: 10/552,873

(22) PCT Filed: Apr. 16, 2004

(86) PCT No.: PCT/CA2004/000574
§ 371 (c)(1),
(2), (4) Date: Jun. 1, 2007

(87) PCT Pub. No.: WO2005/113206
PCT Pub. Date: Dec. 1, 2005

(65) Prior Publication Data
US 2007/0267104 A1    Nov. 22, 2007

(51) Int. Cl.
*B23Q 16/00* (2006.01)
(52) U.S. Cl. .................... 144/394; 144/39; 144/2.1; 144/1.1; 144/245.1; 144/404

(58) Field of Classification Search .................. 144/1.1, 144/2.1, 3.1, 39, 114.1, 117.1, 245.1, 246.1, 144/248, 250.17, 382, 394, 404, 392, 402; 82/425; 198/456, 459.1
See application file for complete search history.

(56) References Cited

U.S. PATENT DOCUMENTS

| 4,879,659 | A | * | 11/1989 | Bowlin et al. | 700/167 |
| 5,765,617 | A | * | 6/1998 | Mierau et al. | 144/387 |
| 5,884,682 | A | * | 3/1999 | Kennedy et al. | 144/357 |
| 7,490,641 | B2 | * | 2/2009 | McGehee et al. | 144/117.1 |
| 2007/0102063 | A1 | * | 5/2007 | McGehee et al. | 144/373 |

* cited by examiner

*Primary Examiner*—Shelley Self
(74) *Attorney, Agent, or Firm*—Schwabe, Williamson & Wyatt, P.C.

(57) ABSTRACT

An optimizing planermill system includes a control system and a workpiece feed path for feeding an array of workpieces linearly downstream to an optimizing planer. The gap size between successive workpieces is set so that each gap provides enough time for relative movement of at least one of movable cutting elements in the planer and movable guiding elements so as to obtain relative movement between the cutting elements and the workpiece being next fed in for optimized positioning.

20 Claims, 55 Drawing Sheets

CONVENTIONAL PLANERMILL SYSTEM

SIMPLIFIED EXAMPLE OF FULLY OPTIMIZED GAP CONTROL

LUG TRANSFER DEVICE FEEDING WORKPIECES
WITH A LINEAR ACCELERATION DEVICE

LUG LOADER TYPE DEVICE SHEET FEEDER

SHEET FEEDER

SHEET FED TRANSVERSE ACCELERATION DEVICE COMBINED WITH
VERTICAL ACCELERATION DEVICE AND LINEAR ACCELERATION DEVICE

ALTERNATE SHEET FED VERTICAL ACCELERATION

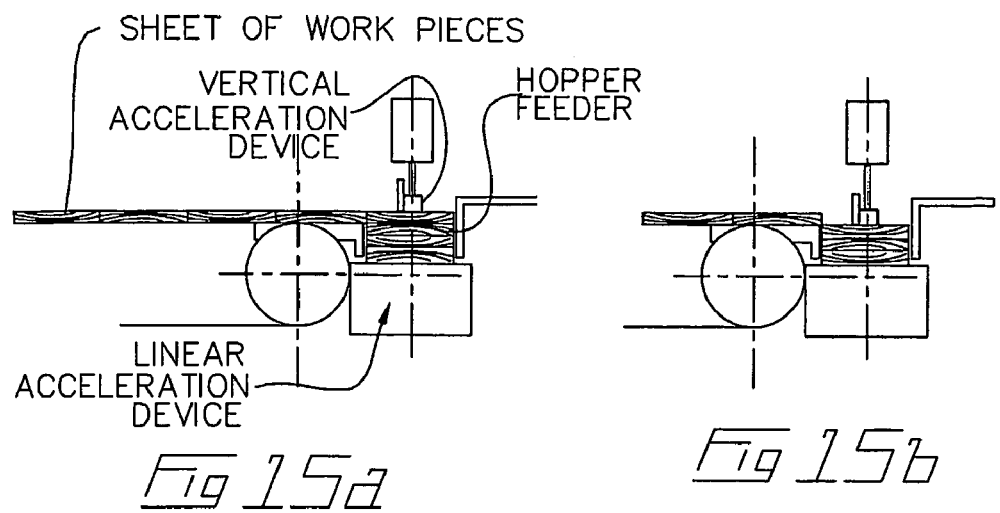
Fig 15a
Fig 15b
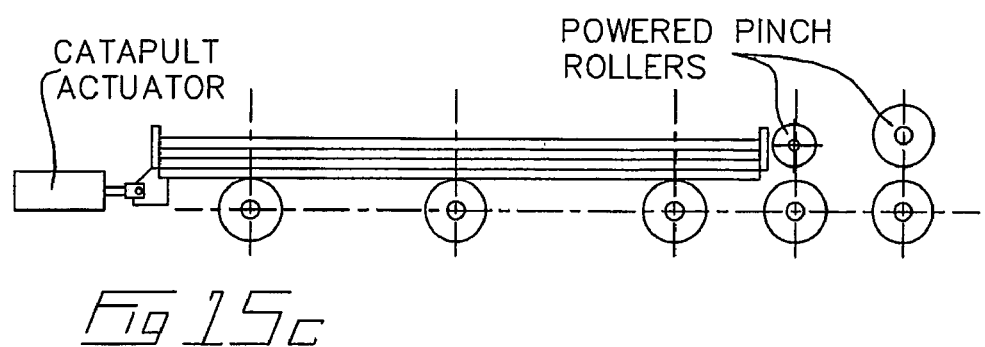
Fig 15c
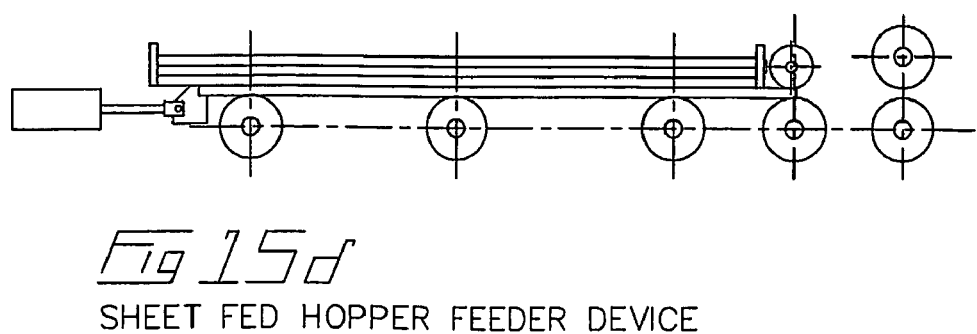
Fig 15d
SHEET FED HOPPER FEEDER DEVICE

SHEET FED VERTICAL ACCELERATION DEVICE

TRANSVERSE ACCELERATION DEVICE
FEEDING LINEAR ACCELERATION DEVICE

TRANSVERSE ACCELERATION DEVICE
FEEDING LINEAR ACCELERATION DEVICE

TRANSVERSE ACCELERATION DEVICE
SLIDER CRANK TYPE

TRANSVERSE ACCELERATION DEVICE

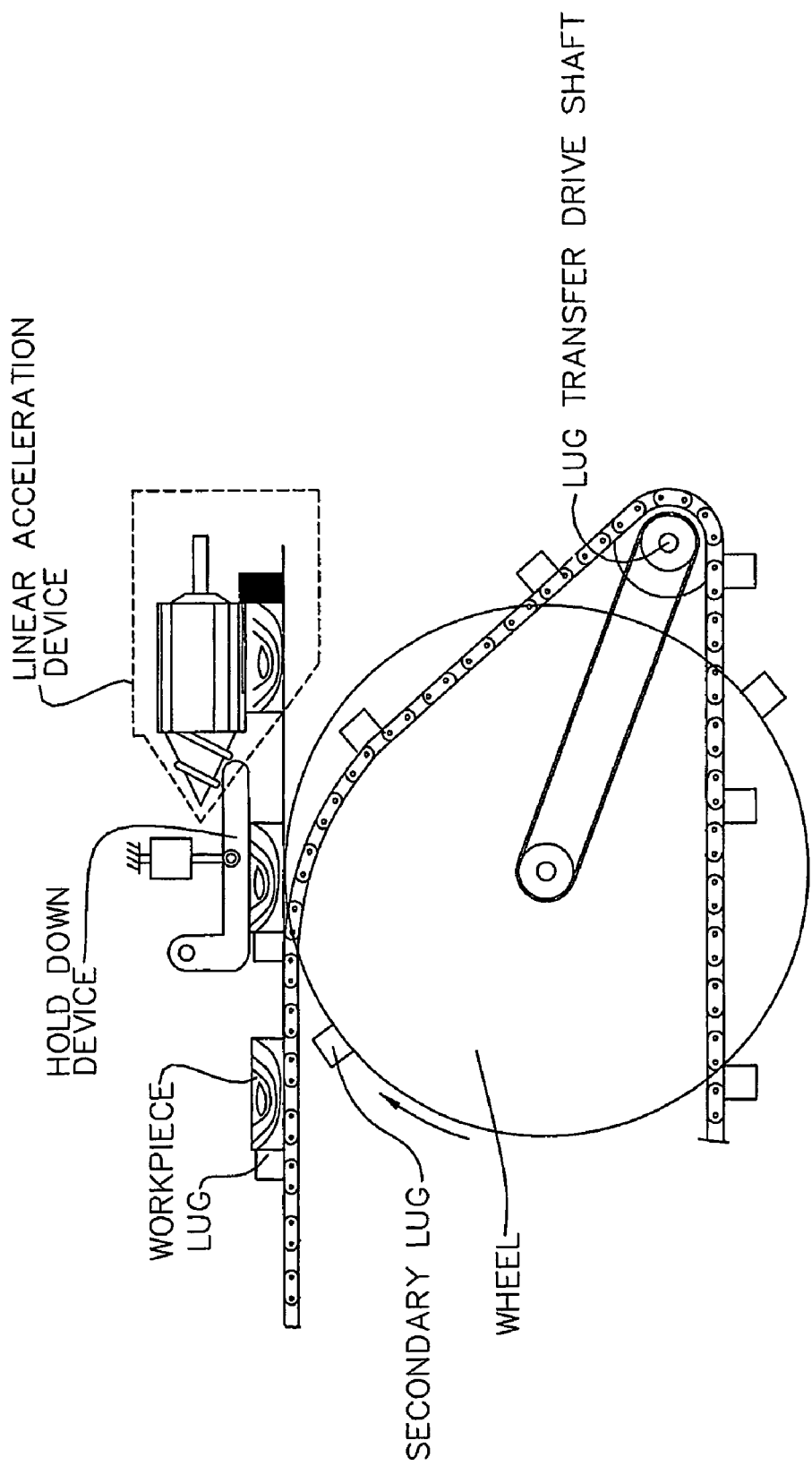

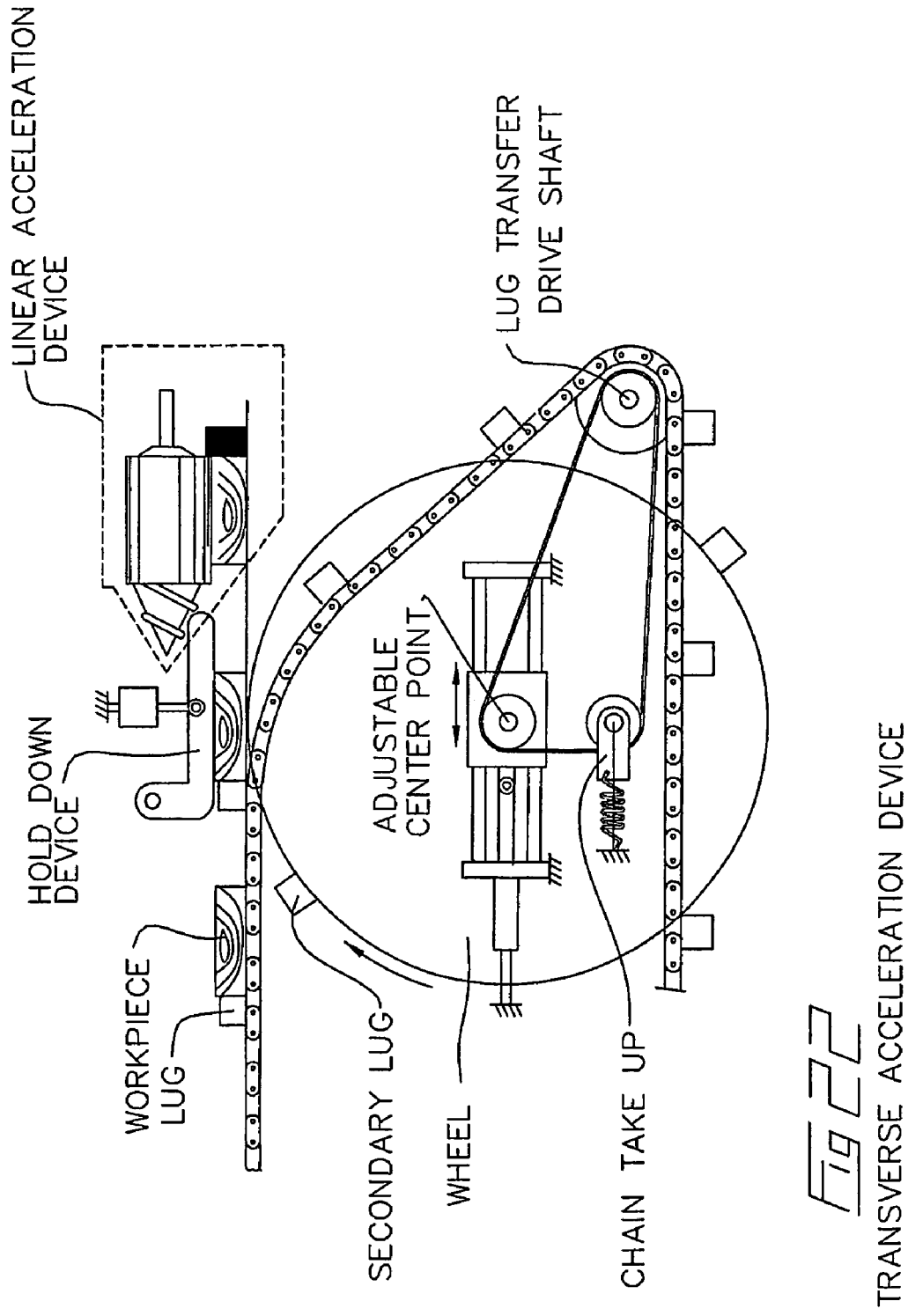
Fig 22 TRANSVERSE ACCELERATION DEVICE

CONTINUOUS INDEXIBLE SUPPORT ARM
VERTICAL ACCELERATION DEVICE

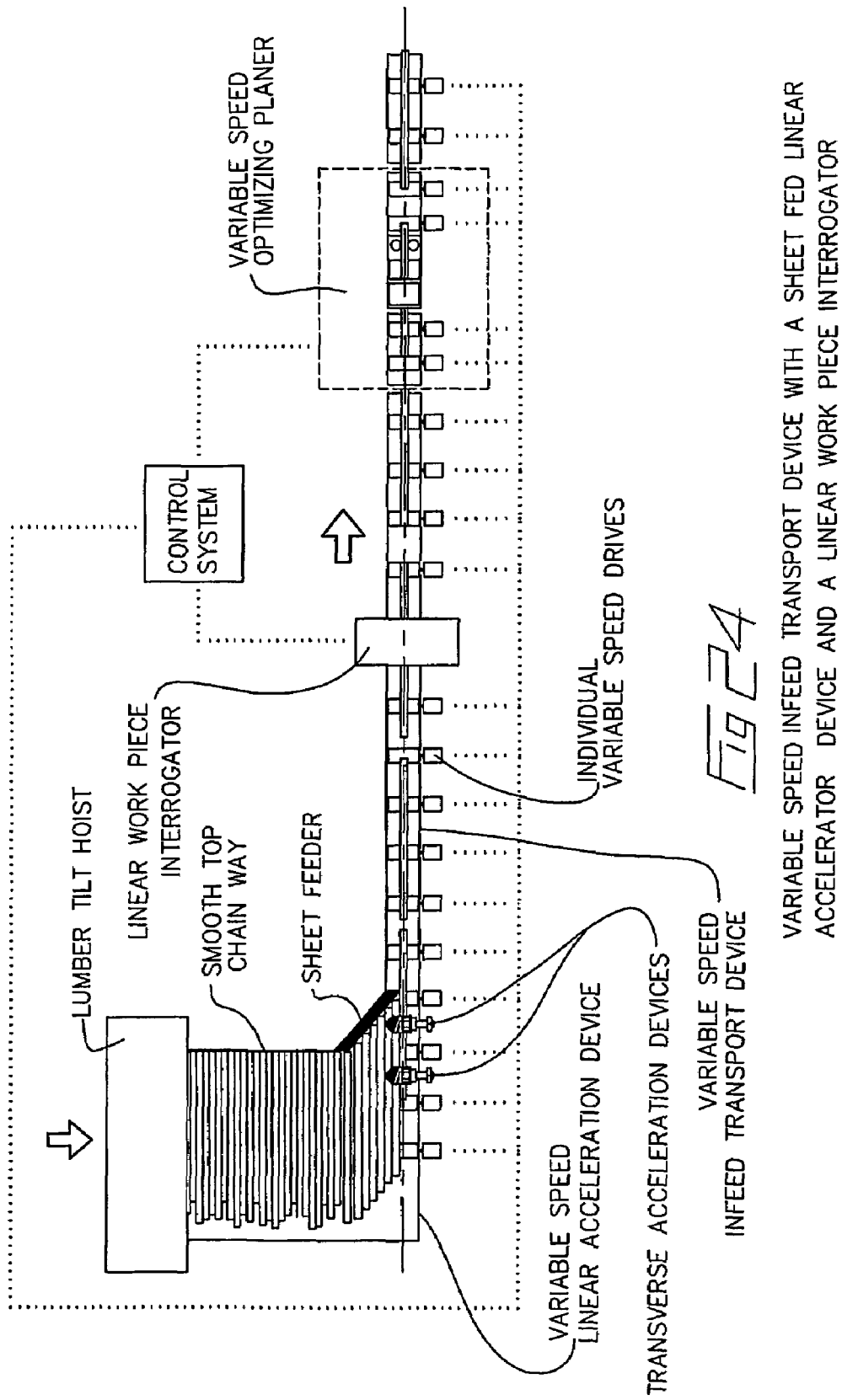

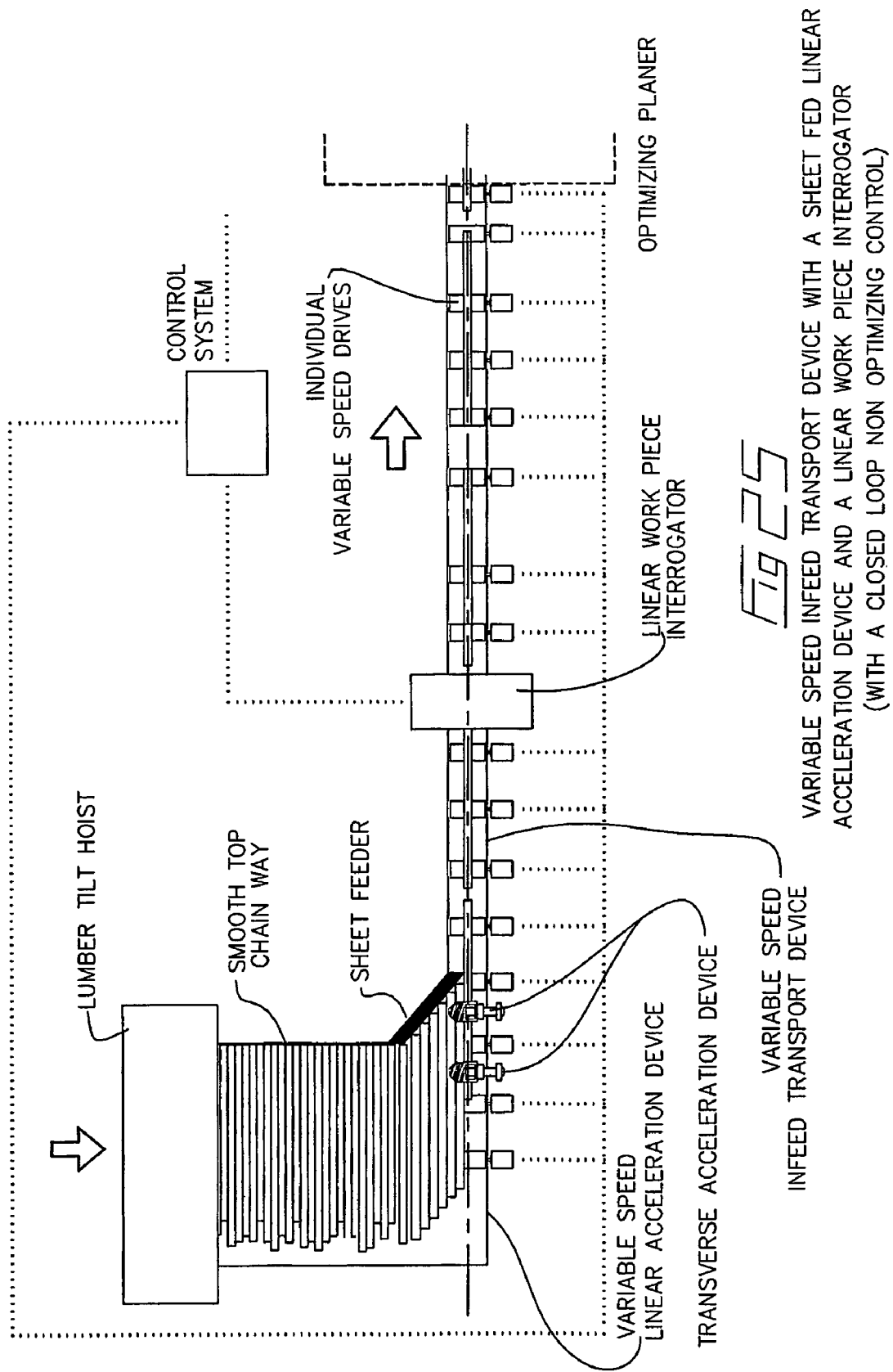

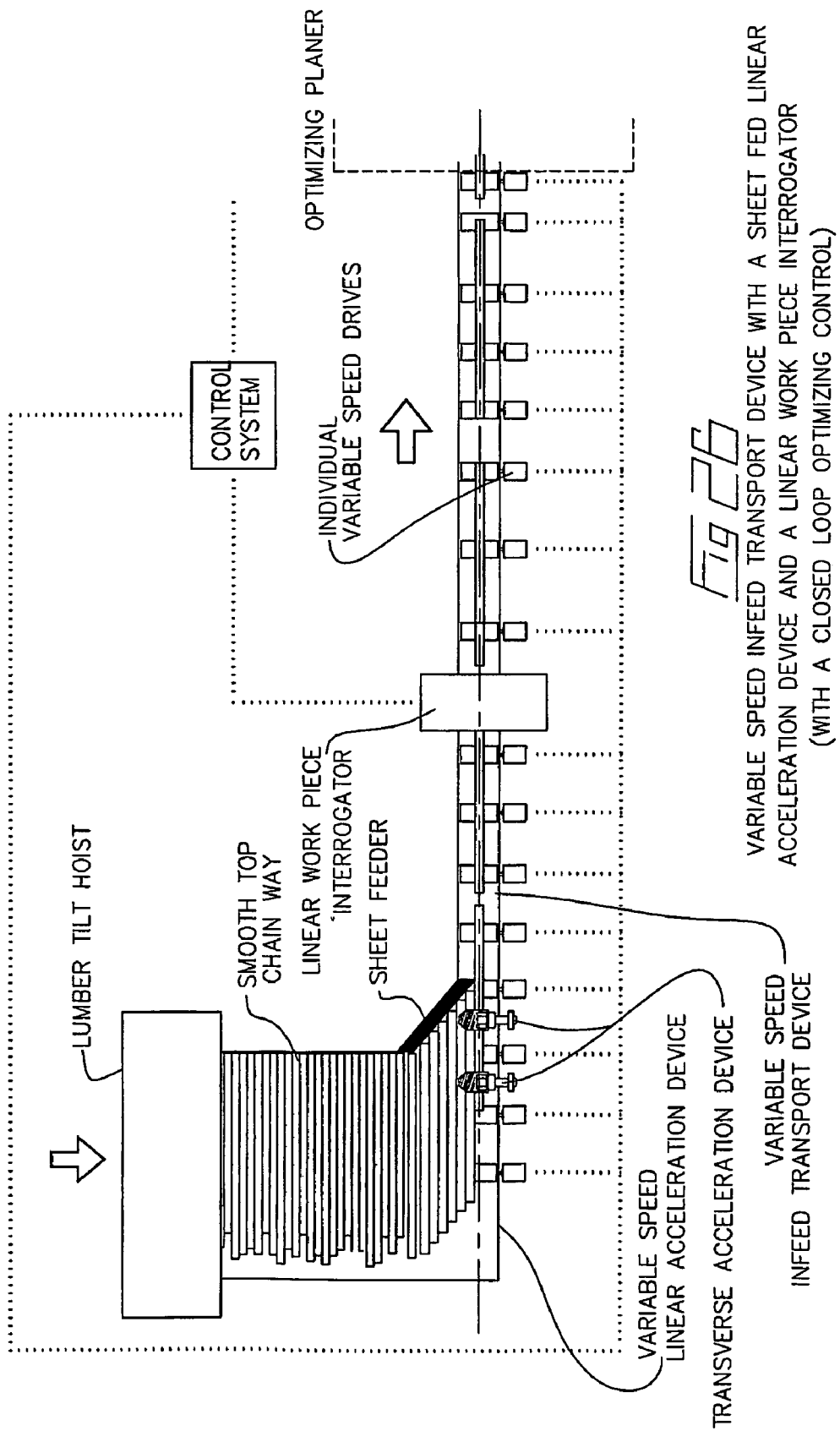

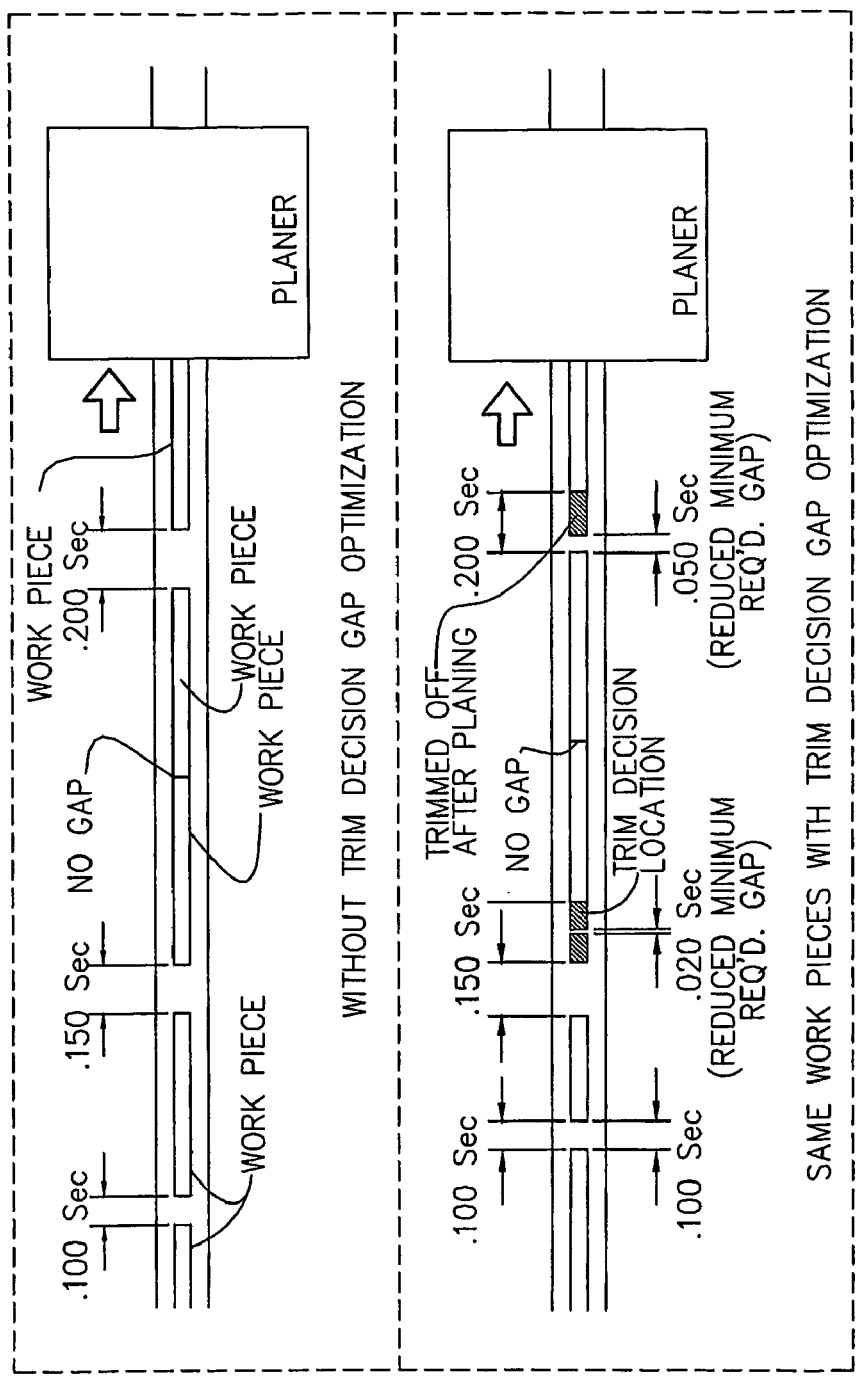

| | A | B | C | D | E | F | G | H | I | J | K | L | M | N | O | P | Q | R |
|---|---|---|---|---|---|---|---|---|---|---|---|---|---|---|---|---|---|---|
| | SHEET FEEDER | FIXED SPEED LUG TRANSFER | VARIABLE SPEED LUG TRANSFER | FIXED SPEED TAD | VARIABLE SPEED TAD | VERTICAL AD | FIXED SPEED LAD | VARIABLE SPEED LAD | FIXED SPEED ITD | VARIABLE SPEED ITD | FIXED SPEED PLANER | VARIABLE SPEED PLANER | LINEAR WPI | TRANSVERSE WPI | WPS | OLNO | CLNO | CLO |
| 1 | X | | | | | | X | | X | X | | | X | | | X | | |
| 2 | X | | | | | | X | | | X | X | | X | | X | | X | |
| 3 | X | | | | | | X | | | X | X | | X | | X | | | X |
| 4 | X | | | | | | X | | | X | | X | X | | X | | X | |
| 5 | X | | | | | | X | | | X | | X | X | | X | | | X |
| 6 | X | | | | | | | X | X | | X | | X | | X | | X | |
| 7 | X | | | | | | | X | X | | X | | X | | X | | | X |
| 8 | X | | | | | | | X | X | | | X | X | | X | | X | |
| 9 | X | | | | | | | X | X | | | X | X | | X | | | X |
| 10 | X | | | | | | | X | | X | X | | X | | X | | X | |
| 11 | X | | | | | | | X | | X | X | | X | | X | | | X |
| 12 | X | | | | | | | X | | X | | X | X | | X | | X | |
| 13 | X | | | | | | | X | | X | | X | X | | X | | | X |
| 14 | X | | | | | X | X | X | | X | | | X | | X | | | |
| 15 | X | | | | | X | X | | | X | X | | X | | X | | X | |
| 16 | X | | | | | X | X | | | X | X | | X | | X | | | X |
| 17 | X | | | | | X | X | | | X | | X | X | | X | | X | |
| 18 | X | | | | | X | X | | | X | | X | X | | X | | | X |
| 19 | X | | | | | X | | X | X | | X | | X | | X | | X | |
| 20 | X | | | | | X | | X | X | | X | | X | | X | | | X |
| 21 | X | | | | | X | | X | | X | X | | X | | X | | X | |
| 22 | X | | | | | X | | X | | X | X | | X | | X | | | X |
| 23 | X | X | | | | | X | | X | | X | | | X | | X | | |
| 24 | X | X | | | | | X | | | X | X | | | X | X | | X | |
| 25 | X | X | | | | | X | | | X | X | | X | X | X | | X | |
| 26 | X | X | | | | | X | | | X | | X | | X | X | | X | |
| 27 | X | X | | | | | X | | | X | | X | X | X | X | | | |
| 28 | X | X | | | | | X | | | X | | | | X | X | X | | |
| 29 | | X | | | | | X | | X | X | | | | X | X | X | | |
| 30 | | X | | X | | | X | | X | X | | | | X | X | X | | |
| 31 | | X | | X | | | X | | | X | | | | X | X | X | | |
| 32 | | X | | | | | X | | | X | X | | | X | X | | X | |
| 33 | | X | | X | | | X | | | X | X | | | X | X | | X | |
| 34 | | | X | | | | X | | | X | | | | X | X | | X | |
| 35 | | | X | | | | X | | | X | | | | X | X | | | X |
| 36 | | | X | X | | | X | | | X | | | | X | X | | X | |
| 37 | | | X | X | | | X | | | X | | | | X | X | | | X |
| 38 | | | X | | X | | X | | | X | | | | X | X | | X | |
| 39 | | | X | | X | | X | | | X | | | | X | X | | | X |
| 40 | | | X | | | | X | | X | X | | | | X | X | | X | |
| 41 | | | X | | | | X | | X | X | | | | X | X | | | X |
| 42 | | | X | | | | X | | | X | X | | | X | X | | X | |
| 43 | | | X | | | | X | | | X | X | | | X | X | | | X |
| 44 | | | X | | | | X | | | X | | X | | X | X | | X | |

Fig 28

CONTINUATION OF Fig 2B

| | A SHEET FEEDER | B FIXED SPEED LUG TRANSFER | C VARIABLE SPEED LUG TRANSFER | D FIXED SPEED TAD | E VARIABLE SPEED TAD | F VERTICAL AD | G FIXED SPEED LAD | H VARIABLE SPEED LAD | I FIXED SPEED ITD | J VARIABLE SPEED ITD | K FIXED SPEED PLANER | L VARIABLE SPEED PLANER | M LINEAR WPI | N TRANSVERSE WPI | O WPS | P OLNO | Q CLNO | R CLO |
|---|---|---|---|---|---|---|---|---|---|---|---|---|---|---|---|---|---|---|
| 45 | | | X | | | | X | | X | | X | | | X | X | | | X |
| 46 | | | X | X | | | X | X | | X | | | | X | X | | X | |
| 47 | | | X | X | | | X | X | | X | | | | X | X | | | X |
| 48 | | | X | X | | | X | | X | X | | | | X | X | | X | |
| 49 | | | X | X | | | X | | X | X | | | | X | X | | | X |
| 50 | | | X | X | | | X | | | X | | X | | X | X | | X | |
| 51 | | | X | X | | | X | | | X | | X | | X | X | | | X |
| 52 | | | X | | X | | X | X | | X | | | | X | X | | X | |
| 53 | | | X | | X | | X | | X | X | | | | X | X | | | X |
| 54 | | | X | | X | | X | X | | X | | | | X | X | | X | |
| 55 | | | X | | X | | X | X | | X | | | | X | X | | | X |
| 56 | | | X | | X | | X | | X | X | | | | X | X | | X | X |
| 57 | | | X | | X | | X | | X | X | | | | X | X | | | X |
| 58 | | | X | | X | | X | | | X | | X | | X | X | | X | |
| 59 | | | X | | X | | X | | | X | | X | | X | X | | | X |
| 60 | | X | | | | X | X | | | X | | | | X | | X | | |
| 61 | | X | | | | X | X | | X | X | | | | X | | X | | |
| 62 | | X | | | | X | X | | | X | X | | | X | X | | X | |
| 63 | | X | | | | X | X | | X | X | X | | | X | X | | | |
| 64 | | X | | | | X | X | | X | X | | | | X | X | | | X |
| 65 | | X | | | | X | X | | X | X | | X | | X | X | | X | |
| 66 | | X | | | | X | X | | X | X | | X | | X | X | | | X |
| 67 | | X | | | | X | X | | | X | | | | X | X | | X | |
| 68 | | X | | | | X | X | | | X | | | | X | X | | | X |
| 69 | | X | | | | X | X | | X | X | | | | X | X | | X | |
| 70 | | X | | | | X | X | | X | X | | | | X | X | | | X |
| 71 | | X | | | | X | | X | X | X | | | | X | X | | X | |
| 72 | | X | | | | X | | X | X | X | | | | X | X | | | X |
| 73 | | X | | | | X | | X | | X | X | | | X | X | | X | |
| 74 | | X | | | | X | | X | | X | X | | | X | X | | | X |
| 75 | | X | | | | X | | X | X | X | | X | | X | X | | X | |
| 76 | | X | | | | X | | X | X | X | | X | | X | X | | | X |
| 77 | | X | | | | X | X | | | X | | X | | X | X | | X | |
| 78 | | X | | | | X | X | | | X | | X | | X | X | | | X |
| 79 | | X | | | | | X | | X | | | X | | X | X | | X | |
| 80 | | X | | | | | X | | X | | | X | | X | X | | | X |
| 81 | | X | | | | | X | X | | X | X | | | X | X | | X | |
| 82 | | X | | | | | X | X | | X | X | | | X | X | | | X |
| 83 | | X | X | | | | X | | X | | X | | X | | X | | X | |
| 84 | | X | X | | | | X | | | X | X | | X | | X | | | X |
| 85 | | X | X | | | | X | | | X | X | | X | | X | | X | |
| 86 | | X | | X | | | X | | | X | X | | X | | X | | X | |
| 87 | | X | | X | | | X | | | X | | | X | | X | | | X |
| 88 | | | | X | | | X | | X | | X | | X | | X | | | X |

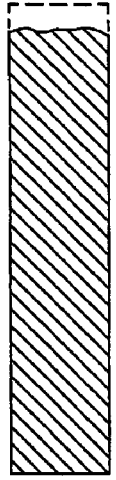
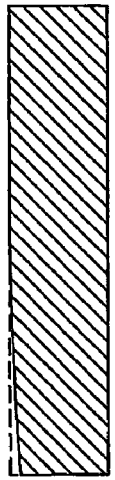
UNDER WIDTH
CUPPED
WEDGED
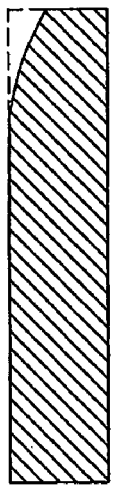
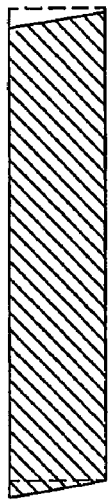
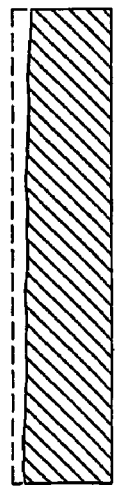
WANE
OUT OF SQUARE
SAW LINE MISMATCH
UNDER THICKNESS
Fig 24
TYPICAL CROSS-SECTIONAL DEFECTS
(AS FOUND ON ROUGH WORK PIECES FEEDING A PLANER)

NON-OPTIMIZED PLANING OF A WORK PIECE

NON-OPTIMIZED PLANING OF A WORK PIECE

NON—OPTIMIZED PLANING OF A WORK PIECE

NON—OPTIMIZED PLANING OF A WORK PIECE

OPTIMIZED PLANING OF A WORK PIECE

OPTIMIZED PLANING OF A WORK PIECE

OPTIMIZED PLANING OF A WORK PIECE

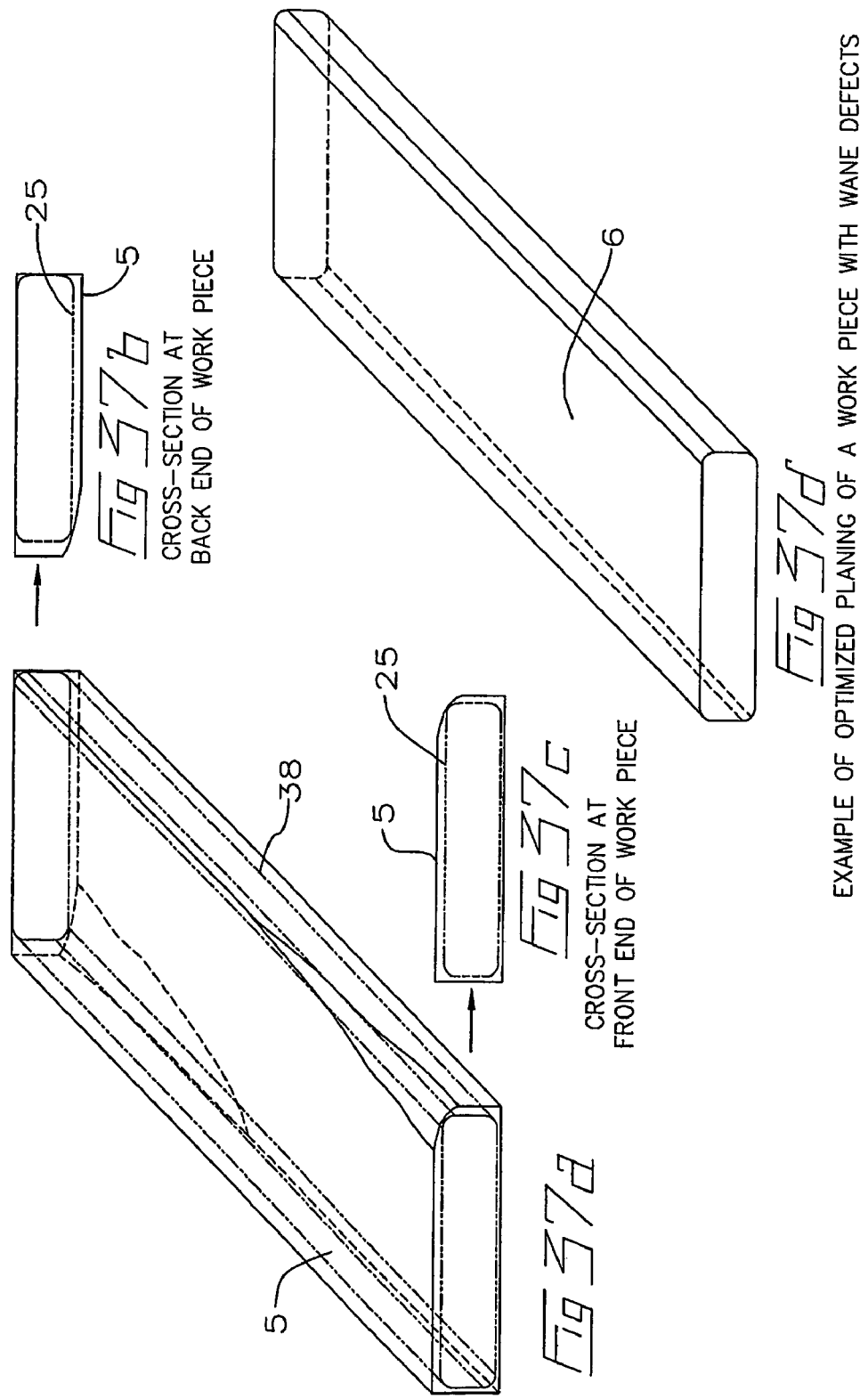

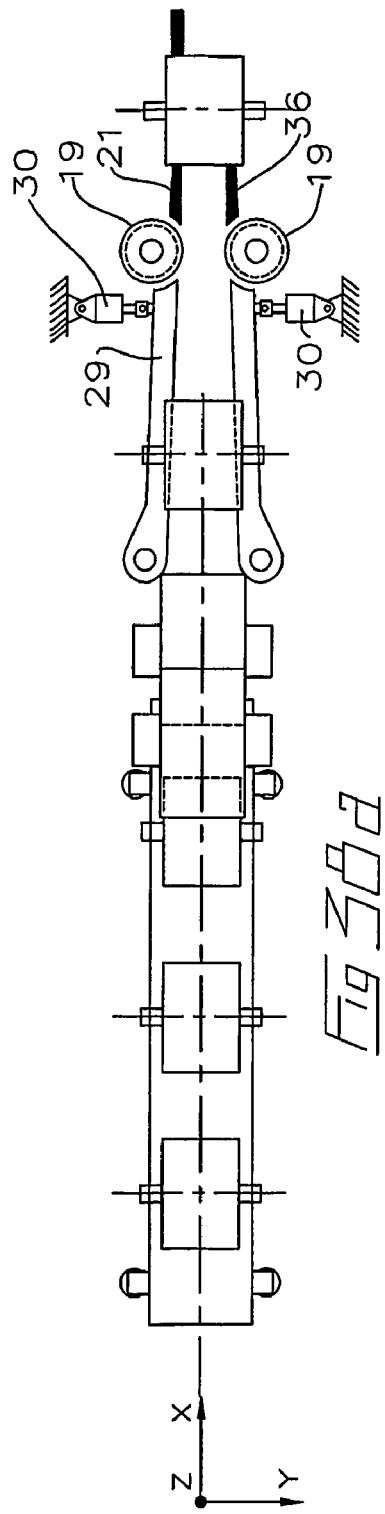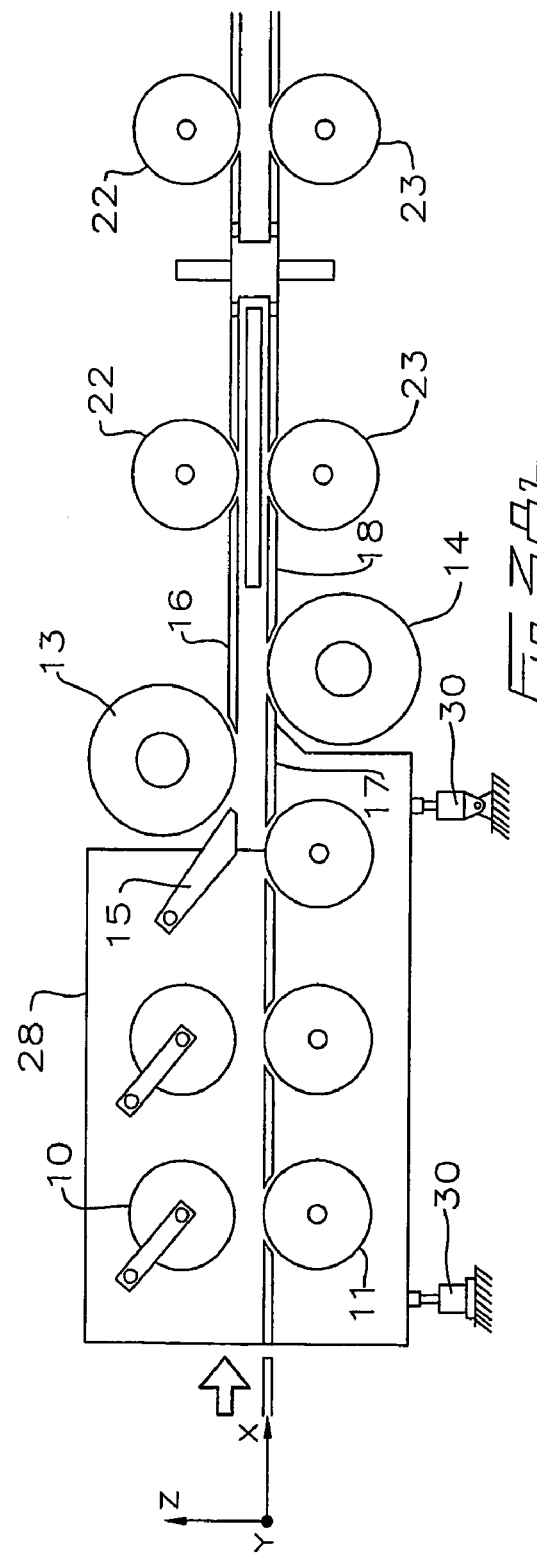
Fig 38a
Fig 38b
OPTIMIZING PLANER-THREE AXIS INFEED POSITIONING MODULE WITH INTERMEDIATE SIDE HEAD STEERING

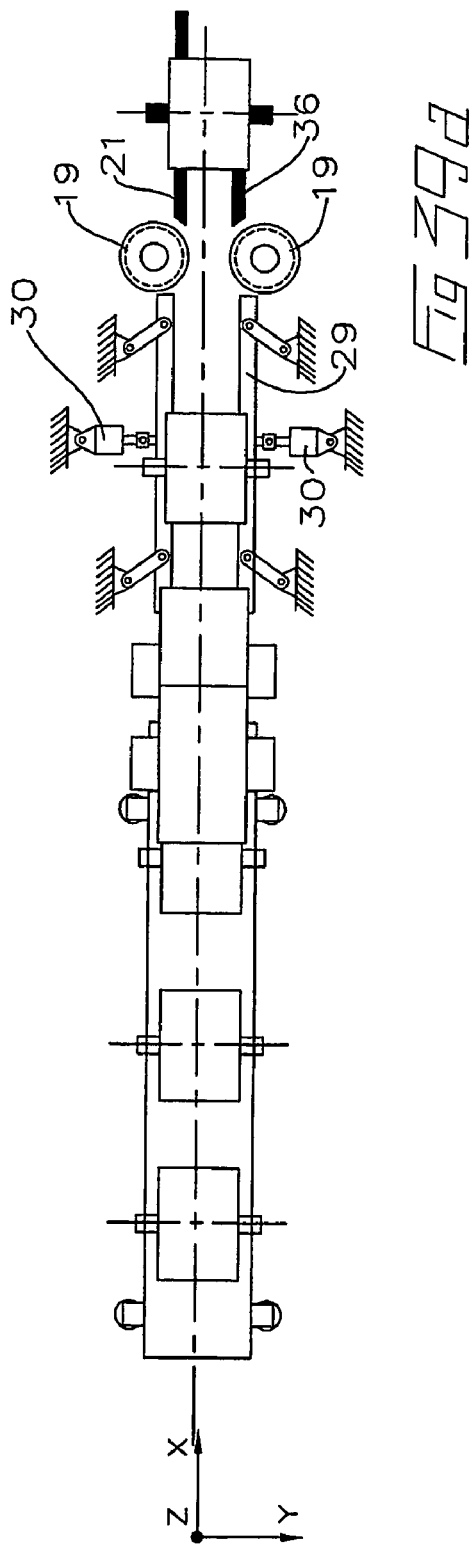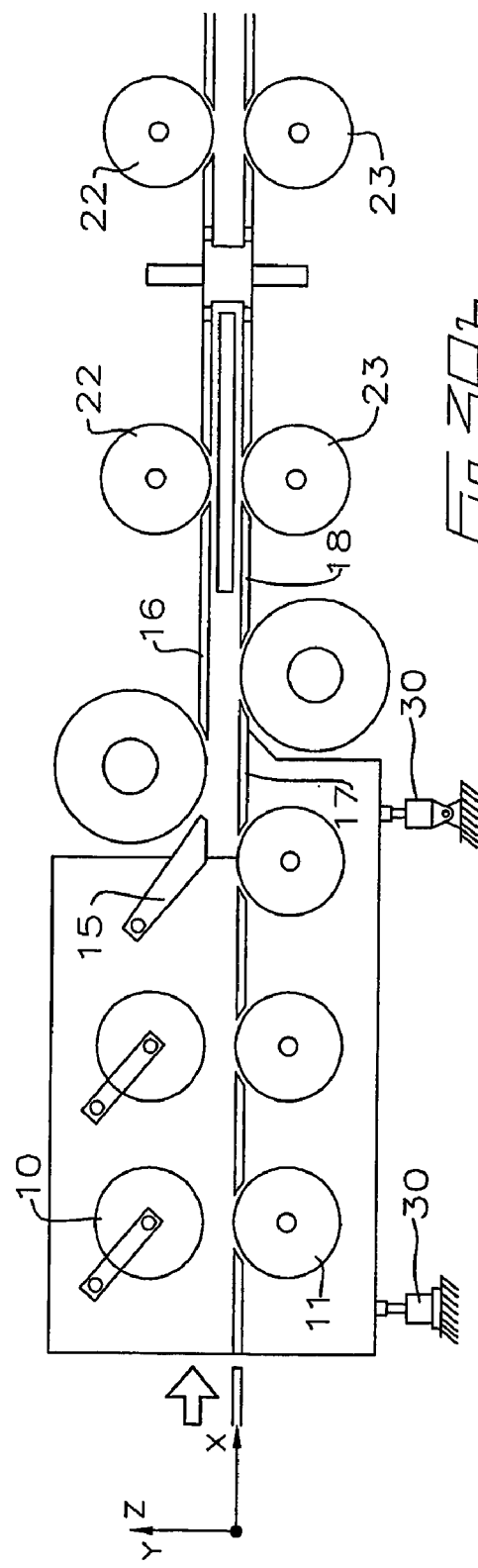
Fig 39a
Fig 39b
OPTIMIZING PLANER—THREE AXIS INFEED POSITIONING MODULE WITH PARALLEL INTERMEDIATE SIDE HEAD STEERING

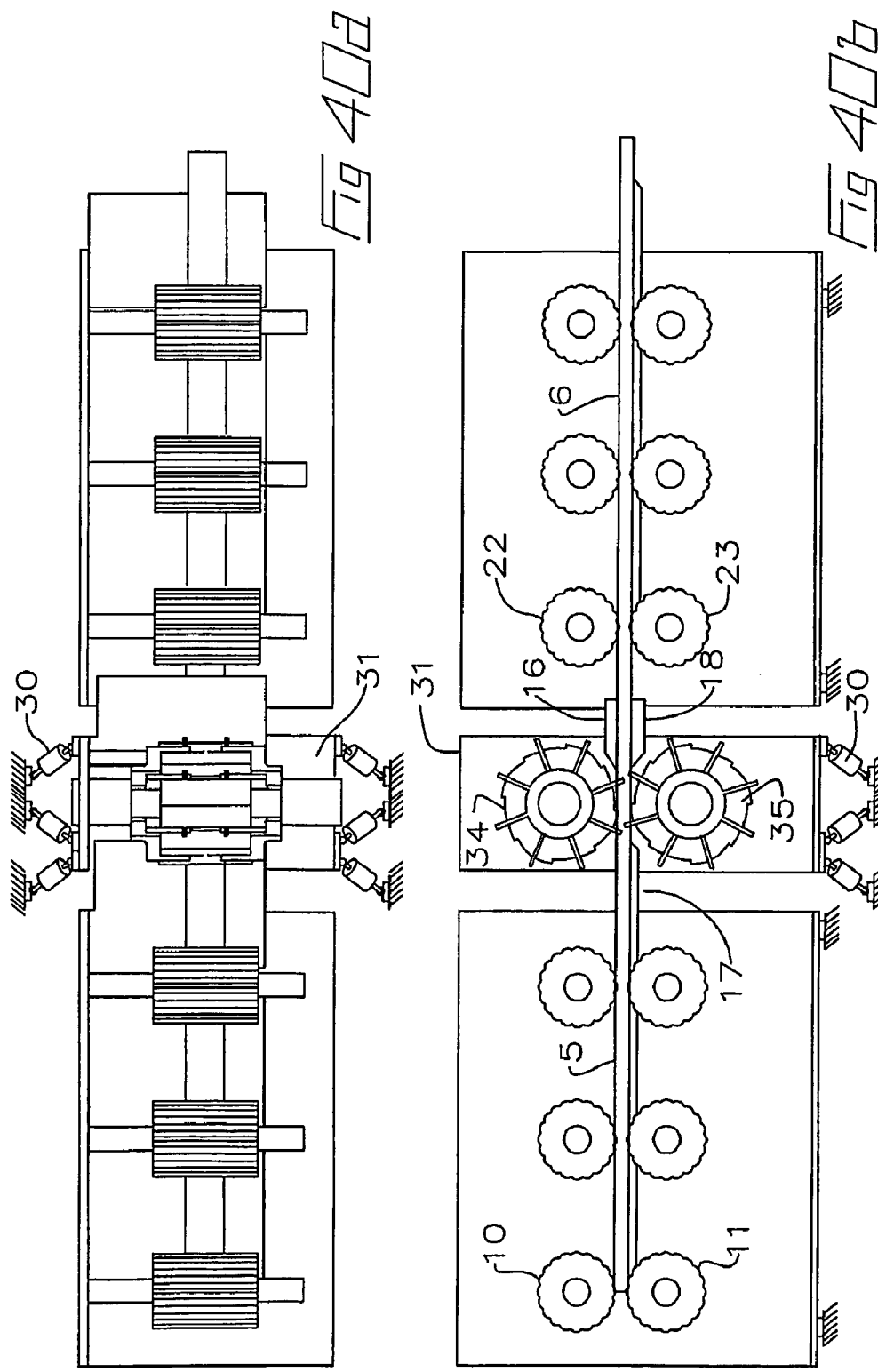

OPTIMIZING PLANER—WITH SINGLE PLANE SHAPING MODULE

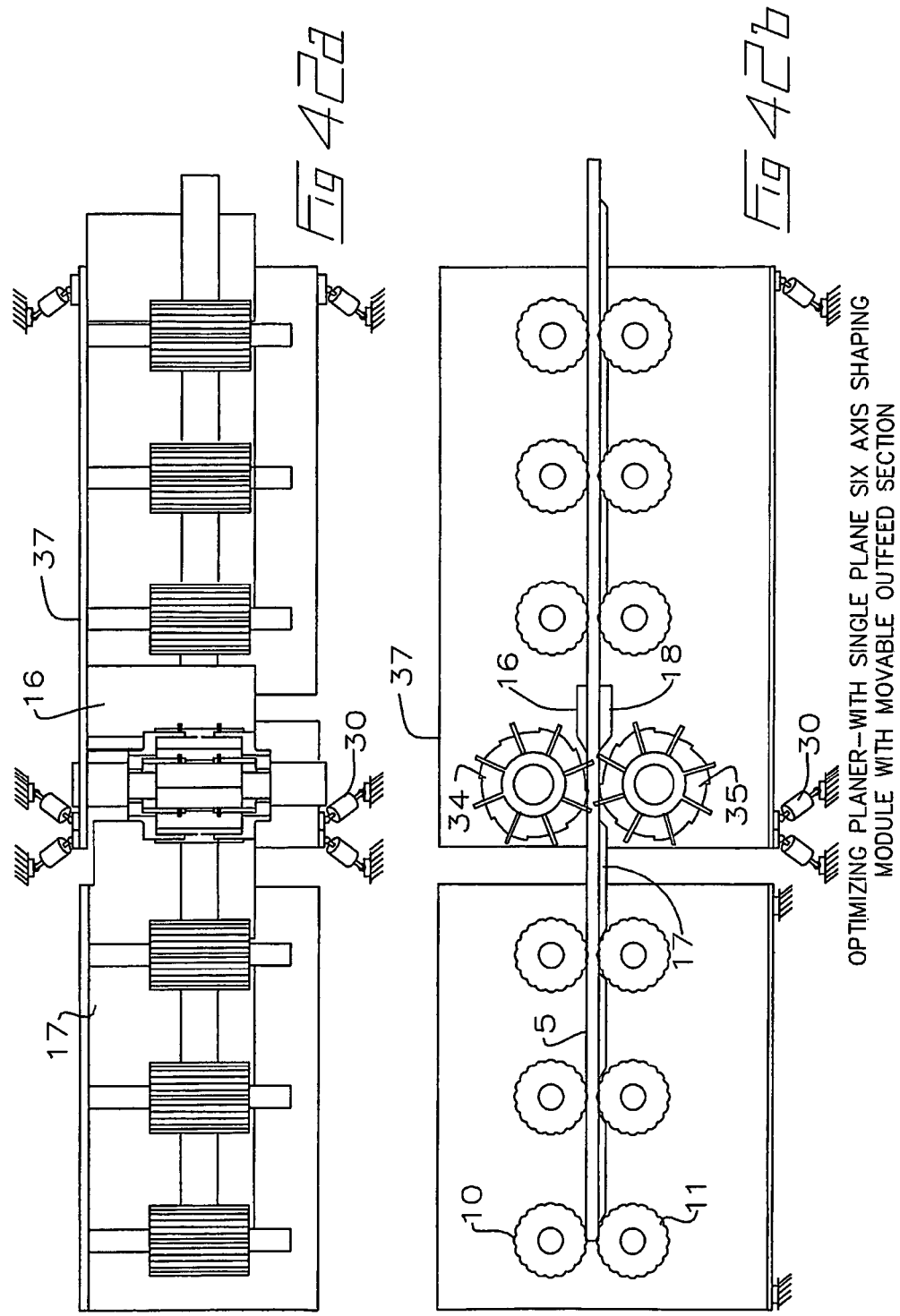

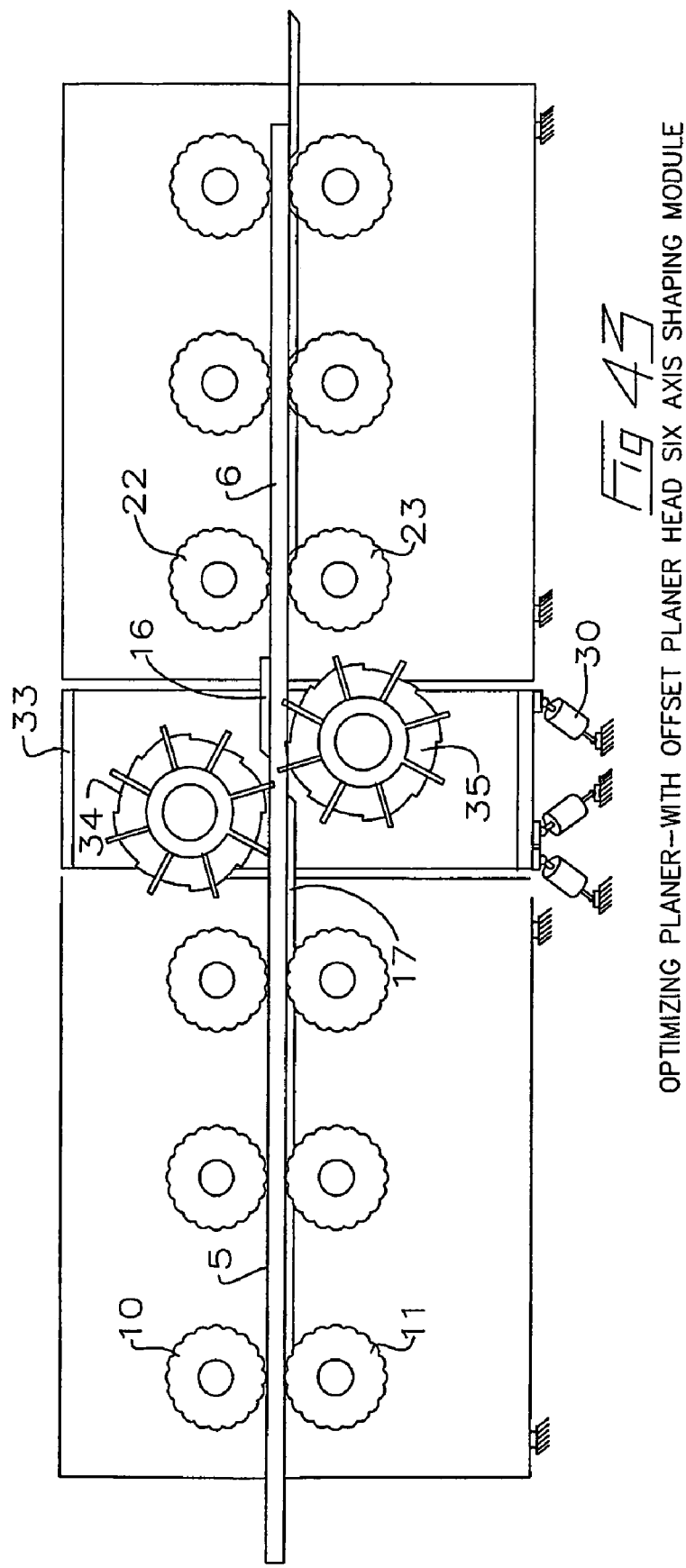
Fig 43 OPTIMIZING PLANER—WITH OFFSET PLANER HEAD SIX AXIS SHAPING MODULE

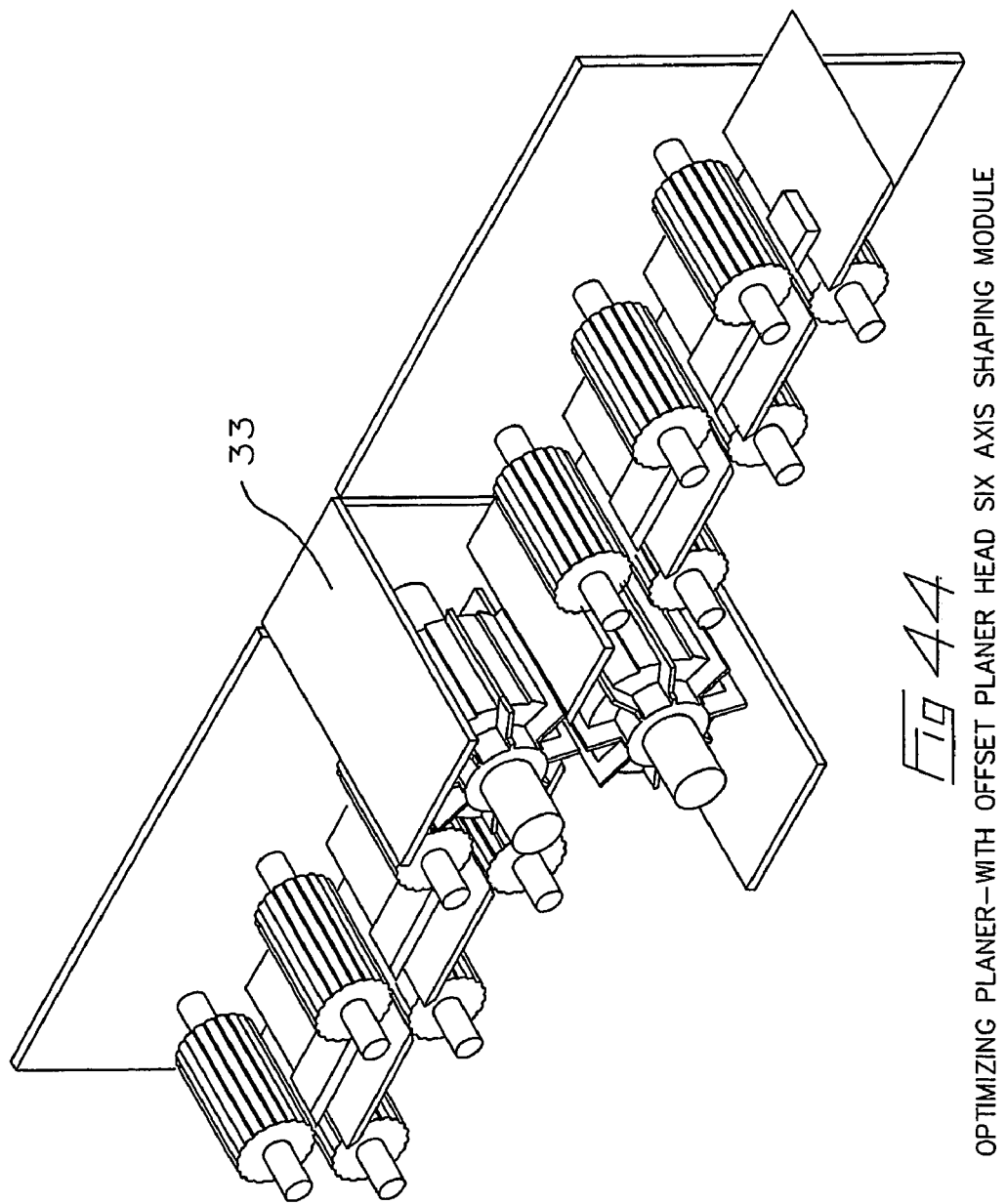
Fig. 44 OPTIMIZING PLANER—WITH OFFSET PLANER HEAD SIX AXIS SHAPING MODULE

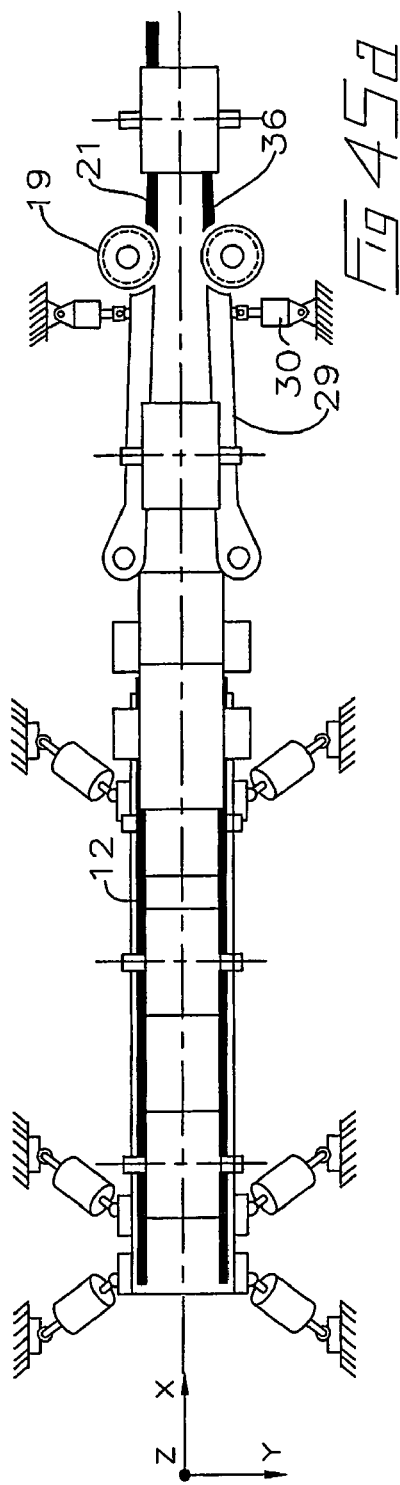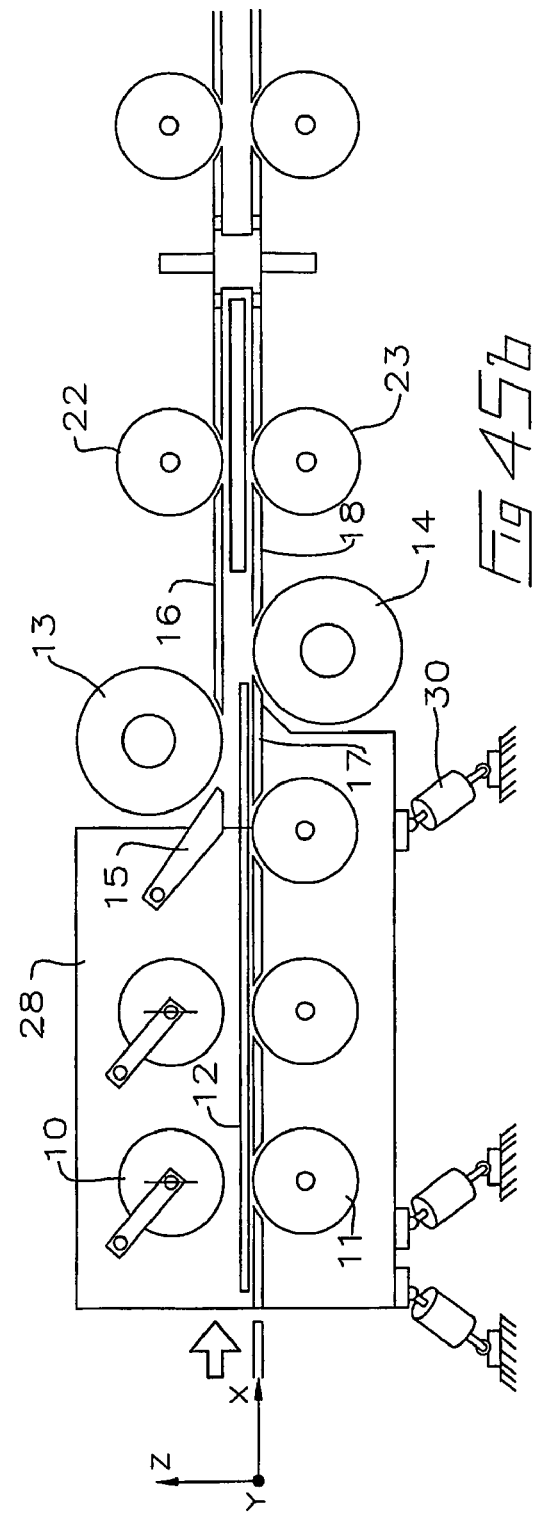
Fig 45a
Fig 45b
OPTIMIZING PLANER WITH SIX AXIS INFEED POSITIONING MODULE AND INTERMEDIATE SIDE STEERING MODULE

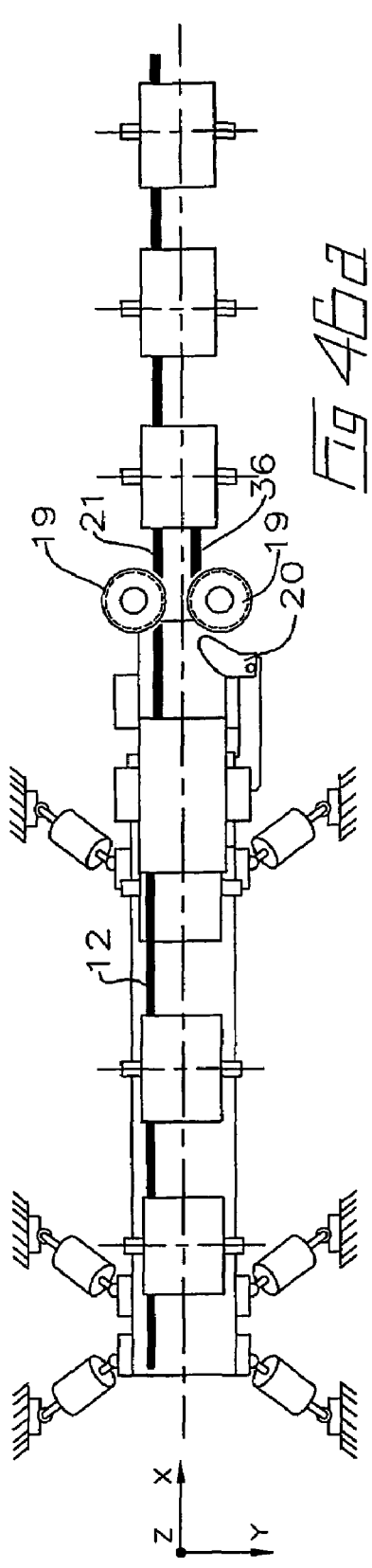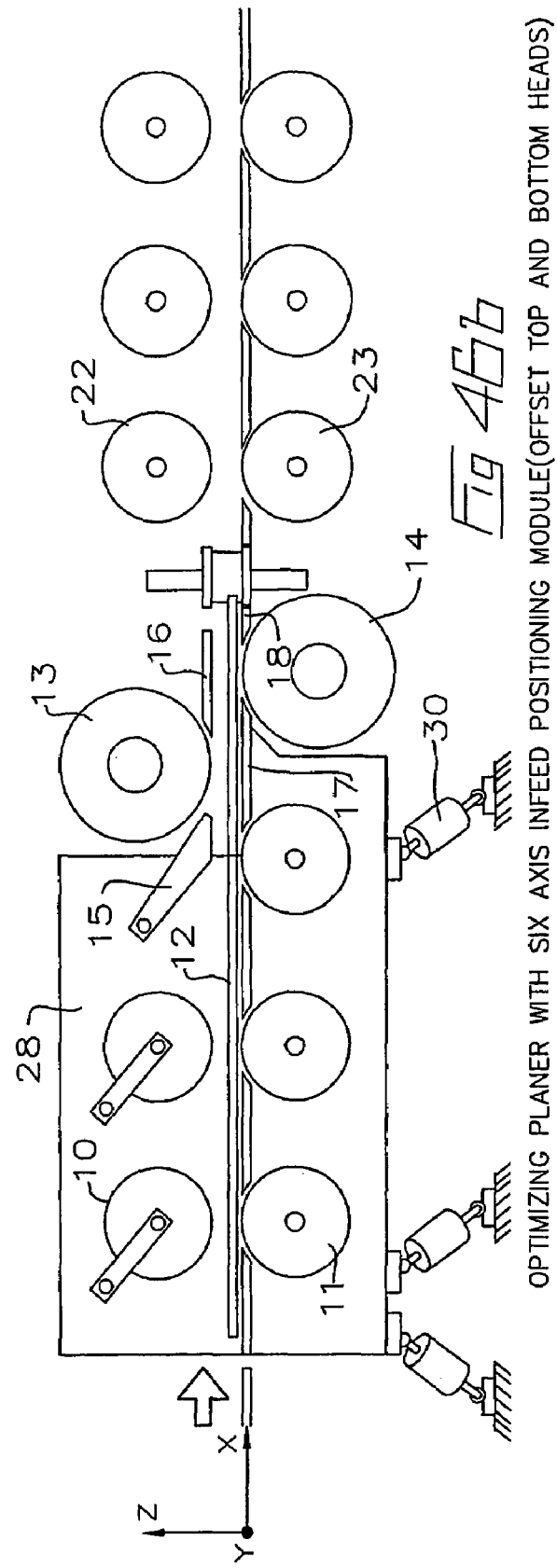

OPTIMIZING PLANER WITH SIX AXIS INFEED POSITIONING MODULE (INLINE TOP AND BOTTOM HEADS)

TOP VIEW OF ROUGH WORK PIECE

OPTIMIZED PLANER-FEEDING EXAMPLE (TOP VIEW)

SIDE VIEW OF ROUGH WORK PIECE

OPTIMIZED PLANER-FEEDING EXAMPLE (TOP VIEW)

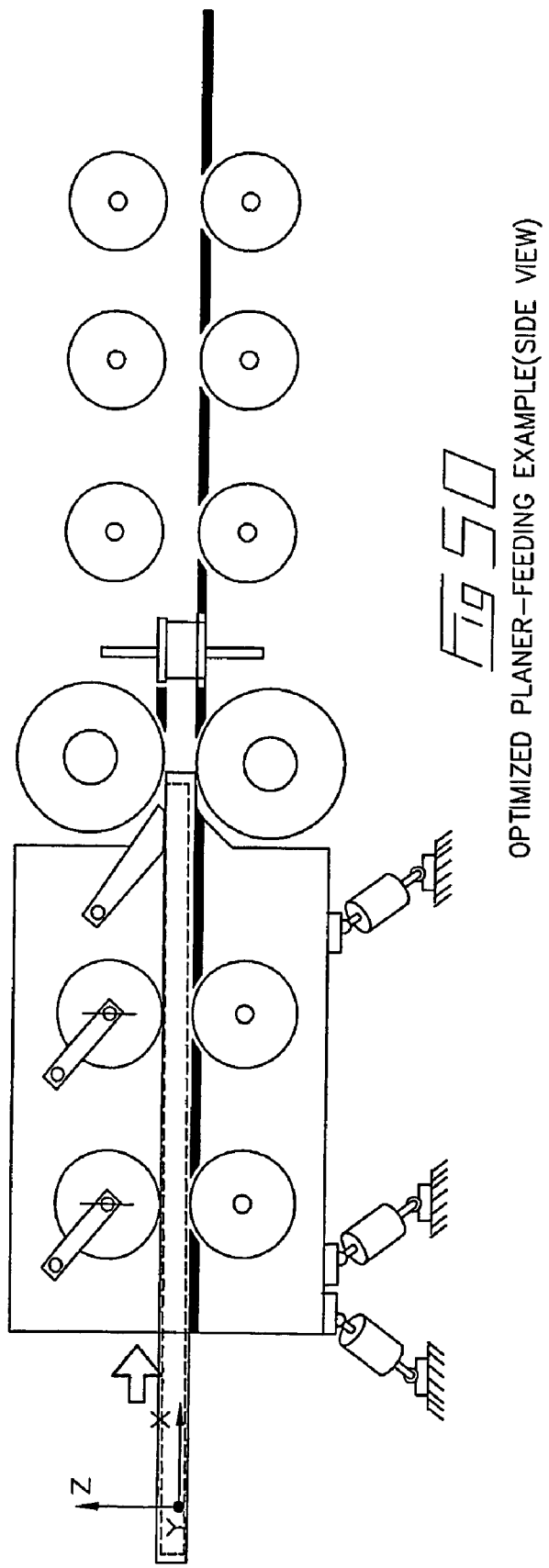

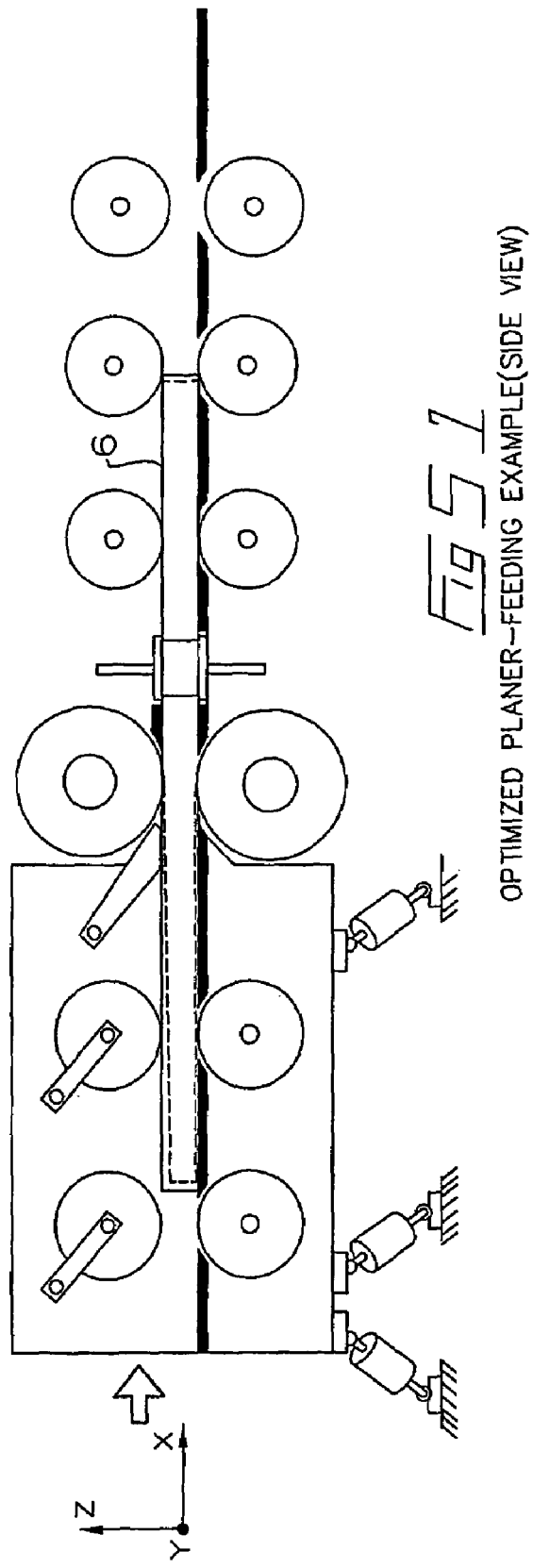

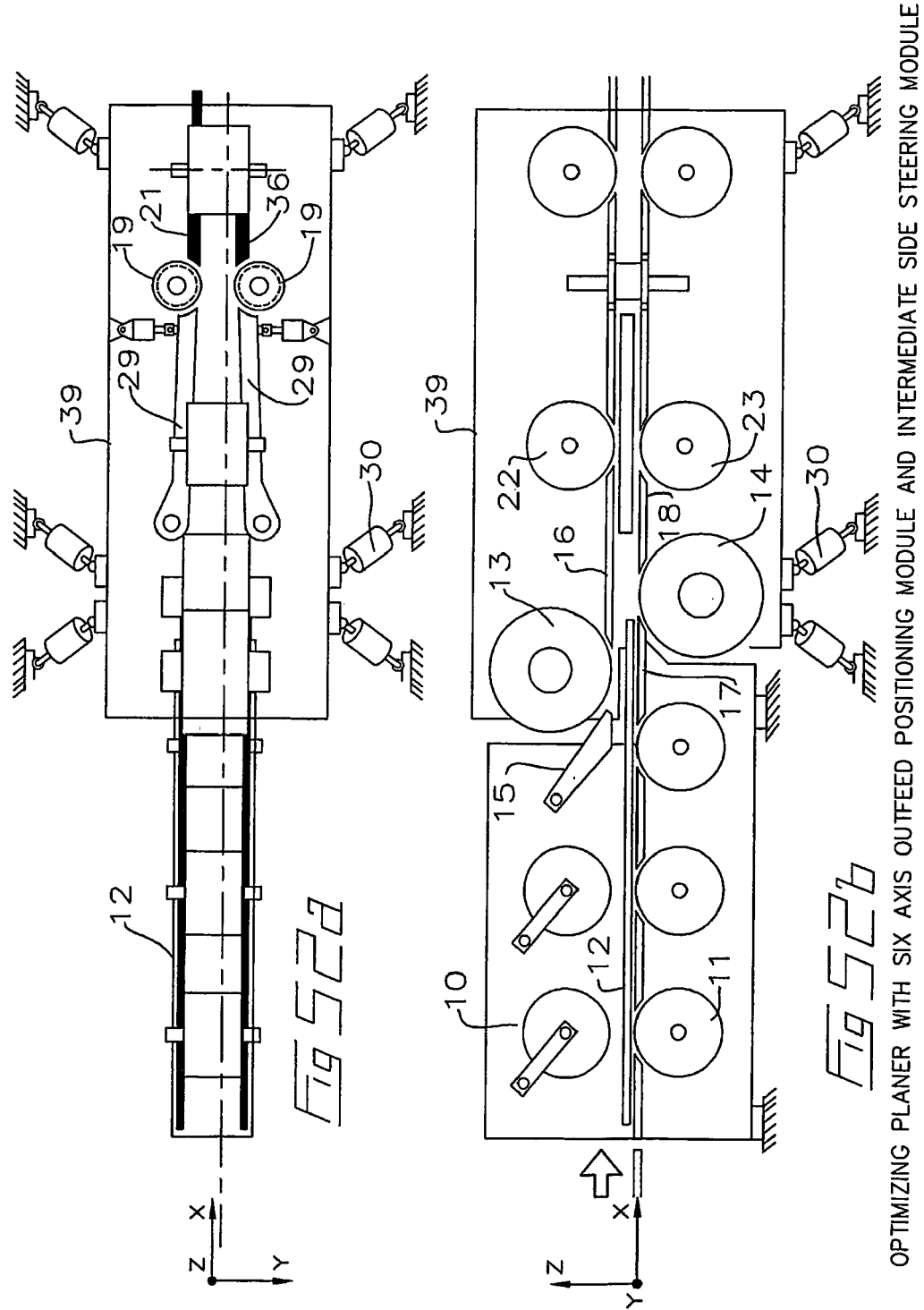

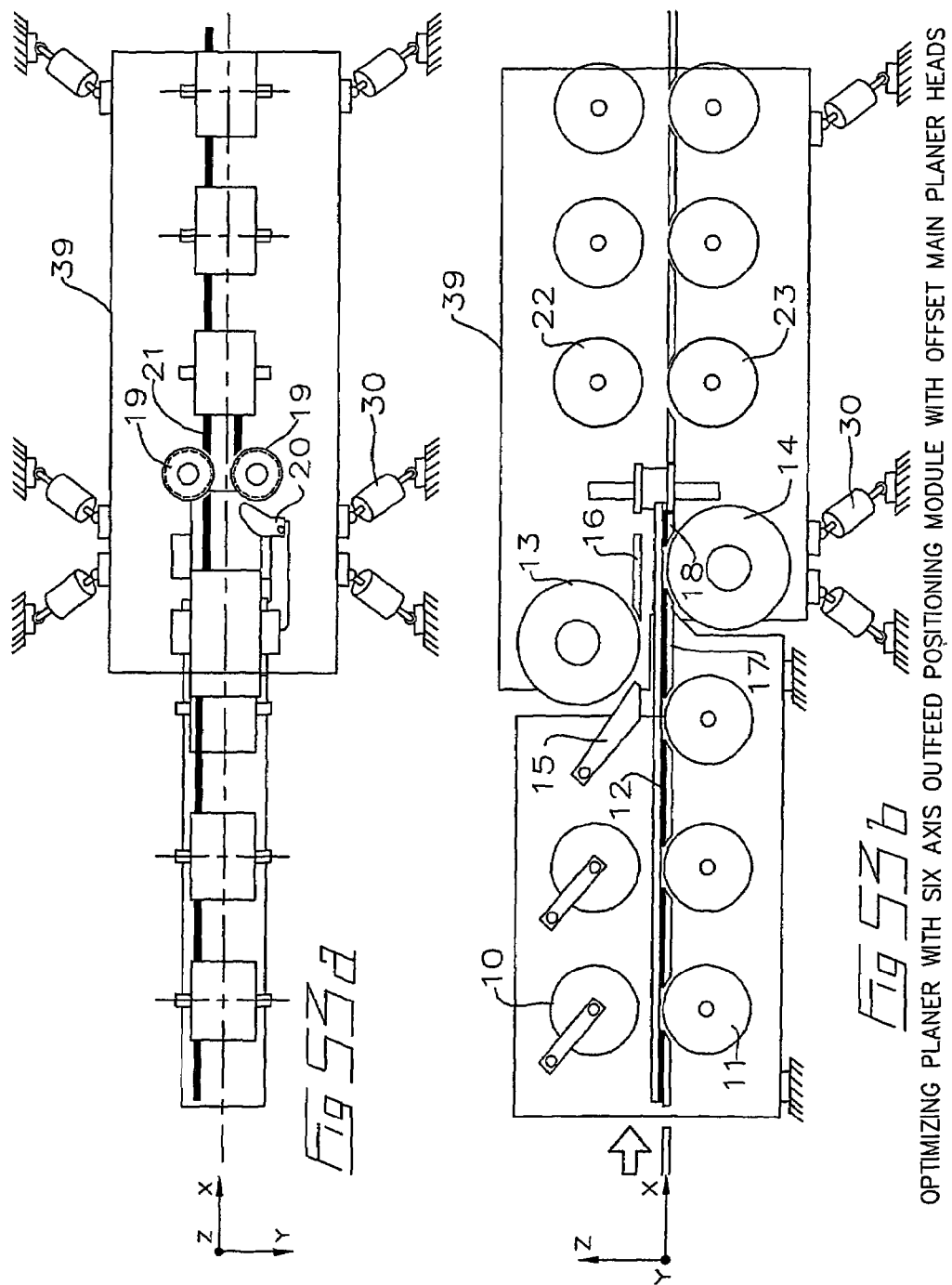

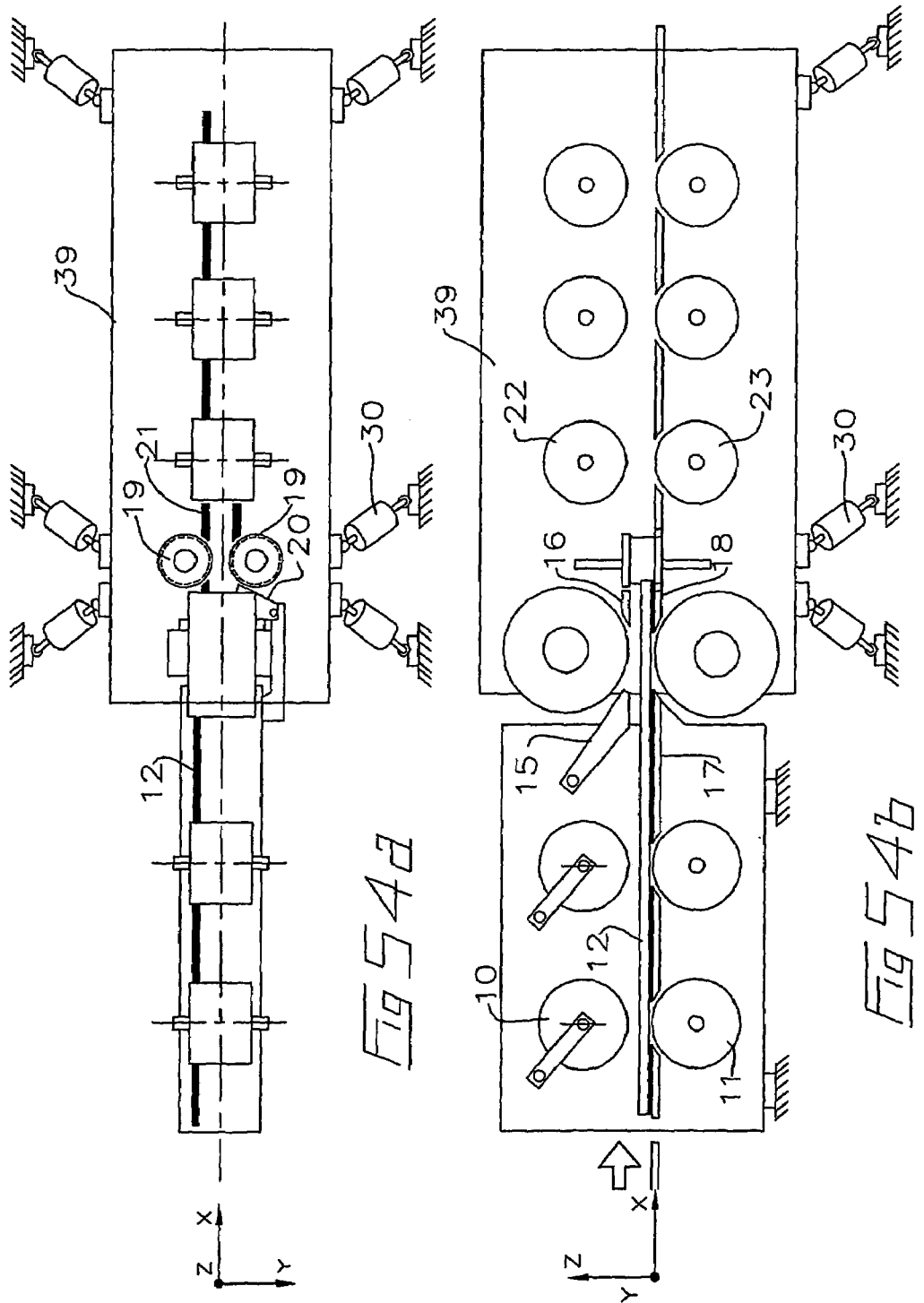

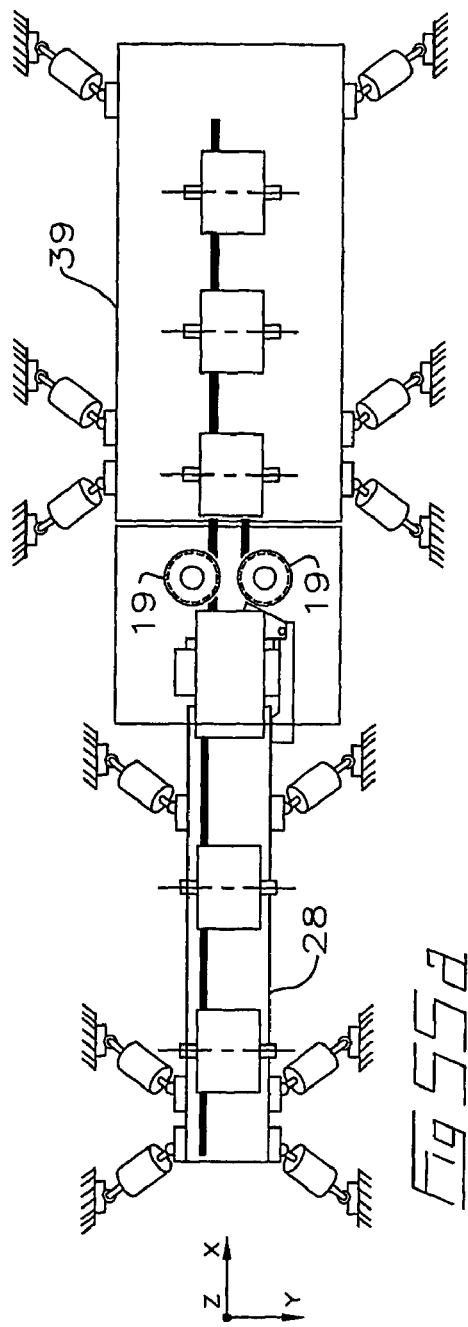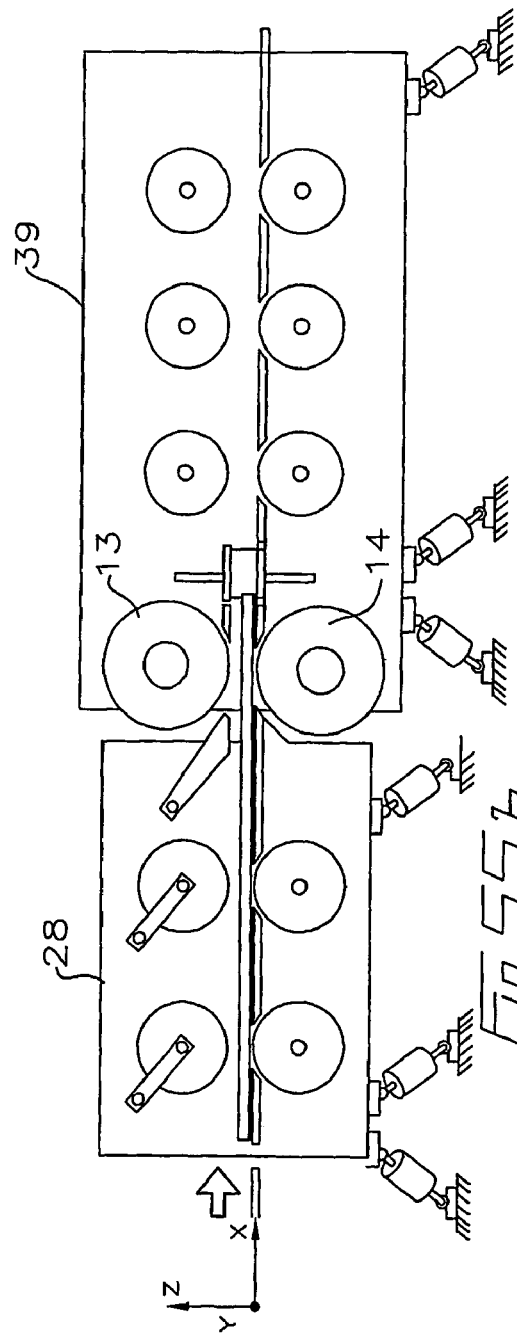
Fig 55a
Fig 55b OPTIMIZING PLANER WITH SIX AXIS INFEED AND OUTFEED POSITIONING MODULES (HEADS MOVING WITH OUTFEED)

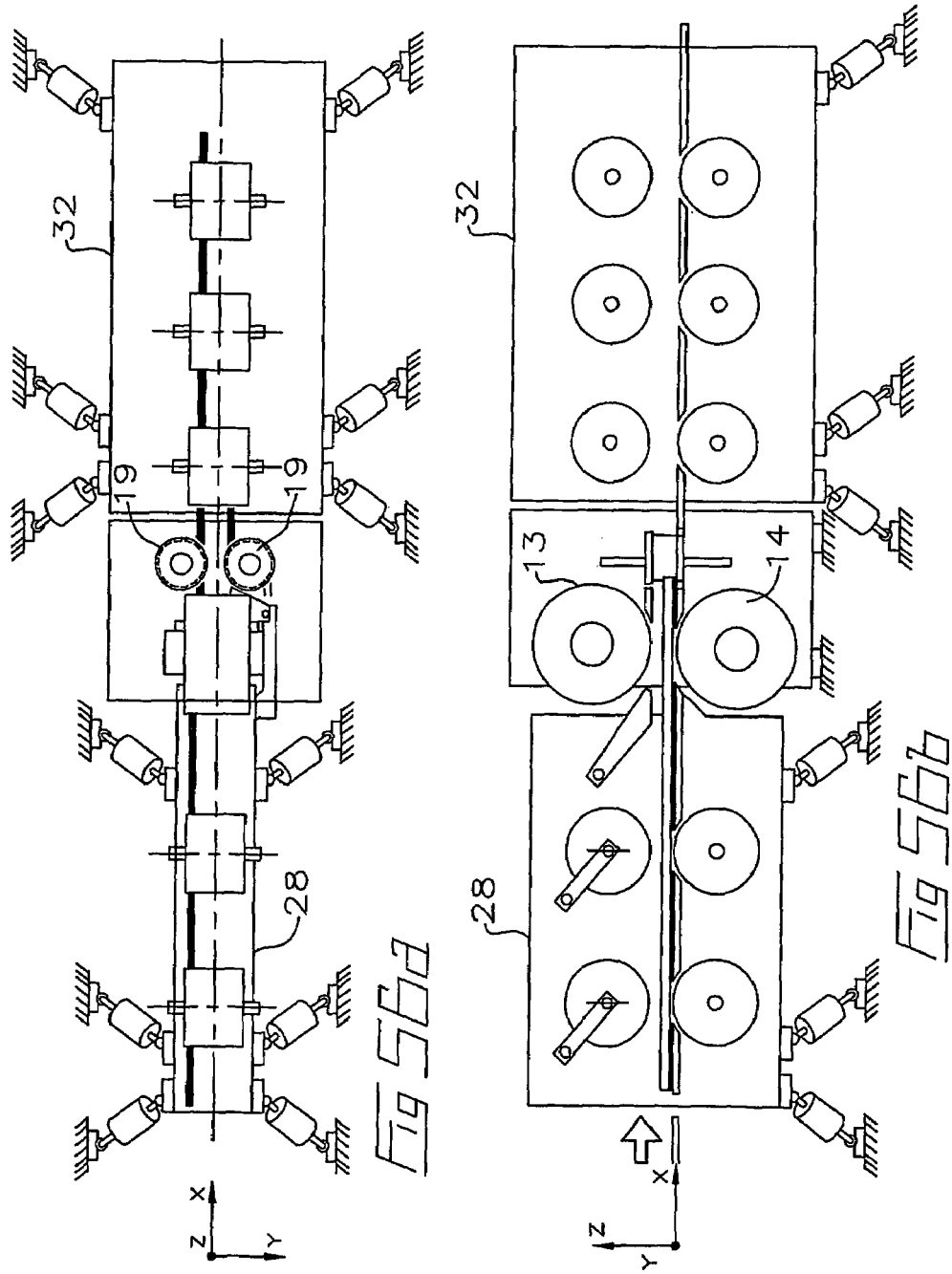

OPTIMIZING PLANER-OPTIONAL SIDE PRE-CUT
(TO REDUCE WORK PIECE TO A SMALLER NOMINAL SIZE)

OPTIMIZING PLANER-OPTIONAL INTERIOR PROFILING
(TO SPLIT SINGLE WORK PIECE INTO TWO PIECES)

CONVENTIONAL PLANER INFEED SYSTEM—SHORT INFEED TRANSPORT DEVICE
(BEFORE CONVERSION TO OPTIMIZED SYSTEM)

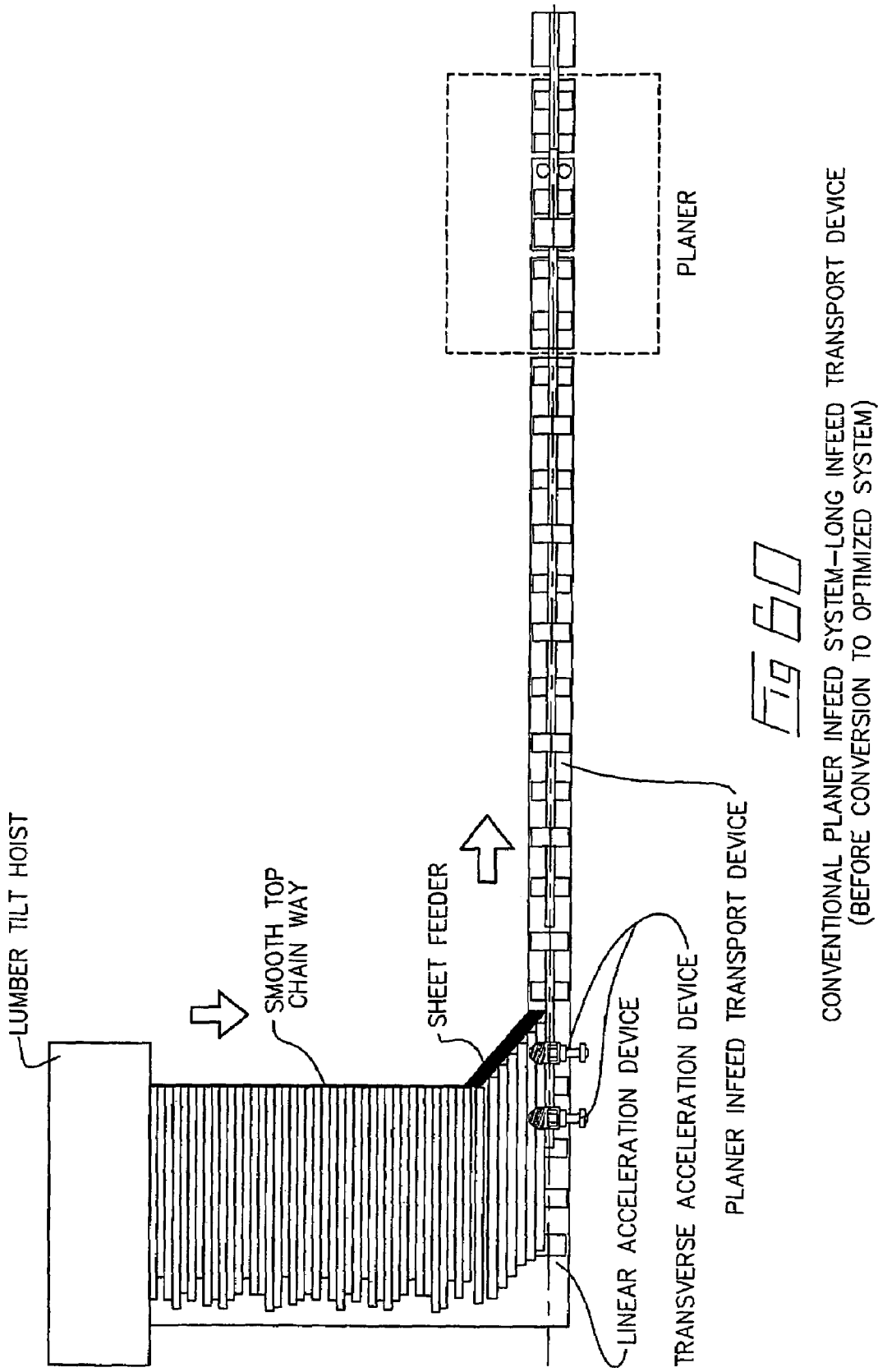

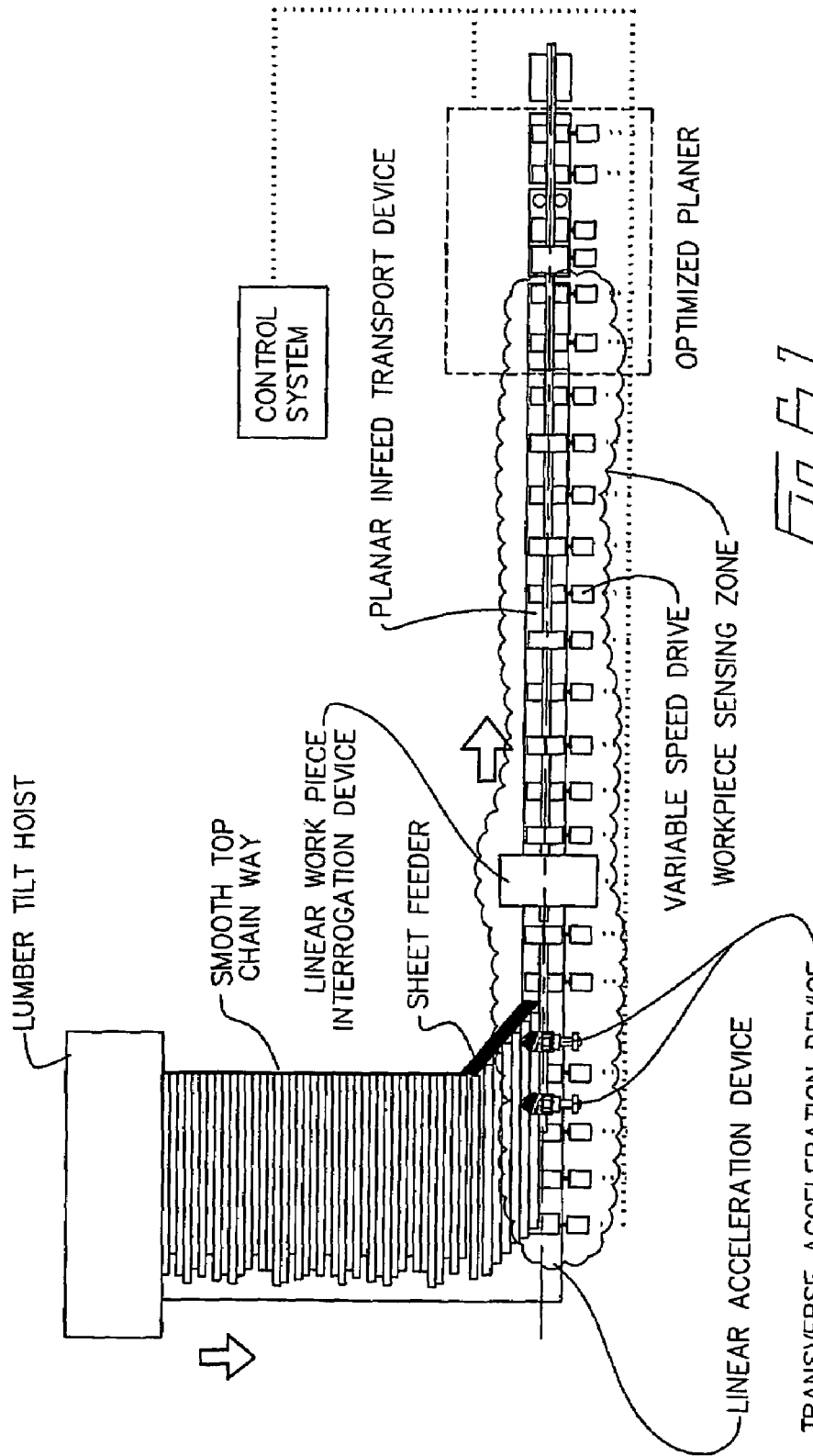

OPTIMIZING PLANER WITH MOVABLE CUTTING ELEMENTS AND OFFSET MAIN PLANER HEADS

OPTIMIZED PLANERMILL SYSTEM AND METHOD

CROSS REFERENCE TO RELATED APPLICATION

This application claims priority to PCT Application PCT/CA2004/000574, filed Apr. 16, 2004.

FIELD OF THE INVENTION

This invention relates to improvements in planermill workpieces, equipment and controls, and in particular to an optimized planermill system and method

BACKGROUND OF THE INVENTION

This invention is an improvement over conventional planermills in that it obtains and executes a unique optimized solution for each workpiece in such a manor as to maximize value by controlling and maximizing throughput, controlling and maximizing yield, controlling and maximizing grade, and controlling and maximizing the performance of all the devices in the main planermill production line.

A conventional planermill is an integrated system of equipment, controls and personnel that are used primarily to:
 reduce rough workpieces into finished workpieces with a desired cross-sectional profile,
 grade workpieces according to size, grade and length,
 mark or label workpieces with the appropriate information, and
 sort workpieces according to size (width and thickness), grade and length.

FIG. 1 shows a plan of a typical conventional planermill. In this example, a tilt hoist delivers rough workpieces in basically sheet form onto a smooth workpiece transfer device. The rough workpieces are conveyed by the smooth transfer device to a linear acceleration device. Once at this linear acceleration device, the rough workpieces are accelerated both linearly towards the planer and transversely by spiral rollers or by a transverse acceleration device to a reference straight edge. The rough workpieces are fed onto a planer infeed transport device in an end-to-end fashion (ends butted together) and on into the planer machine. The guiding and cutting elements within the planer are set in fixed positions during operation. In this example, the guiding and cutting elements are set up to remove a fixed amount of material from the bottom and light hand side of each rough workpiece. The amount of material removed from the top and left hand side of the rough workpiece is dependant upon the actual size of each rough workpiece (see FIG. 2). The finished workpieces leave the planer machine and are decelerated on a slowdown belt or belts before being deposited onto a smooth top transfer device and fed into a lug loader which singulates (or separates into individual pieces) the finished workpieces and places each into a lug space on a lug transfer. Each finished workpiece is graded by a graderperson or persons for visual defects, strength estimate, overall grade, and finished length. Each graderperson marks a grade symbol and a near or far end trim request on each workpiece. The workpieces travel under a grade mark reader that reads the grade and trim request symbols on the workpieces. The grade mark reader sends this information to the trimmer/sorter control system which in turn instructs the trimmer fence and trimmer to position and trim the workpiece accordingly. After the workpieces are trimmed, they are even-ended (positioned with ends in line) by rollers and passed tinder a grade stamp machine which is instructed by the trimmer/sorter control system to stamp each workpiece accordingly. From here the workpieces transfer to a sorter where they are sorted into separate lots according to the size, grade and length. This sorting operation is controlled by the trimmer/sorter control system in response to the original grade and trim request of the graderperson. In current state-of-the-art conventional planermill systems a workpiece interrogator is sometimes used after the planer to assist the graderperson or persons with trim decisions. Currently trim decisions performed within the control system are based solely on the geometric profiles of individual finished workpieces.

Items (a) through (k) below describe the components within a conventional planermill.

(a) Conventional Planermill Tilt Hoist

The conventional planermill tilt hoist is a device that takes a emit or stack of rough workpieces and delivery them onto the smooth transfer deck in basically a sheet of workpieces.

(b) Conventional Planermill Smooth Work Piece Transfer Device

The conventional planermill smooth workpiece transfer device carries the sheet of workpieces to other devices in the planer infeed system. The smooth workpiece transfer device is usually made up of multiple strands of smooth top chain running in troughs spaced along the length of the sheet of workpieces providing support and transportation for the workpieces.

(c) Conventional Planermill Transverse Acceleration Device

A conventional planermill transverse acceleration device is any device that accelerates the workpiece away from the smooth workpiece transfer device and delivers it to the linear acceleration device.

(d) Conventional Planermill Linear Acceleration Device

A conventional planermill linear acceleration device is any device that accepts a workpiece from a transverse acceleration device and/or a smooth top transfer and accelerates the workpiece linearly (substantially along the length axis of the workpiece) towards the planer infeed.

(e) Conventional Planermill Planer Infeed Transport Device

A conventional planermill planer infeed transport device is any device that accepts a workpiece generally linearly along the length axis of the workpiece from at least one and possibly multiple linear acceleration devices and conveys or transports the workpieces from the linear acceleration device or devices to the infeed end of the planer.

(f) Conventional Planermill Planer

A planer within a conventional planermill is a device used primarily to reduce rough workpieces into finished workpieces with a desired cross-sectional profile.

(g) Conventional Planermill Lug Loader

The conventional planermill lug loader is used to take the workpieces from a sheet of workpieces on a smooth transfer deck and place them into lug spaces on a lug transfer.

(h) Conventional Planermill Lug Transfer

A conventional planermill lug transfer is a conveyor made up of numerous strands of chain containing lugs attached at fixed intervals which push the workpieces forward and keep them singulated (traveling individually).

(i) Conventional Planermill Trimmer

A conventional planermill trimmer is a device used to position and trim to length a workpiece based on the trim decision made by the graderperson and contained within the trimmer/sorter control system. The trim decision may also be determined or partially determined with the information from a workpiece interrogator located after the planer.

(j) Conventional Planermill Grade Marker

A conventional planermill grade marker is a device used to mark each workpiece with the appropriate grade and identification information. This information corresponding to each workpiece is assigned by the graderperson and contained within the trimmer/sorter control system.

(k) Conventional Planermill Sorter

A conventional planermill sorter is a device used to sort each workpiece to the correct pathway depending on the grade and trim length information stored within the trimmer/sorter control system.

Applicant is aware of the following U.S. Pat. Nos. 5,761,979; 4,239,072; 4,449,557; 5,816,302; 5,853,038; 5,946,995; and 5,884,682.

SUMMARY OF THE INVENTION

An optimized planermill is an integrated system of equipment, electronic sensing, computer optimization and process controls configured to maximize the value of the material being processed by obtaining the highest grade, yield and throughput possible. This process involves passing the rough workpieces through a workpiece interrogator, located before the planer, where all physical characteristics necessary to optimally process each workpiece are obtained. Optimally processing workpieces primarily involves automatically:

- computing the unique optimized solution for each rough workpiece,
- maximizing throughput,
- extracting the highest value finished workpiece from each rough workpiece,
- assigning the highest grade possible to each finished workpiece,
- marking the grade on each workpiece and
- sorting the finished workpieces accordingly.

One key aspect of the invention involves the recognition that conventional planers do not extract the highest value finished workpiece possible from each incoming rough workpiece. Since conventional planers repeatedly position the desired cross-sectional profile in the same location relative to the incoming workpiece's fixed sides (typically the bottom and one side) the planer will at times remove excess material from a side containing a better more complete surface while at the same time remove a smaller amount of material from a side containing a poorer quality surface. An improved planing system is needed, one that can remove more of the lower quality surfaces while at the same time leave more of the higher quality surfaces within the finished workpiece.

At the heart of an optimized planermill is an improved planer called an optimized planer. An optimized planer is a device that can position and/or reposition the desired cross-sectional profile most optimally within the rough workpiece during the planing operation based primarily on the physical properties of the incoming rough workpiece. The use of an optimized planer requires a new method of planermill operation and control. As discussed above, in this new optimized planermill a workpiece interrogation system, located upstream from the planer, measures the physical properties of each individual incoming rough workpiece. These physical properties are then used throughout the planermill process to:

- control the planer to produce the most optimized finished workpiece possible out of each incoming rough workpiece,
- control the planer or other cutting equipment to optionally trim back or split into multiple pieces a designated incoming rough workpiece that would have otherwise produced a lower value or unusable finished workpiece (e.g., having the option of producing one 2×6 or two 2×4's while cutting 2×8's),
- trim to length each individual workpiece,
- assign the highest grade possible to each individual workpiece,
- mark and sort each workpiece and
- maximize and control the throughput of workpieces through the entire planermill process.

The use of an optimized planermill may result in some or all of the following benefits:

- higher quality workpieces with more complete shape profiles resulting in higher grade and higher value production,
- production of a more uniform chip leading to a more uniform and higher quality surface finish,
- generally more uniform power consumption top-to-bottom and side-to-side resulting in better more even feeding,
- higher overall throughput of the planermill system and a reduction in overall planermill power requirements.

In summary, the optimizing planermill system according to the present invention may include a control system; a workpiece feed path for feeding an array of workpieces linearly downstream to an optimizing planer; and means for setting the size of gaps between successive workpieces in the array of workpieces. The gap size is set so that each gap between successive workpieces in the array of workpieces provides enough time, and in one embodiment only enough time, for relative movement of at least one of movable cutting elements in the planer and movable guiding elements so as to obtain relative movement between the cutting elements and the workpiece being next fed in so as to obtain optimized positioning corresponding to the workpiece being next fed into the planer. The planer downstream along the workpiece feed path is operably coupled to the control system. The planer has an entrance, for receipt of a rough workpiece, and an exit, for discharge of an at least partially finished workpiece. A workpiece interrogator is situated along the workpiece feed path upstream of the entrance and is operably coupled to the control system so to provide the control system with workpiece property information for each workpiece entering the planer. The control system provides the optimizing planer with control information based upon the workpiece property information for each workpiece. The planer moves at least one of movable guiding elements and the cutting elements as the workpiece passes through the optimizing planer according to the control information for each workpiece.

The means for setting the size of gaps may include means for accelerating workpiece speed of the workpiece along, and cooperating with, the workpiece feed path so as to control said size of gaps. The workpiece feed path may include workpiece transportation means for transporting the workpiece downstream from the means for accelerating workpiece speed, downstream to the planer. Workpiece interrogation means may be provided for interrogating the workpiece to determine workpiece data corresponding to attributes of the workpiece. A workpiece optimization system may be provided that receives the workpiece data corresponding to attributes of the workpiece from the workpiece interrogation means, determines an optimized cutting solution for the work piece, and sends control instructions to the means for accelerating workpiece speed.

The means for accelerating workpiece speed may include one or more of a fixed speed transverse acceleration device, a variable speed transverse acceleration device, a vertical acceleration device, a fixed speed linear acceleration device, a variable speed linear acceleration device. The workpiece interrogation means may include one or more of a linear workpiece interrogator and a transverse workpiece interrogator. The workpiece transportation means includes one or more of a fixed speed intermediate transport device, a variable speed intermediate transport device. The workpiece feed path means may include one or more of a sheet feeder, a fixed speed lug transfer and a variable speed lug transfer.

The apparatus may further include:

(a) workpiece sensing means to sense one or more of the position, velocity and acceleration of a workpiece in the array of workpieces upstream of the planer; and (b) a control system that receives data from the workpiece sensing means and using the data from the workpiece sensing means, controls the size of gaps to establish and/or control and/or correct a minimum required gap between each successive workpiece of the array of workpieces.

The control system and the workpiece optimization system may be combined into a singular gap optimization system.

The size of gaps may include wood to be trimmed downstream in a trimmer according to an optimized trim solution.

Means may be provided for determining in-piece gap-reduction for a successive series of workpieces in the array of workpieces. The means for setting the size of gaps between successive workpieces cooperates with the means for determining in-piece gap-reduction so as to reduce the size of gaps where an optimized planing solution for a downstream workpiece in the successive series of workpieces provides for in-piece setting of the cutting elements within the downstream workpiece so as to pre-position the cutting elements for commencing an optimized planing solution for a next adjacent upstream workpiece in the successive series of workpieces. This may allow for the size of the gap between the downstream and upstream workpieces to be reduced or eliminated.

The method of optimizing a planermill according to a further embodiment of the present invention includes:

(a) feeding a series of workpieces downstream to an optimizing planer;

(b) accelerating each workpiece in the series of workpieces to provide a gap and corresponding time between successive workpieces in the series sufficient for relative movement between cutting elements in the planer and successive workpieces guided by guiding elements so as to provide optimized relative positioning of cutting elements in the planer;

(c) interrogating each workpiece prior to entering the optimizing planer to formulate workpiece property information for each workpiece;

(d) creating control information for each workpiece from the workpiece property information; and (e) controlling the cutting operation of the optimizing planer for each workpiece and controlling accelerating of the workpiece so as to control the size of the gaps between the workpieces based upon the control information for each workpiece.

In one embodiment, the method further includes the steps of:

(a) sensing one or more of the position, velocity and acceleration of a workpiece as the workpiece is fed or transported downstream to the planer and collecting corresponding data therefrom; and (b) controlling the acceleration of each workpiece to establish and/or control and/or correct a minimum required optimized gap between the workpieces.

In a further embodiment, the method may further include the steps of:

(a) determining in-piece gap-reduction for a successive series of workpieces in the array of workpieces, wherein the means for setting the size of gaps between successive workpieces cooperates with the means for determining in-piece gap-reduction so as to reduce the size of the gaps and;

(b) determining a corresponding optimized planing solution for a downstream workpiece in the successive series of workpieces thereby providing for in-piece setting of the cutting elements within the downstream workpiece so as to pre-position the cutting elements for commencing an optimized planing solution for a next adjacent upstream workpiece in the successive series of workpieces, whereby the size of gap between the downstream and upstream workpieces is reduced.

BRIEF DESCRIPTION OF THE DRAWINGS

FIG. 15a is, in side elevation view, an example of an alternative sheet feeder device that uses a hopper feeder and a catapult-type linear acceleration device.

FIG. 15b is, in side elevation view, the device of FIG. 15a with workpieces depressed by the vertical acceleration device.

FIG. 15c is, in side elevation view, the device of FIG. 15a showing the catapult actuator.

FIG. 15d is, in side elevation view, the device of FIG. 15a showing a workpiece advanced by the catapult actuator.

FIG. 21 is, in side elevation view, an example of a wheel-type transverse acceleration device.

FIG. 22 is, in side elevation view, an example of an adjustable wheel-type transverse acceleration device.

FIG. 24 is, in plan view, an example of a variable speed infeed transport device with a sheet fed linear accelerator device and a linear workpiece interrogator.

FIG. 25 is, in plan view, an example of a variable speed infeed transport device with a sheet fed linear accelerator device and a linear workpiece interrogator, with closed loop non-optimizing control.

FIG. 26 is, in plan view, an example of a variable speed infeed transport device with a sheet fed linear accelerator device and a linear workpiece interrogator, with closed loop optimizing control.

FIG. 27 is, in diagrammatic plan view, an example of fully optimized gap control with and without the addition of trim decision gap optimization.

FIG. 28 is a matrix showing combinations of planer infeed component devices that may be set up and controlled to operate as gapping infeed systems.

FIG. 29 shows lateral cross sections of a workpiece illustrating typical cross sectional defects as found on rough workpieces feeding a planer.

FIG. 37a is, in perspective view, a rough workpiece having diametrically opposed wane defects on opposite front and back ends of the workpiece.

FIG. 37b is, in front end elevation view, the rough workpiece of FIG. 37a.

FIG. 37c is, in back end elevation view, the rough workpiece of FIG. 37a.

FIG. 37d is, in perspective view, the finished workpiece resulting from optimized planing of the rough workpiece of FIG. 37a.

FIG. 38a is, in side elevation view, a further embodiment of the optimizing planer according to the present invention having a three axis infeed positioning module with intermediate side head steering.

FIG. 38b is, in plan view, the optimizing planer of FIG. 38b.

FIG. 39a is, in side elevation view, a further embodiment of the optimizing planer according to the present invention having a three axis infeed positioning module with parallel intermediate side head steering.

FIG. 39b is, in plan view, the optimizing planer of FIG. 39a.

FIG. 40a is, in side elevation view, a further embodiment of the optimizing planer according to the present invention having a single plane six axis shaping module.

FIG. 40b is, in plan view, the optimizing planer of FIG. 40a.

FIG. 42a is, in side elevation view, a further embodiment of the optimizing planer according to the present invention having a single plane six axis shaping module with a moveable outfeed section.

FIG. 42b is, in plan view, the optimizing planer of FIG. 42a.

FIG. 43 is, in side elevation view, a further embodiment of the optimizing planer according to the present invention having an offset planer head six axis shaping module.

FIG. 44 is, in perspective view, the optimizing planer of FIG. 43.

FIG. 45a is, in side elevation view, a further embodiment of the optimizing planer according to the present invention having a six axis infeed positioning module and an intermediate side steering module.

FIG. 45b is, in plan view, the optimizing planer of FIG. 45a.

FIG. 46a is, in side elevation view, a further embodiment of the optimizing planer according to the present invention having a six axis infeed positioning module with offset top and bottom heads.

FIG. 46b is, in plan view, the optimizing planer of FIG. 46a.

FIG. 47b is, in plan view, the optimizing planer of FIG. 47a.

FIG. 50 is, in side elevation view, the optimizing planer of FIG. 49 with the rough workpiece advancing through the planer.

FIG. 50a is, in side elevation view, the rough workpiece of FIG. 50.

FIG. 51 is, in side elevation view, the optimizing planer of FIG. 49 with the rough workpiece advancing further through the planer optimizing planer of FIG. 49.

FIG. 52a is, in side elevation view, a further embodiment of the optimizing planer according to the present invention having a six axis outfeed positioning module and an intermediate side steering module.

FIG. 52b is, in plan view, the optimizing planer of FIG. 52a.

FIG. 53a is, in side elevation view, a further embodiment of the optimizing planer according to the present invention having a six axis outfeed positioning module and offset main planer heads.

FIG. 53b is, in plan view, the optimizing planer of FIG. 53a.

FIG. 54a is, in side elevation view, a further embodiment of the optimizing planer according to the present invention having a six axis outfeed positioning module with inline main planer heads.

FIG. 54b is, in plan view, the optimizing planer of FIG. 54a.

FIG. 55a is, in side elevation view, a further embodiment of the optimizing planer according to the present invention having six axis infeed and outfeed positioning modules with the head on the outfeed.

FIG. 55b is, in plan view, the optimizing planer of FIG. 55a.

FIG. 56a is, in side elevation view, a further embodiment of the optimizing planer according to the present invention having six axis infeed and outfeed positioning modules with stationary heads therebetween.

FIG. 56b is, in plan view, the optimizing planer of FIG. 56a.

FIG. 59 is, in plan view, a conventional prior art planermill infeed system with a short infeed transport device, prior to conversion to an optimized system.

FIG. 60 is, in plan view, a conventional prior art planermill infeed system with a long infeed transport device, prior to conversion to an optimized system.

FIG. 61 is, in plan view, a conventional prior art planermill infeed system with a long infeed transport device, after conversion to an optimized system.

FIG. 62b is, in plan view, the optimizing planer of FIG. 62a.

DETAILED DESCRIPTION OF PREFERRED EMBODIMENTS

Preferred Embodiment

Transverse Interrogation

Figure 1:
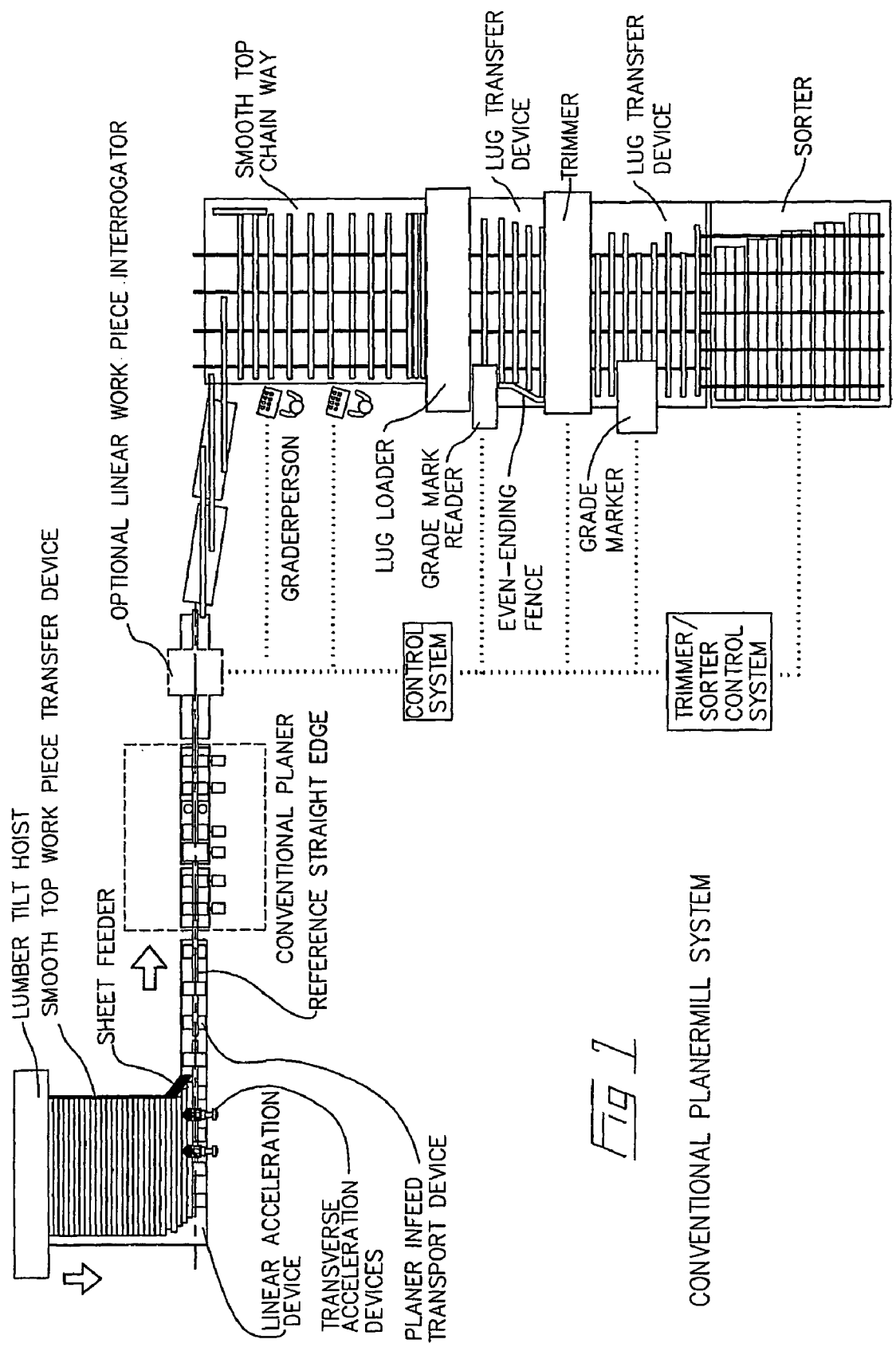
FIG. 1 is, in plan view, a conventional prior art planermill system.
Figure 2:
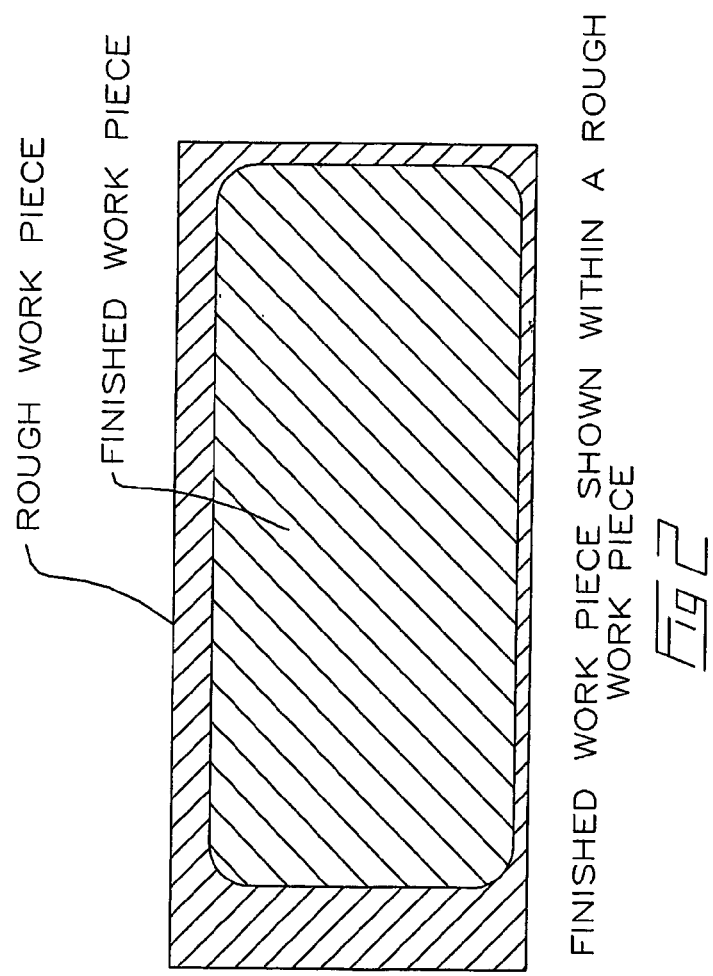
FIG. 2 is, in end view, a finished workpiece shown within a rough workpiece.
Figure 3:
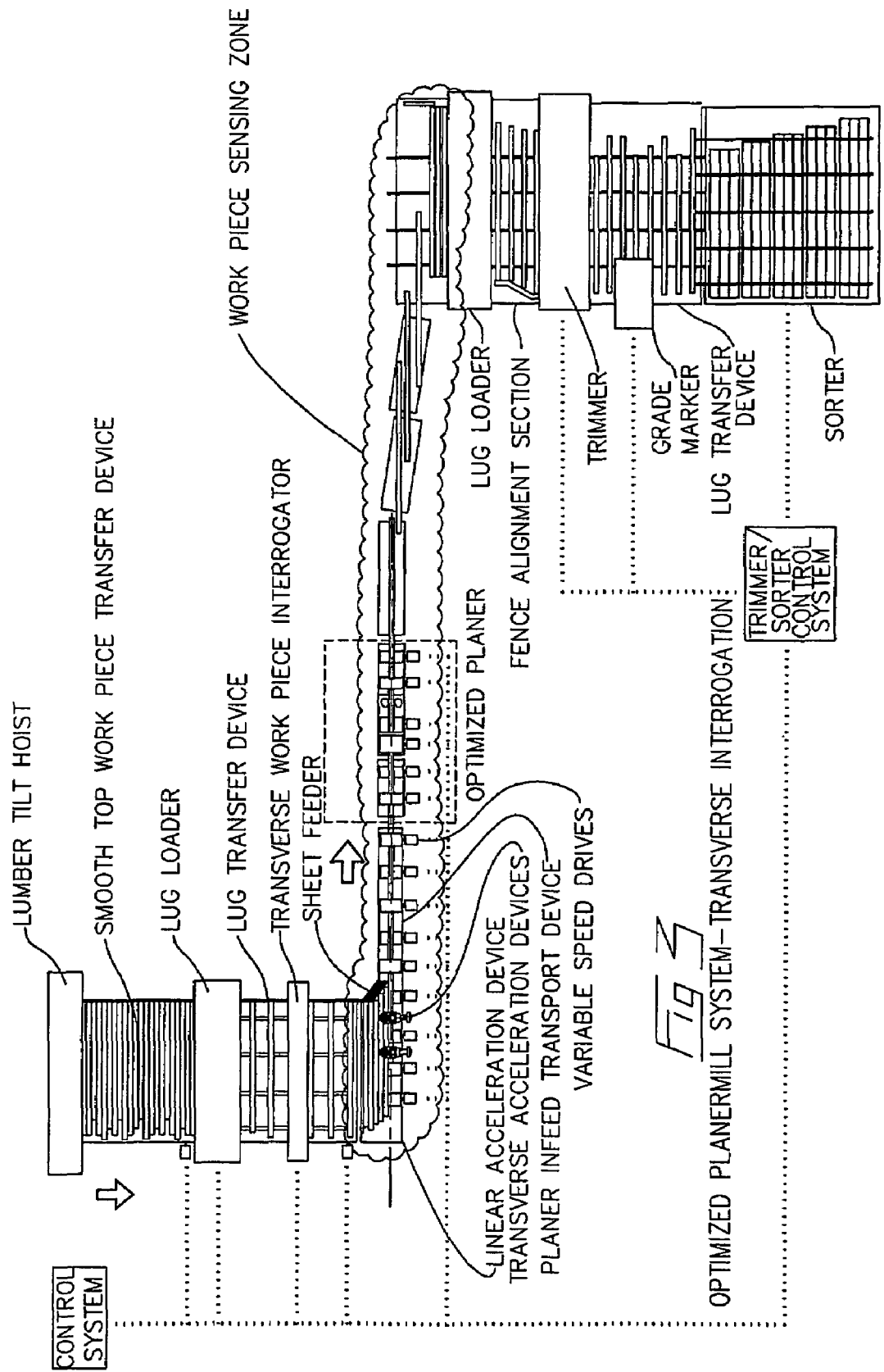
FIG. 3 is, in plan view, the optimized planermill system according to one embodiment of the present invention, using transverse interrogation.

FIG. 3 shows a simplified diagram of the preferred embodiment of the invention. In this embodiment of an optimizing planermill a tilt hoist delivers the rough workpieces onto a smooth top transfer device. The smooth top transfer device delivers the rough workpiece to a lug loader which singulates the rough workpieces and places each rough workpiece into a lug space on the lug transfer. The rough workpieces are passed through a transverse workpiece interrogator where data about the rough workpiece's physical properties is collected. This data is transferred to the optimization system computer or computers where it is used to solve for and compute the unique optimized solution for each individual workpiece. The rough workpieces are deposited onto a short queuing station just upstream of the linear acceleration device. The linear acceleration device in conjunction with spiral roll transverse acceleration devices drives each workpiece towards the planer and against a reference straight edge. Each workpiece is transported towards the planer on a planer infeed transport device. Each workpiece passes through the planer where the most optimum finished workpiece is machined out of the rough workpiece using the optimized planing solution. The gap between successive workpieces necessary to allow the resetting of the guiding and/or cutting elements within the planer is established, monitored by workpiece sensing devices, controlled and/or corrected as the workpiece travels on the linear acceleration, planer infeed transport and planer feed devices. The finished workpieces exit the planer onto the planer outfeed and slowdown belts where they accumulate on a smooth transfer deck that feeds a lug loader. The lug loader singulates and loads the workpieces into lug spaces on a lug transfer. The lug transfer conveys the workpieces into the trimmer fence alignment area where the workpieces are aligned with the trimmer according to each individual workpiece's unique optimized solution. After the workpieces are aligned with the trimmer fence they travel through the trimmer where they are cut to the optimum length according to the individual workpiece's unique optimized solution. After being trimmed to length, the workpieces are even-ended before passing under a grade stamp or marker device where grade is marked on each individual workpiece according to the unique optimized solution for that workpiece. The workpieces now travel to a sorter device where they are sorted according to the unique optimized solution for each individual workpiece.

Alternative Embodiment

Linear Interrogation

Figure 5:
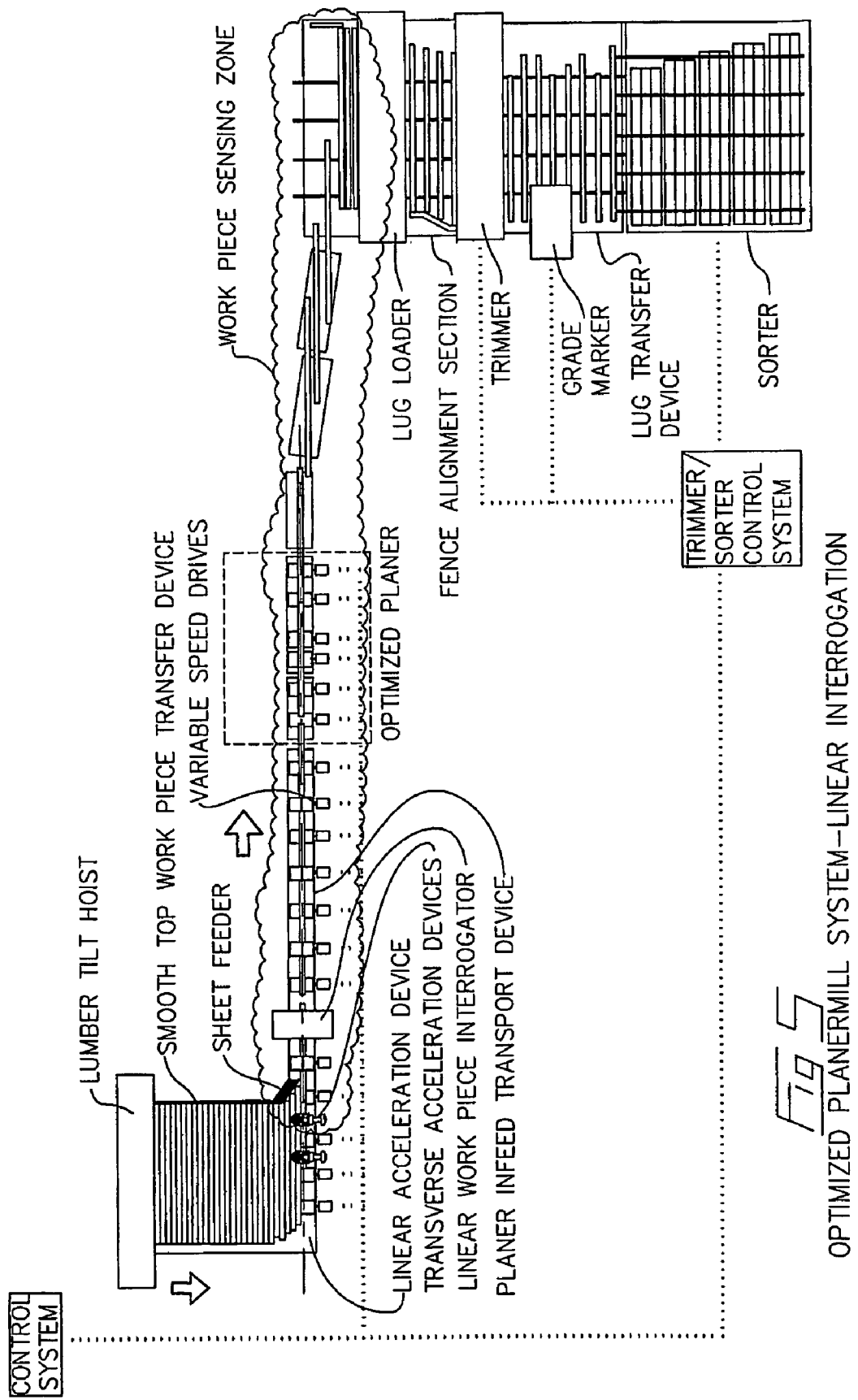
FIG. 5 is, in plan view, the optimized planermill system according to one embodiment of the present invention, using linear interrogation.

FIG. 5 shows an alternative embodiment of the invention that is similar to the preferred embodiment with the following exceptions. In this optimized planermill the rough workpieces are fed directly from the tilt hoist onto a smooth transfer that delivers the rough workpieces in basically a sheet of rough workpieces onto the linear and transverse acceleration devices. The workpieces are accelerated towards the planer onto a planer infeed transport device and through a linear workpiece interrogator where data about the rough workpiece's physical properties is collected. This data is transferred to the optimization system computer or computers where it is used to solve for and compute the unique optimized solution for each individual workpiece. The gap required between successive workpieces necessary to allow the resetting or repositioning of the guiding and/or cutting elements within the planer is established, monitored by workpiece sensing and, controlled and/or corrected as the workpieces travel on the linear acceleration, planer infeed transport and planer feed devices. Once the workpieces have traveled through the planer this embodiment is configured in the same way as the preferred embodiment.

Alternative Embodiment

Transverse and Linear Interrogation

Figure 4:
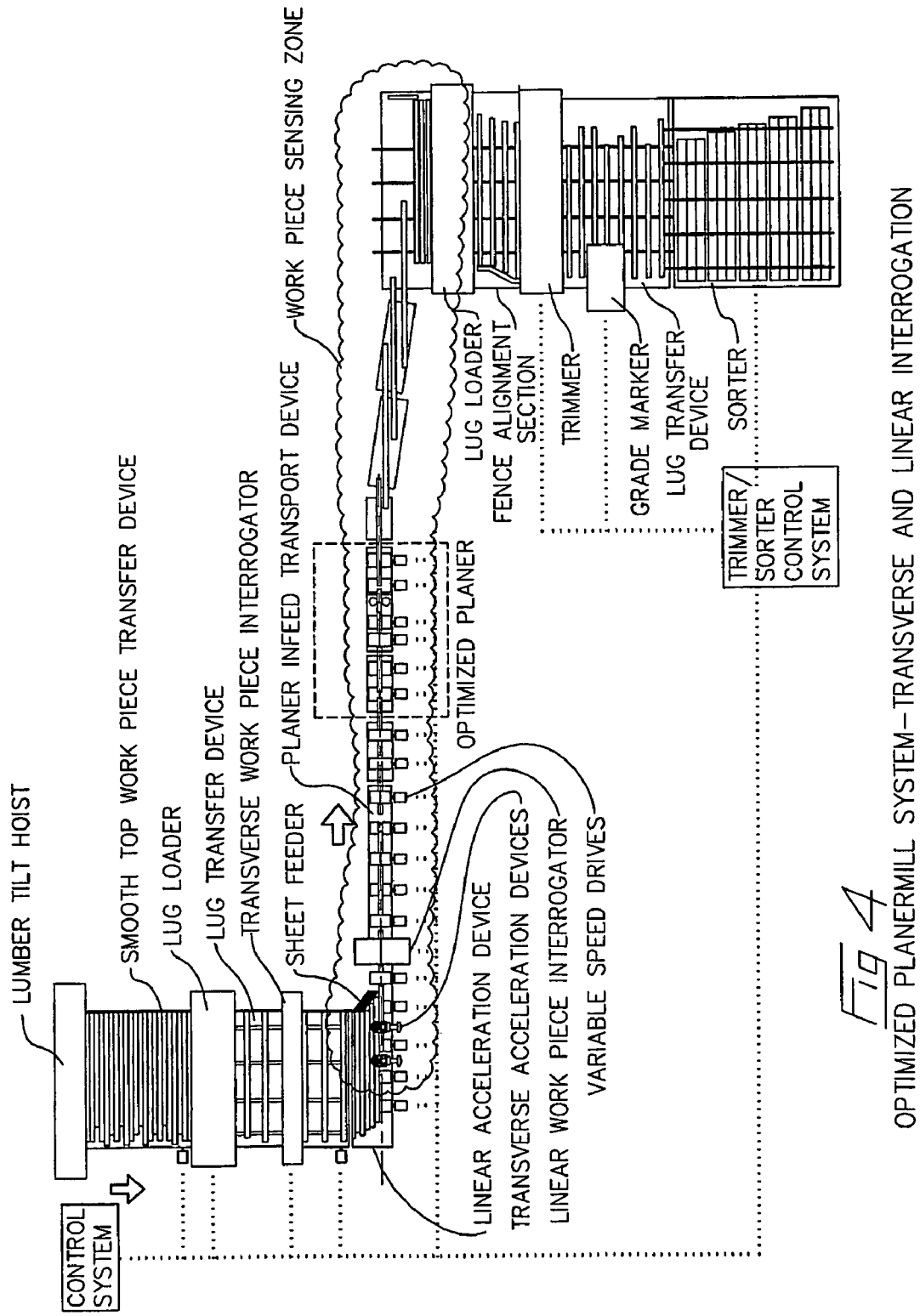
FIG. 4 is, in plan view, the optimized planermill system according to one embodiment of the present invention, using transverse and linear interrogation.

FIG. 4 shows an alternative embodiment that is similar to the previous two embodiments except that a combination of transverse and linear workpiece interrogators are used to collect data about the rough workpiece's physical properties. It may be advantageous to use both workpiece interrogators because some physical properties are sensed more effectively by one type of interrogator over the other. It may also be possible that by using both types of workpiece interrogators the required gap time between pieces and overall throughput of the system can be enhanced.

Alternative Embodiments

With the Addition of Post Planer Workpiece Interrogation

Figure 6:
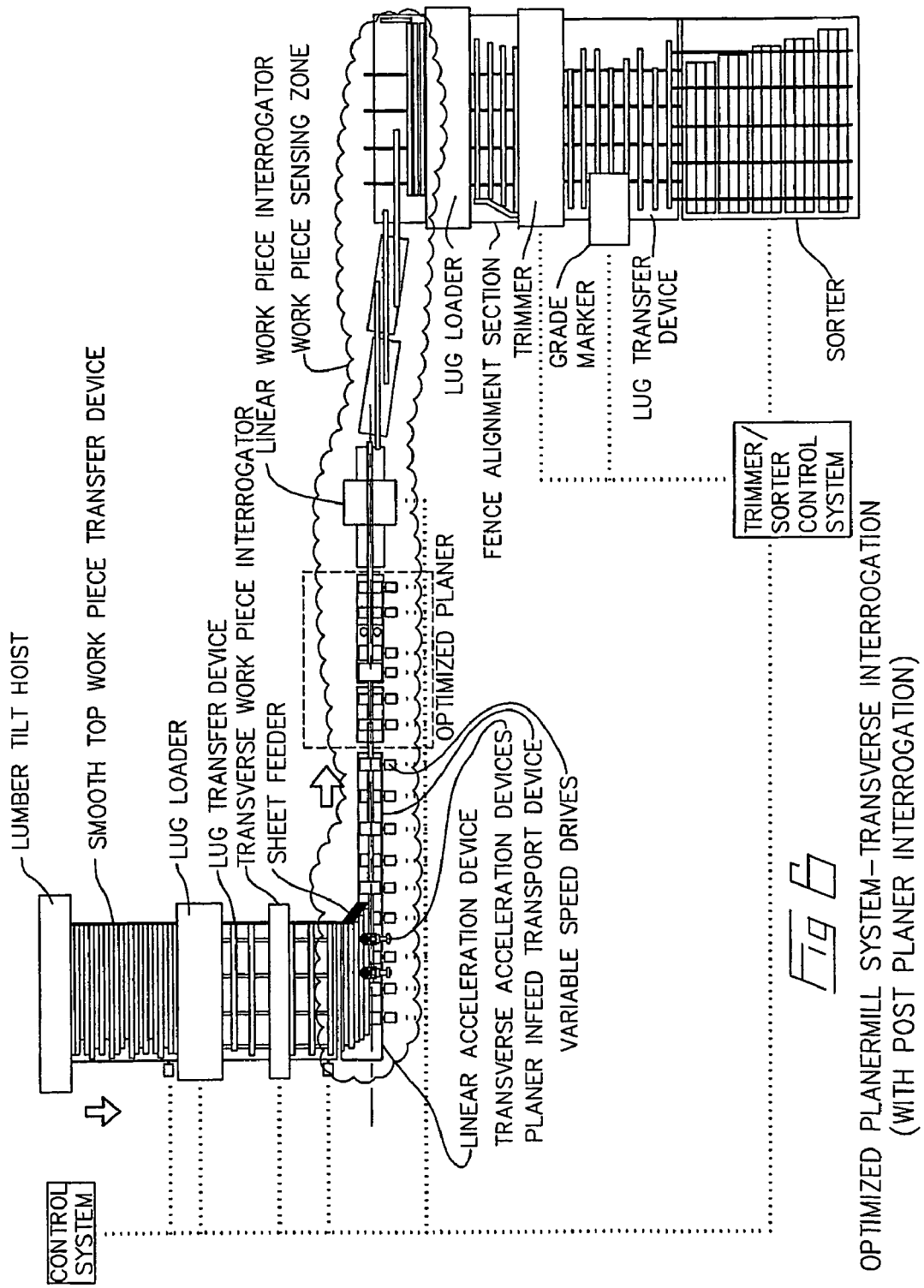
FIG. 6 is, in plan view, the optimized planermill system according to one embodiment of the present invention, using transverse interrogation with post-planer interrogation.
Figure 7:
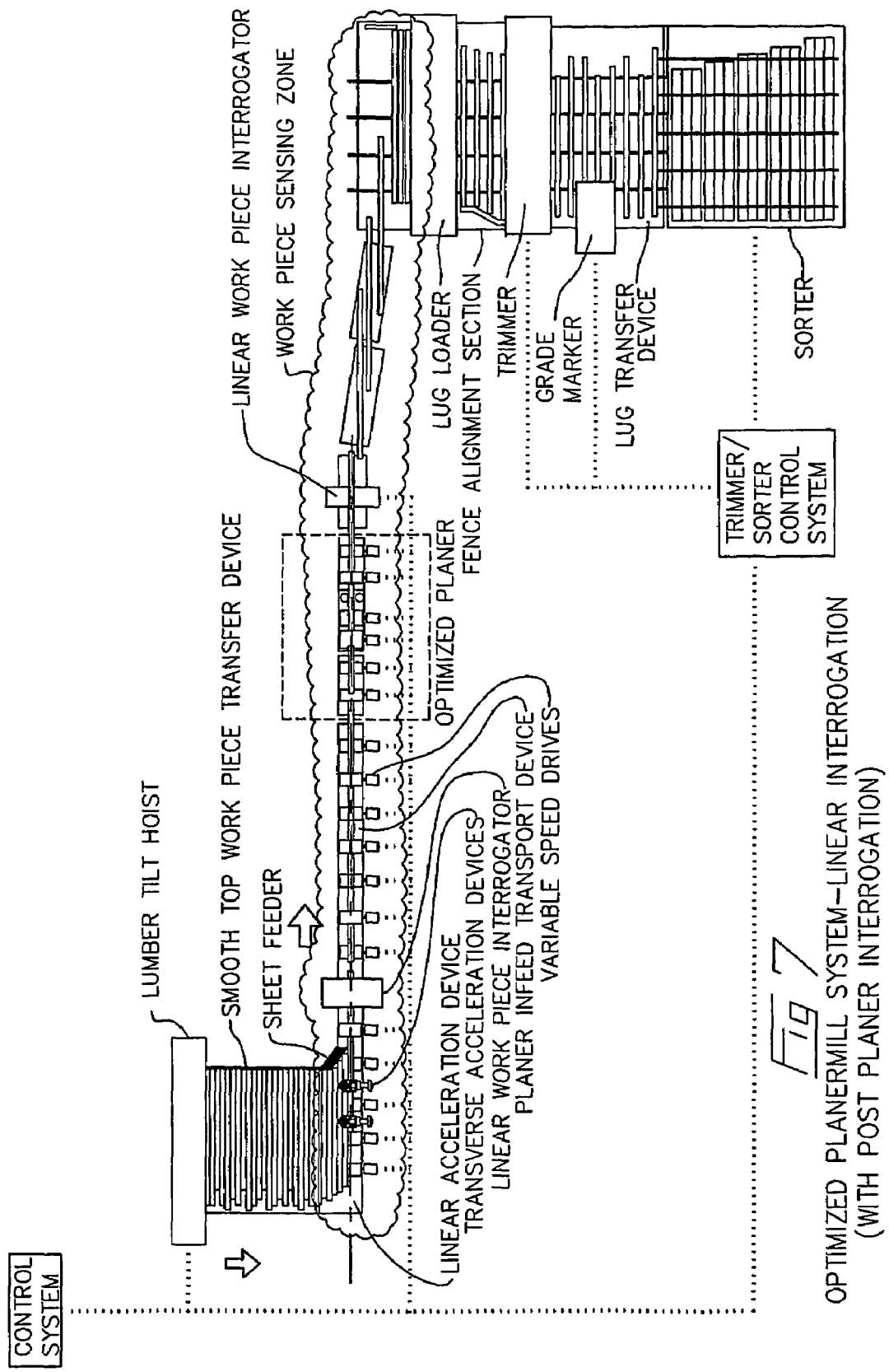
FIG. 7 is, in plan view, the optimized planermill system according to one embodiment of the present invention, using linear interrogation with post-planer interrogation.
Figure 8:
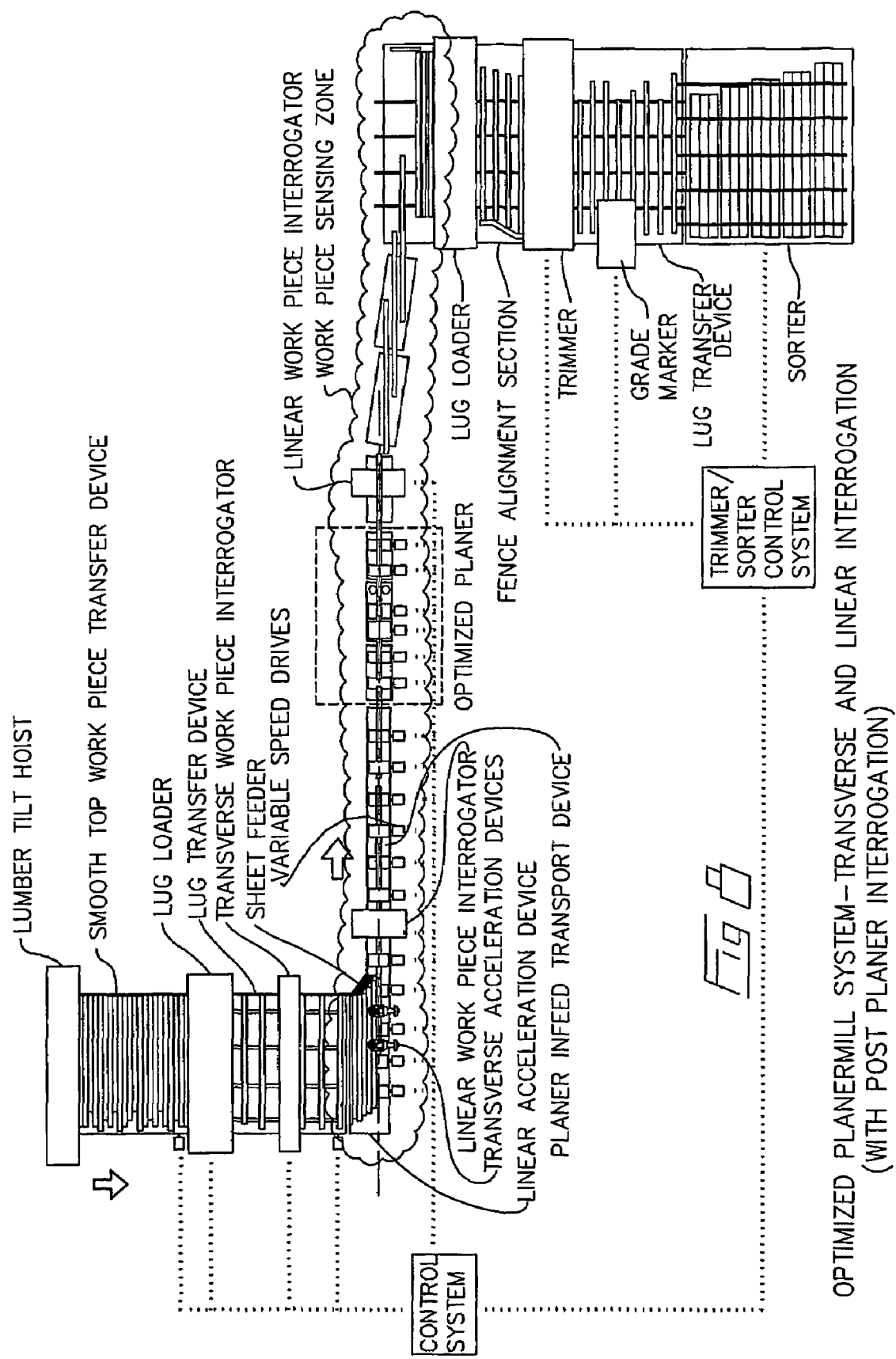
FIG. 8 is, in plan view, the optimized planermill system according to one embodiment of the present invention, using transverse and linear interrogation with post-planer interrogation.

FIGS. 6, 7, and 8 show alternative embodiments that use a workpiece interrogator located behind or downstream of the planer in addition to the upstream workpiece interrogator or interrogators. This workpiece interrogator located after the planer may be used as a feedback device to the optimization and control system allowing the system to compare actual finished workpiece physical properties to the predicted finished workpiece physical properties and make adjustments accordingly. In the event that the grade decision based on the rough workpiece's physical properties measured by the pre-planer workpiece interrogator or interrogators has a given level of uncertainty due to mis-scanning, conflicting data, excessive workpiece color variation, or any other reason, then the post-planer workpiece interrogator may be used to check and/or override the grade assigned to that individual workpiece. In addition, the workpiece interrogator located after the planer may also serve to measure and/or correct for guide and cutting tool wear over time.

Components, Component Variations, and Control Systems Within an Optimized

Planermill System

To understand better how an optimized planermill system works a more detailed understanding of each component and control system is needed.

Work Piece Interrogation

Work piece interrogation involves sensing all the physical properties necessary to obtain the unique optimized solution of each individual rough workpiece. Examples of workpiece interrogators might include, transverse (rough workpiece travels through interrogator transversely) workpiece interrogators, linear (rough workpiece travels through interrogator linearly) workpiece interrogators or a combination of transverse and linear workpiece interrogators. Work piece interrogators are made up of numerous sensors that may include at least one of the following: laser based geometric sensors, infrared sensors, x-ray sensors, dielectric sensors, vision systems including CCD array cameras, ultrasonic sensors, magnetic resonance systems, moisture sensors, density sensors, microwave sensors, optical encoders, Doppler Effect radar sensors, contact thickness, contact width gauges, etc. The sensed physical properties and defects of the rough workpieces might include, geometry, strength, density, surface hardness, surface roughness, moisture content, color variation, digital images, conductivity, dielectric constant, slope of grain, knot size, knot location, knot physical properties, growth ring geometry and characteristics, sap wood location, hart wood location, bow, twist, crook, cup, saw mismatch lines, wane, bark, pitch pockets, cracks, splits, shake, holes, decay, machine bite or marks, stain, etc.

A workpiece interrogator collects electronic data from all of the sensors associated with the physical properties of each incoming rough workpiece. This data is basically assembled in a packet or set of packets that is sent to the system optimization computer or computers. Each rough workpiece will have its own unique packet or packets of electronic data tagged to itself as it moves through the planermill system.

Calculating the Optimized Solution

The system optimization computer or computers receives these unique data packets and uses them with other programmed parameters associated with the system's physical constraints, product grading rules, current product pricing, current or projected order file, and/or other sales and market related information to solve for and compute a unique optimized solution based on the data for each individual rough workpiece.

The system's physical constraints as referred to above may include machine, component or sub-component specific information regarding how quickly these devices can respond to commands from the control system. In addition, the system's physical constraints may also include some or all of the information concerning:

the positioning limits of each machine, component or sub-component the maximum velocity of each machine, component or sub-component, and the maximum acceleration of each machine, component or sub-component.

For example, one physical constraint of an optimizing planer might be that an infeed positioning guide can only travel 0.625 inches side-to-side.

Product grading rules as referred to above may contain size specific information concerning the acceptable amount of a given defect for a given grade. For example, a #2 grade 2×8 piece of dimensional Southern Yellow Pine lumber that is 16 feet long is allowed ⅜ inch twist end-to-end.

The unique optimized solution or set of solutions for each individual rough workpiece will contain information on how to perform downstream processing including at least one of the following:

1. an optimized planer solution, and/or
2. an optimized trimmer solution, and/or
3. a final grade decision of the finished workpiece.

The unique optimized solution or set of solutions for each rough workpiece will contain the information necessary to process the rough workpiece through the optimized planermill converting the rough workpiece into the highest value finished workpiece possible. Specifically:

the optimized planer solution will contain the necessary information to control the position and/or velocity and/or acceleration of the guiding and cutting elements within the planer as the rough workpiece travels through the planer; and the optimized trim solution will contain the necessary information to control the position of the even-ending fence and the trim saws within the trimmer; and the optimized final grading decision will contain the necessary information to control the grade marking device along with the sorter device sorting the finished workpieces into the appropriate bins or trays.

The unique optimized solution or set of solutions for an individual workpiece is basically electronically attached to, and travels with, the workpiece as it moves through the planermill process. The data concerning the unique optimized solution for each individual workpiece moving through the planermill process may be shared with and compared to the data of adjacent workpieces for the purpose of maximizing production rates and establishing and/or controlling and/or correcting the gap between workpieces.

The information within the data packets that make up the unique optimized solution will be used throughout the process as the individual workpiece moves through the optimized planermill system. For example, the data concerning the control of the guiding and/or cutting elements within the planer will be used as the workpiece is moving though the planer. The data concerning the control of the even-ending or trimming fence will be used as the workpiece moves across the fence section just ahead of the trimmer. The data concerning the trimming of the workpiece and the control of the saws within the trimmer will be used as the workpiece moves through the trimmer device. The data concerning the final grade of the workpiece and the marking of the grade will be used as the workpiece moves through the grade marker or stamp device. The data concerning the final sorting of the workpiece will be used as the workpiece travels through the sorter device.

Work Piece Sensing

Work piece sensing is the sensing of the work piece's position and/or velocity and/or acceleration as the workpiece is being processed through the entire optimized planer system. Accurate workpiece sensing is critical for an optimized planermill to function properly since the data packet assigned to individual workpieces must follow or track the piece through the system. Examples of workpiece sensors may include, photo electric cells, photo proximity devices, laser based distance meters, laser interferometers, sonar devices, ultrasound devices, vision systems including CCD array cameras, encoders, light curtains, Doppler Effect devices and contact devices.

Computerized Process Control Systems

Computerized process control systems are made up of controls, control systems, and/or control algorithms that can receive data from various input devices, process the data, then use this data to control devices located in an optimized planermill system. Examples of these control systems may include programmable logic controllers (PLCs) such as those made by Allen Bradley of Rockwell Automation, personal computers, mini computers, embedded electronics, motion control systems, and any combination of these devices. Examples of process control system input devices include, other computerized process control systems, optimization system computers, database systems, computer network systems, workpiece sensing devices, linear position feedback devices, workpiece interrogation devices, operator input terminals, etc.

Examples of the types of functions performed by the process control system include, workpiece tracking, control of line speeds, control of information displayed on an operator display screen, control of guiding and/or cutting element positions within the planer and trimmer, and control of sorting gates within the sorter.

Gap Management

Throughput of an optimized planermill is highest if the gap time between each individual workpiece can be controlled through the planer. Preferably, this gap time should be held to the minimum required gap time, which is the time required for guiding and/or cutting elements within a planer to reposition between workpieces for the type of planer feeding system and control system being used. Gap control is achieved through combining mechanical systems with one or more of the following: workpiece interrogation, workpiece sensing, computer optimization and computerized process control systems.

There are basically three different practical methods of establishing and/or controlling and/or correcting the gap time between individual workpieces in an optimized planer infeed system. These three methods are:

Open-Loop, Non-Optimized Gap Control

The first method of gap control is open-loop, non-optimized control. This method involves knowing the minimum required gap associated with the mechanical constraints of the planer (the time it takes to move the guiding and cutting elements their farthest amount) then setting the gap between workpieces with fixed time base open loop control. Fixed time base open loop control is defined as an open loop gap control system having a fixed speed (meaning the speed is not automatically varied over time for the purpose of establishing and/or controlling and/or correcting the gap between workpieces). For example, if it is known that the minimum required gap for a given planer is 0.125 seconds, then the mechanical system feeding the planer would release the workpieces to feed into the planer with a 0.125 second plus a safety factor time of possibly 0.050 seconds gap between pieces. This method of gap control relies only on mechanical time based gapping. No workpiece sensing, computer optimization or computer process control are required for this method. Once the workpieces are gapped, there is no automatic gap monitoring or correction.

Closed-Loop, Non-Optimized Gap Control

The second method of gap control is closed loop, non-optimized control. This method also involves knowing the minimum required gap time associated with the mechanical constraints of the planer (the time it takes to move the guiding and/or cutting elements their farthest amount) and establishing and/or controlling and/or correcting the gap between workpieces with variable time based closed loop control. Variable time based closed loop control is defined as a closed_loop gap control system having a variable speed (meaning the speed is automatically varied over time for the purpose of establishing and/or controlling and/or correcting the gap between workpieces). For example, if it is known that the minimum required gap for a given planer is 0.125 seconds then the closed loop controlled mechanical system controls the planer infeed devices to establish and/or control and/or correct the gap to a target of 0.125 seconds between subsequent workpieces as they enter the planer. This method of gap control relies on one or more of the following, variable time based closed loop control as described above, workpiece sensing, and computerized process control.

Closed-Loop, Optimized Gap Control

Figure 9:
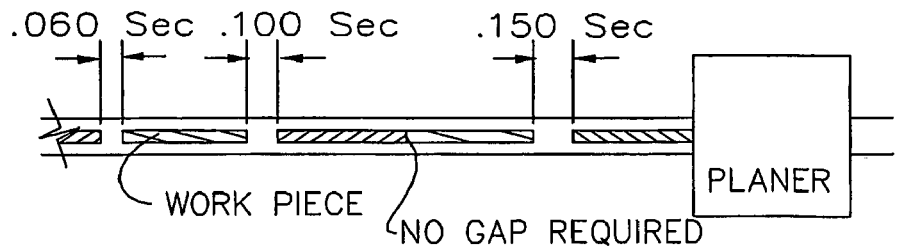
FIG. 9 is, in diagrammatic plan view, a simplified example of fully optimized gap control.

The third method of gap control is closed loop, optimized control. This method as outlined in the preferred embodiment of the optimized planermill involves determining the minimum required gap time from one individual workpiece to the next individual workpiece based upon predicting and/or calculating the actual time required to reposition the guiding and/or cutting elements within the planer between these workpieces, then establishing and controlling and/or correcting the gap between workpieces accordingly based upon this information. For example, if only a short repositioning movement is required between workpieces (0.025 seconds for example) then only a small gap would be established and/or controlled and/or corrected between those two incoming workpieces (a gap time of 0.025 seconds plus a safety factor). Alternatively, if a lengthy repositioning of guiding and/or cutting elements is anticipated between pieces (0.200 seconds for example) then a longer corresponding gap would be established and/or controlled and/or corrected between workpieces. This method of gap control relies on one or more of the following, variable time base closed loop control, workpiece sensing, computerized process control, and computer optimization. This method of controlling the gap between workpieces is also called fully optimized gap control. FIG. 9 shows a simplified example of this method.

Other gap control methods are conceivable but would not be as desirable and/or as practical as the three methods outlined above. For example, an optimized planer infeed system could employ open-loop optimized gap control where the minimum required gap time is determined from one individual workpiece to the next individual workpiece based upon predicting and/or calculating the actual time required to reposition the guiding and/or cutting elements between each workpiece within the planer (just as in the previously described method, closed loop, optimized control) then, simply establishing the gap between workpieces accordingly based upon this information—without controlling and/or correcting the gap over time.

Devices Used for Gap Optimization

Gap Optimization Control System

A gap optimization control system is the combination of workpiece sensing and computer algorithms performing the necessary computations in order to establish and/or control and/or correct the minimum required gap between workpieces feeding the planer.

Lug Loader

The lug loader is used to take the workpieces from the sheet of workpieces on the smooth transfer deck and place them into lug spaces on either a fixed or variable speed lug transfer.

Fixed Speed Lug Transfer

A fixed speed lug transfer is a conveyor made up of numerous strands of chain with lugs attached at fixed intervals to push the workpiece ahead and keep the workpieces singulated (traveling separately). The speed of this fixed speed lug transfer is set manually and is not varied automatically by the process control system to control and/or correct the gap between workpieces.

Variable Speed Lug Transfer Device

Figure 10:
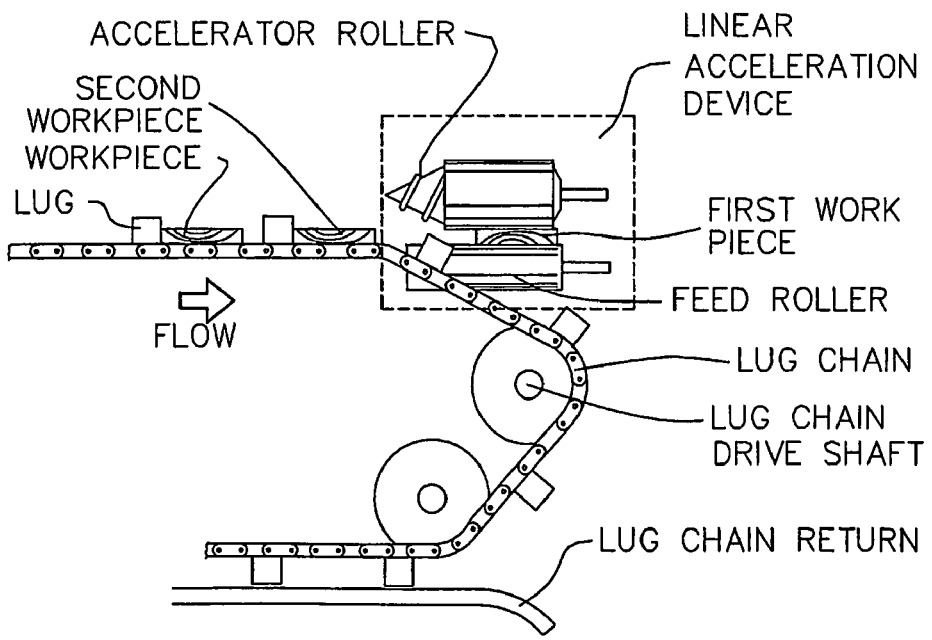
FIG. 10 is, in side elevation view, an example of a lug transfer device feeding workpieces with a linear acceleration device.

A variable speed lug transfer is the same as the fixed speed lug transfer described previously except that in addition to controlling the speed manually, the process control system may automatically vary the speed to establish and/or control and/or correct the gap between workpieces. The lugs on either the fixed or variable speed lug transfer may be roller lugs. FIG. 10 shows an example of a fixed speed or variable speed lug transfer device feeding workpieces onto a linear acceleration device.

Sheet Feeder Device

Figure 11:
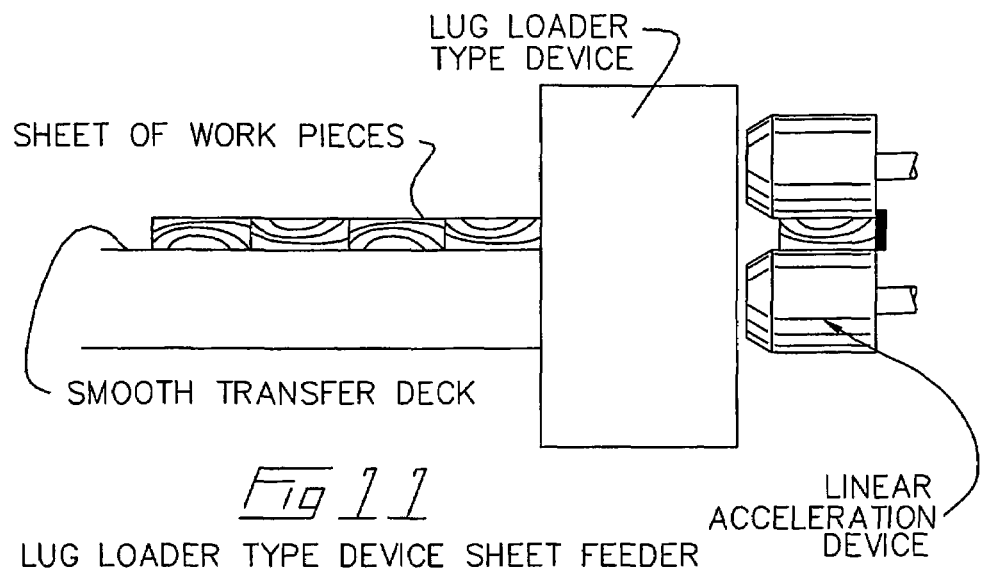
FIG. 11 is, in side elevation view, an example of a lug loader-type device sheet feeder.
Figure 12:
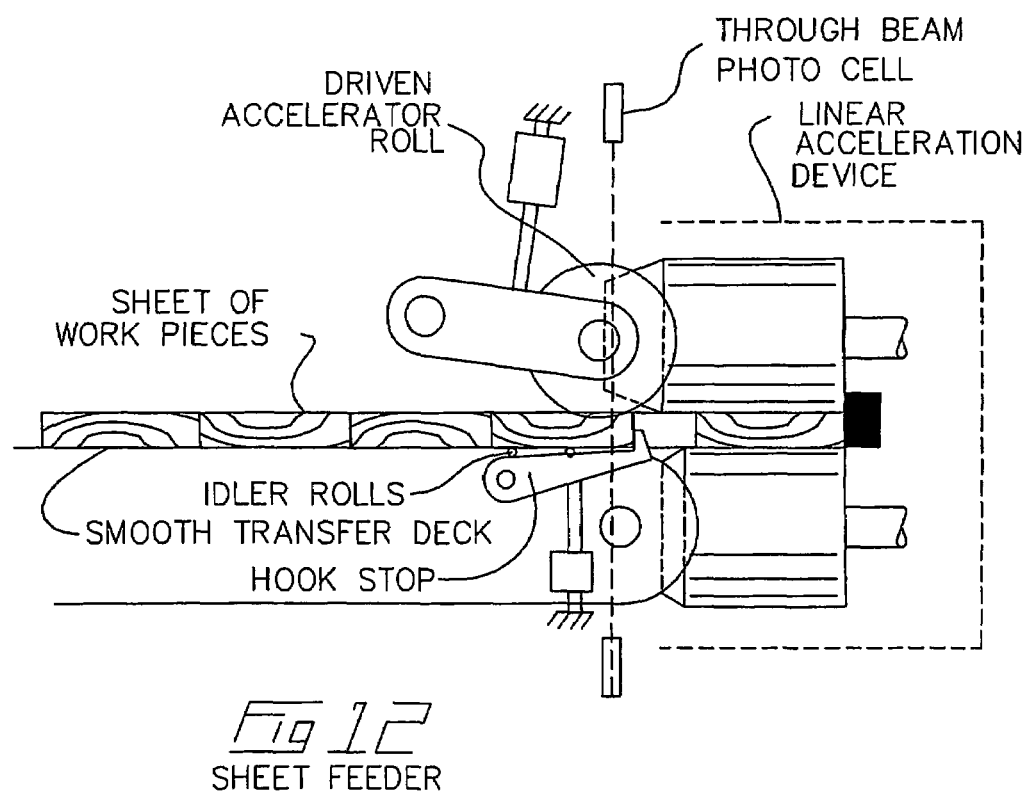
FIG. 12 is, in side elevation view, an example of a sheet feeder.

FIG. 11 shows one embodiment of a sheet feeder. A sheet feeder is any device that deals or feeds workpieces one at a time from a sheet of workpieces substantially butted together along the lengthwise edge of each workpiece onto a transverse acceleration device, vertical acceleration device, hopper feeder, or a linear acceleration device. The sheet feeder shown in FIG. 12 is comprised of a hook stop used in conjunction with an overhead transverse accelerator roll. In this example, the sheet feeder is controlled by the computerized process control system to feed workpieces one at a time onto the linear acceleration device. In this example the sheet feeder is controlled by the process control system using information received from the through beam photo electric cell to detect the leading and trailing edges of the workpieces. One can imagine many variations of this sheet feeder device. Examples of alternative sheet feeders are shown in FIGS. 13 through 16.

Figure 13A:
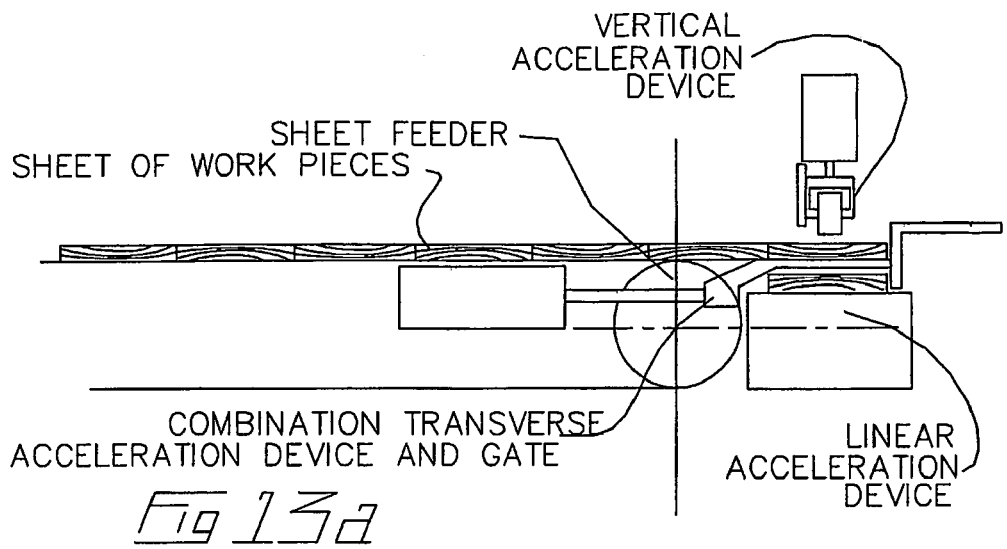
FIG. 13a is, in side elevation view, an example of a sheet fed transverse acceleration device combined with a vertical acceleration device and a linear acceleration device.
Figure 13B:
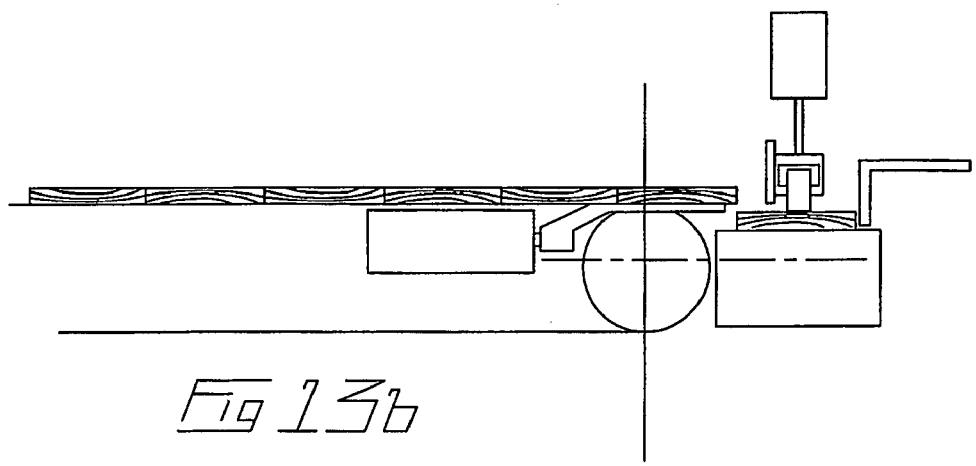
FIG. 13b is, in side elevation view, the devices of FIG. 13b with the workpiece dropped down against the linear acceleration device.

The sheet feeder in FIGS. 13a and 13b feeds the workpiece over the top of the piece being accelerated on the linear acceleration device. In this example, the sheet of workpieces is advanced towards the linear acceleration device as the previous workpiece is being accelerated. The next workpiece is in position and ready to be dropped or forced down against the linear acceleration device. This method of sheet feeding basically uses a vertical acceleration device to move the workpiece from the sheet to the linear acceleration device. This method could have advantages over methods that use more traditional acceleration devices because of the shorter maximum distance the workpiece must move from its position in the sheet to the linear acceleration device. This advantage could be greater with wider workpieces.

Figure 14A:
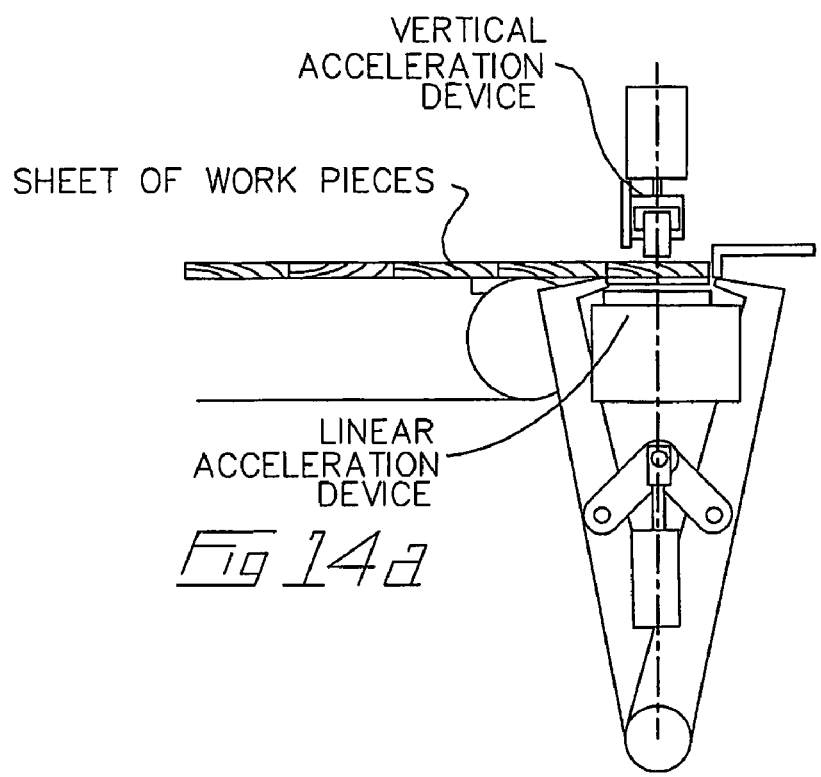
FIG. 14a is, in side elevation view, an example of an alternate sheet fed vertical acceleration device.
Figure 14B:
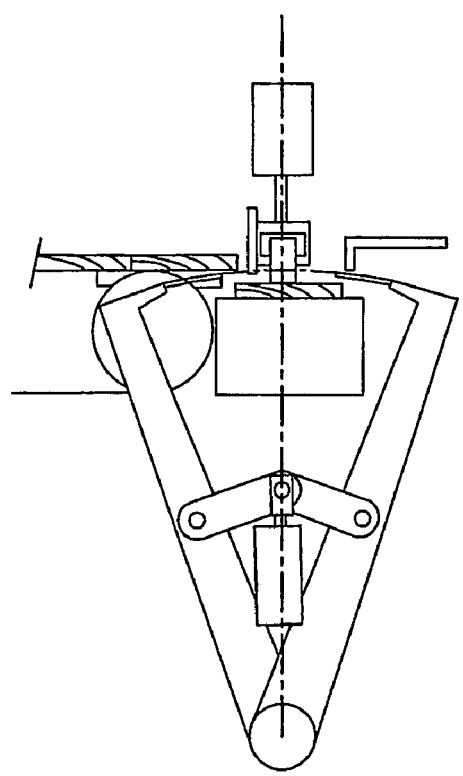
FIG. 14b is, in side elevation view, the device of FIG. 14a with the workpiece dropped down against the linear acceleration device.

FIGS. 14 and 14a show another example of a sheet feeder used in conjunction with a vertical acceleration device. In this example the method by which the incoming workpiece is supported above the workpiece on the linear acceleration device is different than that of the example shown previously in FIGS. 13a and 13b in that this hold-up device retracts from the center out instead of from one side out.

FIG. 15 shows an alternative sheet feeder device. In this example the sheet of workpieces advance a single workpiece over a hopper feeder. The hopper has multiple workpieces stacked vertically above a linear acceleration device. This particular linear acceleration device is a catapult type. In this example, the workpiece on the linear acceleration device is sitting on a roller bed of non driven rollers. The catapult cylinder shown at the far left end of the workpiece pushes the workpiece forward (right as shown) far enough for the workpiece to be engaged by a pair or multiple pairs of driven pinch rollers. These pinch rollers basically grab the workpiece and accelerate it out of the hopper. The workpiece that was positioned next in the stack now falls by gravity or is assisted with a vertical acceleration device down onto the roller bed of the linear acceleration device in position to be catapulted into the powered pinch rollers. The sheet feed advances the next workpiece into the hopper as the workpiece on the roller bed is being catapulted into the powered pinch rollers. It can be imagined that this sheet feeder/vertical hopper could be thought of as workpieces in a lug transfer with the lug space being the thickness of the workpieces. It is easy to imagine when accelerating workpieces out of a sheet fed hopper system that these workpieces could be capitulated transversely directly onto a linear acceleration device.

FIG. 16 shows another example of a sheet fed vertical acceleration device. This device is similar to the one in FIGS. 13a and 13b except the gate is positioned on the opposite side.

Fixed Speed Transverse Acceleration Device

Figure 17:
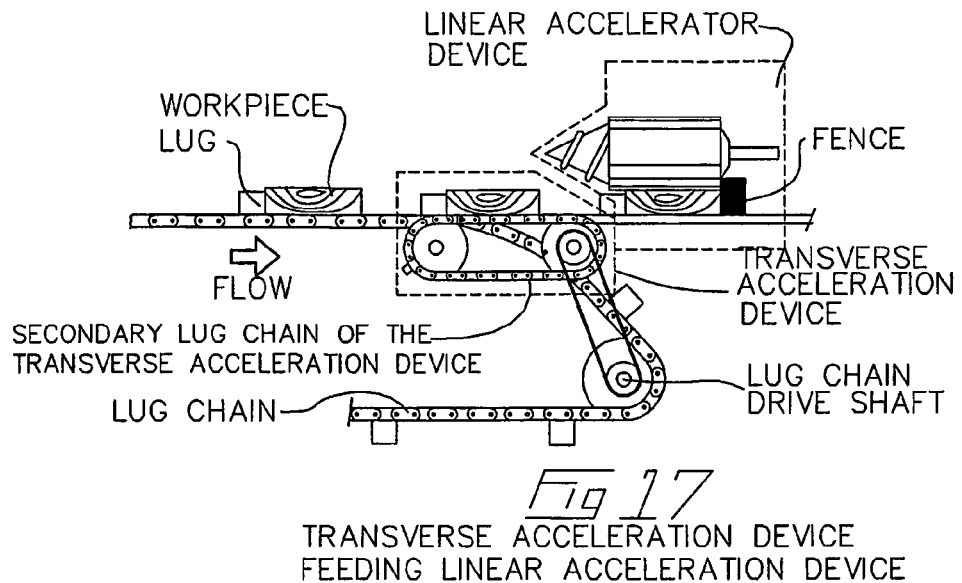
FIG. 17 is, in side elevation view, an example of a transverse acceleration device feeding a linear acceleration device.
Figure 18:
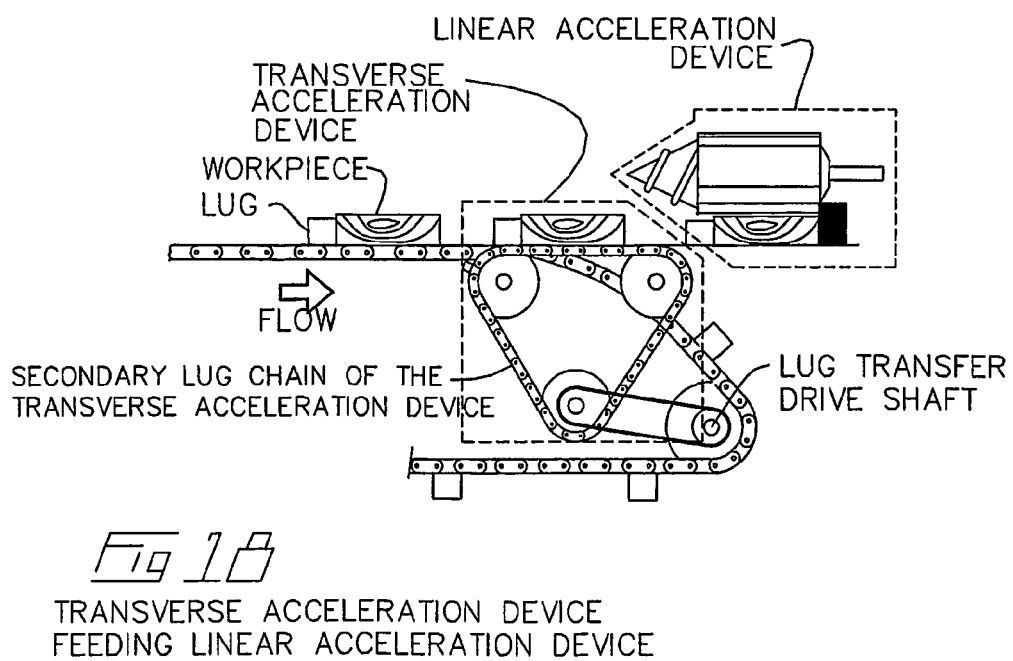
FIG. 18 is, in side elevation view, an example of a transverse acceleration device feeding a linear acceleration device.
Figure 19:
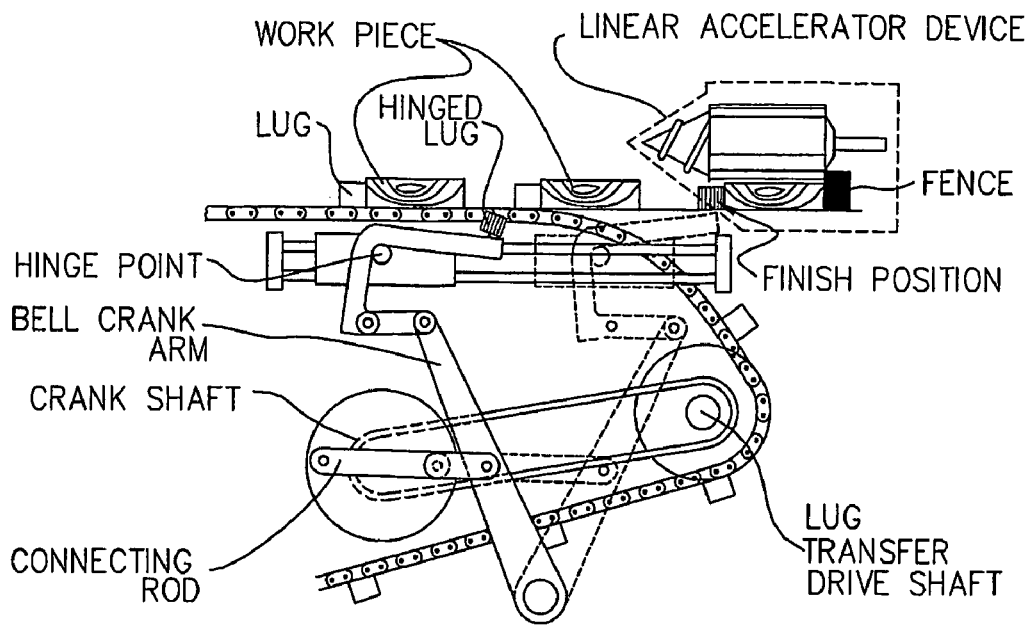
FIG. 19 is, in side elevation view, an example of a slider crank-type transverse acceleration device.

FIGS. 17, 18 and 19 show examples of fixed speed transverse acceleration devices. A fixed speed transverse acceleration device is any device that is geared to and driven from the drive of the lug transfer or sheet feeder that accelerates the workpiece away from the lug transfer or sheet feeder and delivers it to the linear acceleration device. In some instances it is necessary to use a fixed speed transverse acceleration device to more accurately set the gap. A transverse acceleration device will more accurately control the gap between workpieces and in some cases allow the setting of a shorter gap than can be achieved with only the lug chain pushing the workpiece into the linear acceleration device. FIG. 17 shows an example of how this works. In this example, the speed at the exit of the linear acceleration device is 1200 feet per minute (20 feet per second). The workpieces are 20 feet long and 12 inches wide and the minimum required gap between workpieces is 0.100 seconds. If the system runs at 100% capacity, the total number of workpieces fed in one minute will be 60 seconds divided by 1.1 seconds (feed time plus gap) or 54.5 pieces per minute. In the case of a fixed speed lug transfer with lugs spaced 18 inches apart the velocity of the lug chain would be 81.8 feet per minute (16.36 inches per second). The lug timing is such that the second workpiece is pushed by the lug transfer up next to the first workpiece. As the trailing edge of the first workpiece passes the leading end of the second workpiece, the second workpiece will be approximately 12 inches from the fence on the linear acceleration device. If the lug transfer alone pushes the workpiece over to the fence of the linear acceleration device it will take approximately 12 inches divided by 16.4 inches per second (lug transfer speed) or 0.733 seconds. The transverse acceleration device can reduce this time by pulling the workpiece away from the lug and rapidly pushing the workpiece over to the fence of the linear acceleration device. In this example, the minimum required gap time is 0.100 seconds and the actual gap time produced by the lug transfer is 0.733 seconds. Depending on the speed of the transverse acceleration device this actual gap time of 0.733 seconds can be reduced to near or equal to the minimum required gap time. The speed of the fixed speed transverse acceleration device is manually set and is not varied automatically by the process control system to establish and/or control and/or correct the gap between workpieces. The speed of the fixed speed transverse acceleration device is proportional to and dictated by the speed of the fixed or variable speed lug transfer device.

FIG. 17 shows a fixed speed transverse acceleration device that is driven by the same drive that drives the lug transfer. In this configuration, a secondary lug chain transfer with one single lug is driven off of the lug transfer drive through a 2:1 ratio speed up drive. In this case the lug space of the secondary lug chain is twice that of the lug space of the transfer. This single lug chain is timed with the lug transfer so that the single lug contacts the workpiece just as the lug on the lug transfer starts to drop down out of the feed path. Since the velocity of this lug is twice that of the lug transfer, it accelerates the workpiece away from the lug transfer onto the linear acceleration device, thereby reducing the actual gap time normally produced by the lug transfer by a factor of two. One can imagine, that by increasing the lug space (length) of the single lug secondary lug chain by any multiple of the lug space of the lug transfer and gearing the speed up drive by the same ratio, will proportionally reduce the actual gap time of the lug transfer by a factor equal to the ratio of lug transfer lug spacing to the secondary lug chain lug spacing.

FIG. 18 shows an alternative fixed speed transverse acceleration device. In this example the secondary single lug chain lug space is three times that of the lug space of the lug transfer. The gearing between the lug transfer and the secondary single lug chain is set up to be 3:1 speed up ratio causing the secondary single lug chain to run three times faster than the lug transfer. One can imagine many variations of this fixed speed transverse acceleration device using different mechanical means to accelerate the workpiece away from the lug transfer onto the linear acceleration device. FIGS. 19 through 22 illustrate alternate embodiments of fixed speed transverse acceleration devices.

FIG. 19 shows a slider crank fixed speed transverse acceleration device. In this example a sliding hinged lug is mechanically linked to the lug transfer drive through a crank shaft, connecting link, and bell crank arm mechanism. In this example, the gearing between the lug transfer drive shaft and the sliding hinged lug is such that the hinged lug travels one lug transfer lug space forward and back while the lug transfer travels one lug space. Therefore, the hinged lug travels the distance of one lug transfer lug space twice as fast as the lug transfer.

Figure 20:
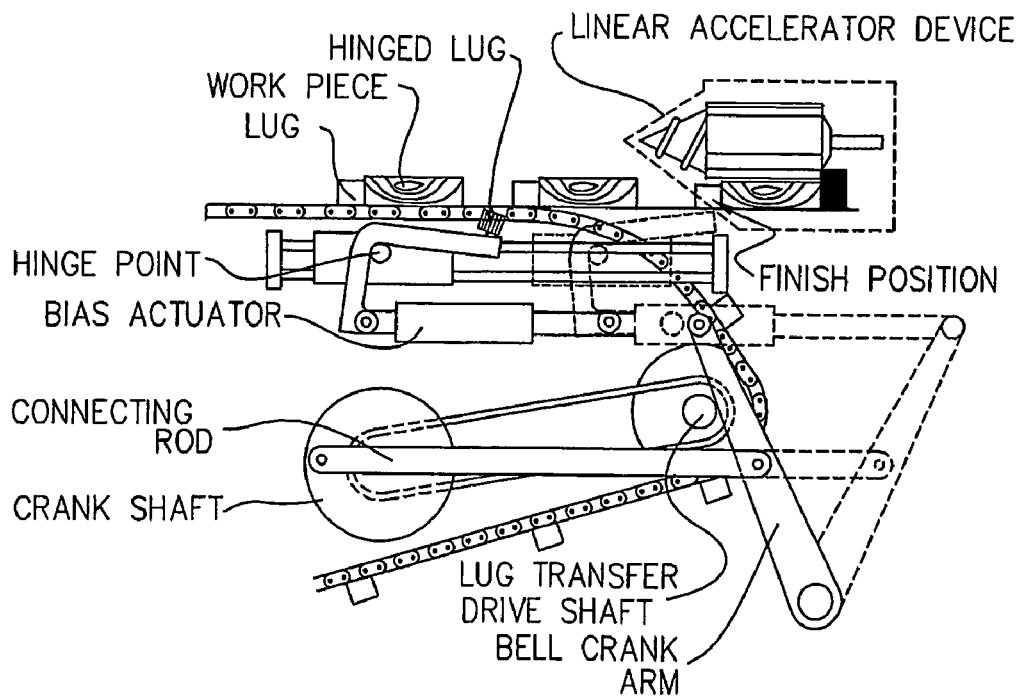
FIG. 20 is, in side elevation view, an example of a slider crank-type transverse acceleration device with adjustable start and stop points.

FIG. 20 shows basically the same slider crank fixed speed transverse acceleration device as that shown in FIG. 19 with one exception. The link between the bell crank arm and the hinged lug is not a fixed length but rather a variable length. By varying the length of this link, the start and stop positions of the hinged lug can be varied. This has an advantage over fixed start and stop points when it comes to running varying width workpieces. An example of this is if the start and stop points of the hinged lug are set to feed 12 inch wide workpieces onto the linear acceleration device then the stop point of the hinged lug would be approximately 12 inches plus a safety factor of 1 inch from the fence of the linear acceleration device (or 13 inches total). Now if 4 inch wide workpieces are fed with the same settings, the 4 inch wide workpieces would end up being placed 9 inches from the fence of the linear acceleration device. Varying the length of the connecting link between the bell crank arm and the hinged lug by 8 inches (8 inches shorter in this example) will move the start and stop points of the hinged lug 8 inches closer to the fence of the linear acceleration device. In this case the 4 inch wide workpiece would be positioned approximately 1 inch from the fence of the linear acceleration device. One can imagine that by varying the position of the secondary single lug chain assembly in FIGS. 17 and 18 that the final position of the workpiece relative to the fence of the linear acceleration device can be adjusted.

FIG. 21 shows an alternate embodiment of the fixed speed transverse acceleration device. In this example, a large wheel with a single lug is driven from the lug transfer drive through gearing with a ratio equal to the ratio of lug transfer lug space and the circumference of the wheel. In this example, the single lug wheel has a circumference equal to 8 times the lug transfer lug space. The velocity of the single lug is 8 times the velocity of the lug transfer lug. One can imagine placing two lugs 180° apart on the wheel and gearing the wheel to run 4 times faster than the lug transfer thereby slowing the speed of the wheel lugs to be 4 times faster than the lug transfer lugs. This accelerator lug can in this case be run two times faster than the lug transfer lugs. By placing the lugs on the wheel 90° apart and gearing the drive to run the peripheral speed of the wheel twice the speed of the lug transfer. Varying wheel circumference in multiples of lug transfer lug space and gearing the drive accordingly can yield many multiples of the speed ratio between the lug transfer and the wheel lug. In the example, an overhead hold down device is used to stabilize the workpiece.

FIG. 22 is an alternative embodiment of the wheel type transverse acceleration device. In this example, the wheel can be positioned right to left in order to adjust the final position of the workpiece relative to the fence of the linear acceleration device.

In all of the transverse acceleration devices shown in FIGS. 17 through 22 the goal is to position the workpiece as close to the fence of the linear acceleration device as possible. This positioning of the workpieces near the fence of the linear acceleration device is called far side referencing. That is because the side of the workpiece being positioned next to the fence or reference line of the linear acceleration device is the side of the workpiece furthest from the face of the positioning lug. One can imagine that it could be possible to position the near face of the workpiece relative to and a set distance from the fence or reference line of the linear acceleration device. This would be known as near side positioning. Near side positioning may be advantageous in some cases because the narrower workpieces do not have to be pushed all the way across to the fence of the linear acceleration device. If near side positioning is used, there is no need to vary the start and stop positions of the secondary lugs of the transverse acceleration device to compensate for various widths for workpieces.

Variable Speed Transverse Acceleration Device

A variable speed transverse acceleration device is any device that accelerates the workpiece away from the lug transfer lug and delivers it to the linear acceleration device that is not geared to and/or driven by the lug transfer drive. Any of the fixed speed transverse acceleration devices shown in FIGS. 17 through 22 could be changed to a variable speed transverse acceleration device if they are driven with a drive that is independent of the lug transfer drive. These drives that power the variable speed transverse acceleration device could be one or a combination of drive types, for example, fixed speed A.C. drive, variable speed A.C. drive including variable frequency and vector drives, fixed speed or variable speed D.C. drives, servo drives, stepper drives, hydraulic or pneumatic drives. A variable speed transverse acceleration device is used in conjunction with gap sensing and computerized process control to more accurately establish and/or control and/or correct the minimum required gap between pieces. For example, if a workpiece for some reason is caused to hesitate or accelerate slower that expected on the linear acceleration device, then a fixed speed transverse acceleration device could or would drive the next workpiece over into the path of the workpiece that hesitated on the linear acceleration device. This situation could be avoided by using a variable speed transverse acceleration device in conjunction with sensing and computerized process controls. When sensing detects the location of the trailing end of the first workpiece that is on the linear acceleration device to be in a position that can or will cause the second workpiece being positioned by the transverse acceleration device to collide with the first workpiece, then this sensing information working through the computerized process controls will be used to control the actual position and/or velocity and/or acceleration of the workpiece on the variable speed transverse acceleration device and in this example slow down or stop the transverse acceleration device for the second workpiece until the first workpiece is at a position and/or velocity and/or acceleration that will allow the continued transverse positioning of the second workpiece. The variable speed transverse acceleration device is used in both closed loop non-optimized and closed loop optimized gap control methods.

One can imagine many variations to the variable speed transverse acceleration device. Some examples for instance could be hydraulic linear actuators or multiple hydraulic linear actuators working in sequence to position the secondary lugs, ball screw or multiple ball screw actuators working in sequence to position the secondary lugs. Due to the extremely high velocities of the secondary lugs that may be necessary to set very short gaps, it may be necessary to use multiple secondary lugs all operating independently of one another or in a coordinated manner. While one group of secondary lugs is accelerating a workpiece onto the linear acceleration device the remaining group or groups of secondary lugs may be either setting in wait to accelerate the next workpiece or returning back to the start position from having just positioned a workpiece.

Fixed and Variable Speed Linear Acceleration Devices

FIGS. 10 through 22 show examples of fixed speed and/or variable speed linear acceleration devices. A linear acceleration device is any device that accepts a workpiece from, a lug transfer, fixed speed transverse acceleration device, variable speed transverse acceleration device, sheet feeder, drop feeder, hopper feeder, vertical acceleration device or other device, and accelerates the workpiece linearly (substantially along the length axis of the workpiece) towards the planer infeed and/or planer. Some examples of linear acceleration devices are: roller beds, roller beds used in conjunction with pinch rollers, linear chain conveyors, belt conveyors, catapults, lug chains, pusher lugs, end dog devices, lugged belts and air tables. A fixed speed linear acceleration device is any linear acceleration device that the speed of is manually controlled and is not automatically varied to establish and/or control and/or correct the gap between workpieces. Fixed speed linear acceleration devices can be utilized in all three gap control methods, open loop non-optimized, closed loop non-optimized, and closed loop optimized.

A variable speed linear acceleration device is any linear acceleration device that allows the instantaneous position and/or velocity and/or acceleration of the workpiece being accelerated to be automatically controlled. The linear motion characteristics (i.e. the instantaneous position and/or velocity and/or acceleration) of the workpiece on the variable speed linear acceleration device are controlled in conjunction with the sensing of the motion characteristics of the workpiece and neighboring workpieces, (workpieces that may be on the transverse acceleration device or workpieces that may be ahead of the workpiece that is on the linear acceleration device) the processing of the sensed data with the computerized process control system and acting upon the processing of this data though the drive of the variable speed linear acceleration device. Variable speed linear acceleration devices can be utilized in both the non optimized and optimized closed loop gap control methods.

Sheet Feeder and Vertical Acceleration Device Combinations

FIGS. 13a and 13b show an alternative sheet feeder/vertical acceleration device combination. In this example, the workpiece that is to be moved or positioned over the workpiece that is on the linear acceleration device can be accelerated transversely by the gate or shutter that holds the workpiece above the linear acceleration device. One can imagine many alternative ways to use sheet feeders and hopper feeders. For example the sheet could be on a steep incline using the force of gravity to advance the sheet and load the workpiece onto the linear acceleration device. An inclined sheet feeder could also use the force of gravity to load the hopper feeder. An inclined sheet feeder could feed a linear acceleration device that accepts and accelerates the workpieces in a vertical (wide sides vertical) or near vertical orientation.

Lug Transfer and Vertical Acceleration Device Combinations

Figure 23A:
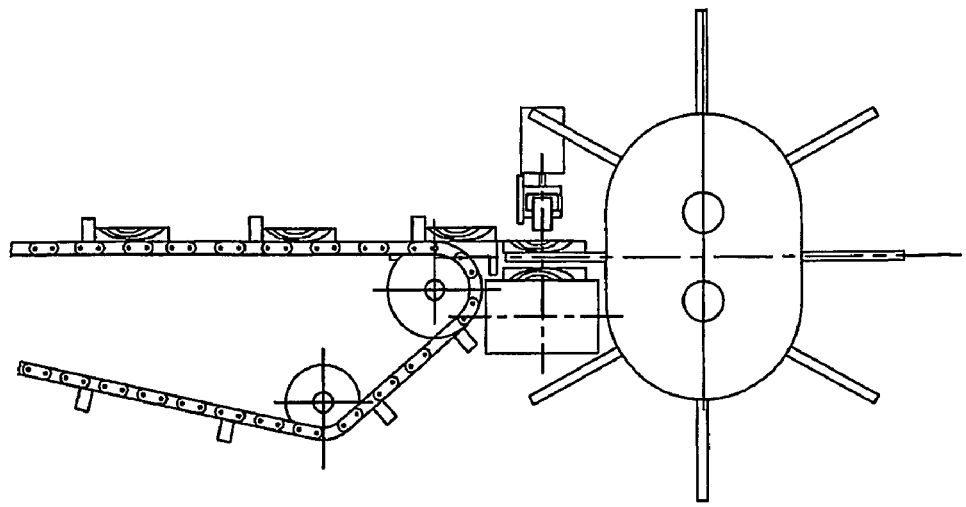
FIG. 23a is, in side elevation view, an example of a lug transfer combined with a continuous, indexible support arm vertical acceleration device.
Figure 23B:
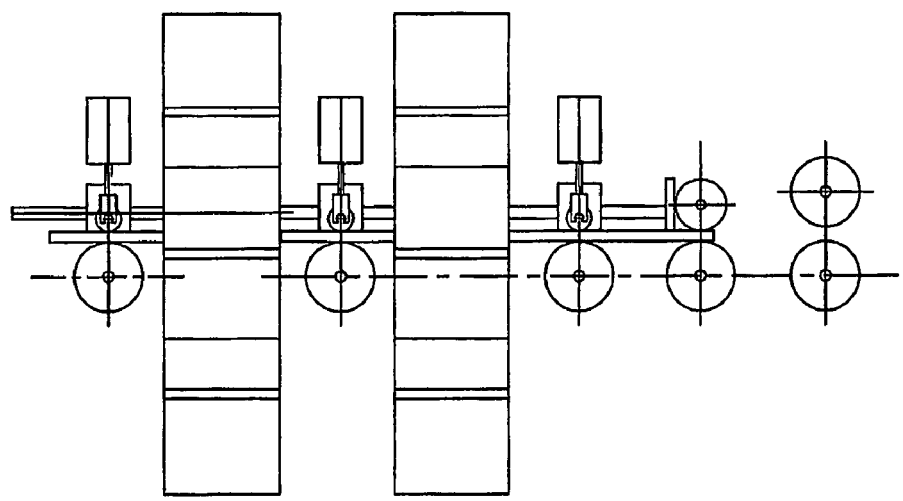
FIG. 23b is, in side elevation view, the device of FIG. 23a showing a workpiece clamped by pinch rollers to the bed of the linear acceleration device.
Figure 30:
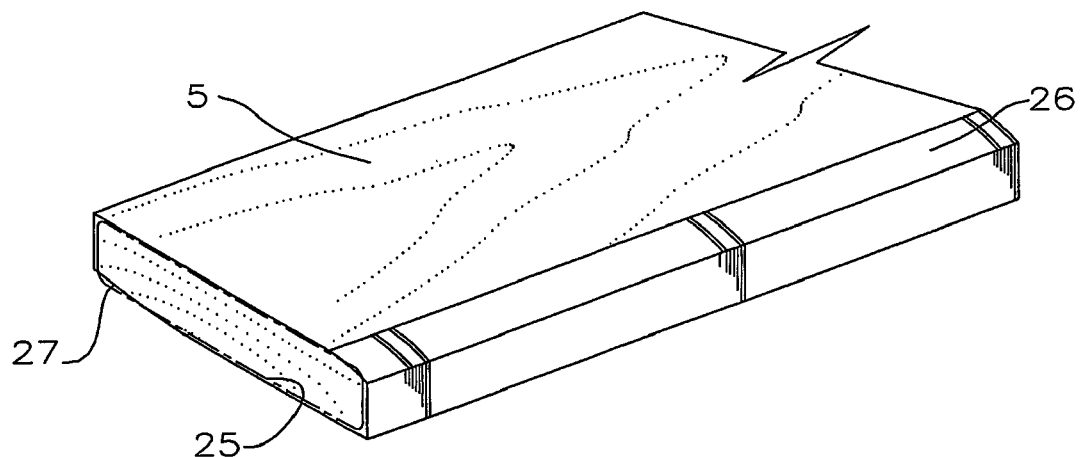
FIG. 30 is, in perspective view, a rough workpiece prior to non-optimizing planing.
Figure 31:
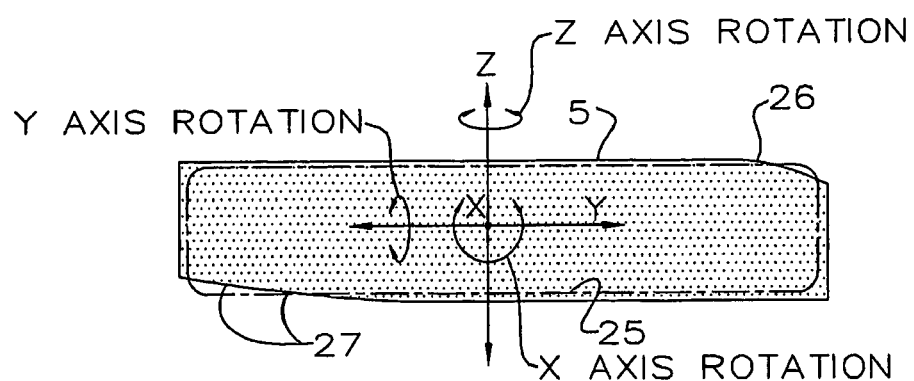
FIG. 31 is, in elevation view, the workpiece of FIG. 30 and illustrating the defects, non-optimized target profile and principal axes of the workpiece.
Figure 32:
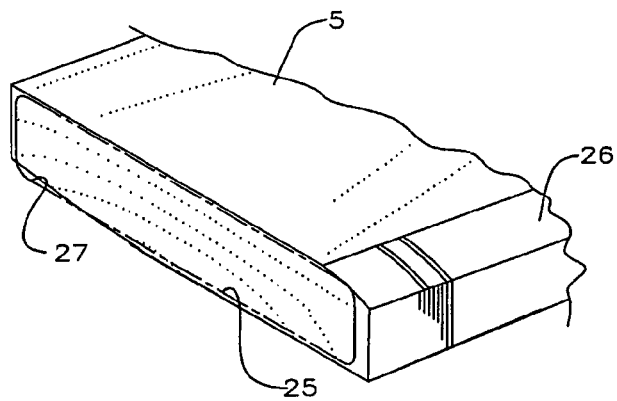
FIG. 32 is an enlarged portion of the workpiece of FIG. 30.

FIGS. 23a and 23b show an alternative method of combining a lug transfer with a vertical acceleration device. In this example the lug transfer loads the workpieces onto a bed of support arms that hover over the workpiece that is being accelerated on the linear acceleration device. When the trailing end of the workpiece being accelerated on the linear acceleration device is detected to be in a location at or near the leading end of the workpiece hovering above on the support arms of the vertical acceleration device, the support arms of the vertical acceleration device will index down placing the next workpiece onto the linear acceleration device. As the support arms index down, the next set of support arms move into position to get loaded with the next workpiece from the lug transfer and hover this workpiece above the linear acceleration device until it is time to index it down to the linear acceleration device.

One can imagine many combinations of the continuous indexible support arm device shown in FIG. 23. In this figure the continuous indexible support arm device places the workpiece onto the bed of the linear acceleration device and continues to index as the pinch rollers clamp the workpiece to the driven bed of the linear acceleration device assisting in accelerating the workpiece. Another application of the continuous indexible support arm might involve loading one or more support arms with workpieces above the hover position. Another variation might involve placing the support arms closely adjacent to one another and loading the workpieces from a lug transfer or sheet feeder located on the side of the continuously indexible support arm device that is opposite to the side that the linear acceleration device is located. These workpieces would be carried over the top of the indexible support arm device in what would be considered a loaded magazine style. The workpieces could be loaded onto alternating support arms from both sides simultaneously. All of the before mentioned sheet feeders, vertical acceleration devices, hopper feeders, catapults, pinch roller accelerator devices, and continuously indexible support aim devices can be used with or without workpiece sensing, computerized process control and computer optimization, or computer gap optimization. These devices can be combined and configured to work in and provide any of the three methods of gap control, open loop non optimized, closed loop non-optimized, and closed loop optimized.

Fixed Speed Planer Infeed Transport Device

A fixed speed planer infeed transport device is any device that accepts a workpiece generally linearly along the length axis of the workpiece from at least one and possibly multiple linear acceleration devices and conveys or transports the workpieces from the linear acceleration device or devices to the infeed end of the planer. This fixed speed planer infeed transport device could be constructed of one or more of the following subcomponents for example: a powered roller bed, a powered roller bed with overhead pinch rollers, a chain bed, a chain bed with overhead pinch rollers, a roller bed or belt conveyor or chain bed or air table with an overhead powered pinch belt or rolls. The fixed speed planer infeed transfer device can be oriented in either the vertical or horizontal plane (or some other angle). The speed of the fixed speed planer infeed transport device is varied manually meaning the speed is not varied automatically by the process control system in an effort to establish and/or control and/or correct the gap between workpieces.

A fixed speed planer infeed transport device may be used with any of the three methods of gap control, open loop non optimized, closed loop non-optimized, and closed loop optimized gapping. Not all workpiece gapping planer infeed systems require a fixed or variable speed planer infeed transport device. It is conceivable to feed the planer directly from one or more linear acceleration devices configured in parallel or series.

Variable Speed Planer Infeed Transport Device

A variable speed planer infeed transport device is any device that can be described and used as a fixed speed planer infeed transport device except that the speed of all or part of this device can be controlled automatically to establish and/or control and/or correct the gap between workpieces. FIG. 24 shows an example of a variable speed planer infeed transport device being used in a system along with a sheet fed linear acceleration device, and a linear workpiece interrogator. In this example, the workpieces are fed onto the variable speed planer infeed transport device basically butted end-to-end. The position and/or velocity and/or acceleration of the workpieces is detected by sensors placed generally along the length of the variable speed planer infeed transport device. This sensed workpiece information is in turn used by the computerized process control system to control the speed of part, all, or multiple parts of the variable speed planer infeed transport device to establish and/or control and/or correct the minimum required gap.

FIG. 25 shows a more detailed version of the variable speed planer infeed transport device being used in conjunction with a sheet fed variable speed linear acceleration device and a linear workpiece interrogator. In this example, the variable speed planer infeed transport device is a roller bed with pinch rollers located directly above the rolls in the roller bed. The rolls in the roller bed are each driven independently by their own variable speed drive device. In this example, there are multiple workpieces being transported simultaneously on the variable speed planer infeed transport device. The instantaneous position and/or velocity and/or acceleration of each workpiece are sensed by workpiece sensors placed generally along the length of the infeed transport device. This sensed data is fed into the computerized process control system and is used to calculate and solve for the required velocity and/or acceleration of each individual roller on the variable speed planer infeed transport device. The computerized process control system outputs commands to each variable speed drive driving the individual rollers and directs them to control the instantaneous velocity and/or acceleration of that roller. The minimum required gap is dynamically established and/or controlled and/or corrected in an ongoing fashion as the workpieces are being transported on the variable speed planer infeed transport device. In this example the sheet fed variable speed linear acceleration device is also a roller bed device with variable speed drives on each individual roller. The instantaneous velocity and/or acceleration of these rollers are also controlled by the computerized process control system to establish and/or control and/or correct the minimum required gap between workpieces. This is an example of the second method of gap control, closed loop non-optimized where the minimum required gap is a constant depending upon the maximum time it takes to reposition the guiding and/or cutting elements within the planer.

FIG. 26 shows an example similar to that of the example shown in FIG. 25 except that this example shows the third method of gap control, closed loop optimized gap control. In this example, the variable speed planer infeed transport device is used in conjunction with a sheet fed variable speed linear acceleration device and a linear workpiece interrogator. The variable speed planer infeed transport device is a roller bed with pinch rolls located directly above the rollers in the roller bed. The rolls in the roller bed are each driven independently by their own variable speed drive device. In this example, the minimum required gap will be determined by the actual predicted time that is will tale for the repositioning of the guiding and/or cutting elements within the planer. The linear workpiece interrogator collects data on each workpiece as it travels through the linear workpiece interrogator. This data is used by the workpiece optimization system to solve for the most optimum position of the guiding and/or cutting elements within the planer. Knowing the position of the guiding and/or cutting elements within the planer at the trailing end of one workpiece and knowing the required position of the guiding and/or cutting elements within the planer at the leading end of the next workpiece, the actual time that it takes to move the guiding and/or cutting elements from one position to the next can be very accurately predicted and controlled. It is this predicted and/or controlled time that it takes to move from one position to the next that establishes the minimum required gap. In this case this minimum required gap between any two workpieces is not know until both of the workpieces have passed through the linear interrogator. The computerized process control system uses this predicted minimum required gap information in conjunction with sensed workpiece instantaneous position and/or velocity/and/or acceleration information to solve for and control the velocity and acceleration of each individual roller (or a zone or a multitude of separate zones) in the variable speed linear acceleration device and the variable speed planer infeed transport device to dynamically establish and/or control and/or correct the minimum required gap between workpieces. This is a dynamic process in which the workpiece position is constantly sensed and the velocity and acceleration of each individual workpiece is constantly updated and controlled in a manner to:

establish the minimum required gap as the workpieces are being transported, continually monitor and control the established minimum required gap and continually make corrections to maintain the minimum required gap.

One can imagine many variations of optimized dynamic gapping using a variable speed planer infeed transport device in combination with other devices. For example, a variable speed lug transfer with a variable speed transverse acceleration device used in conjunction with a fixed speed linear acceleration device and a variable speed planer infeed transport device all used in conjunction with a transverse workpiece interrogator can be controlled in a manner that allows the establishment of, the control of and the ongoing continuous correction of the minimum required gap. For example, the predicted minimum required gap between workpieces is known after the workpieces are passed through the transverse workpiece interrogator and while they are still on the variable speed lug transfer. The variable speed lug transfer in conjunction the variable speed transverse acceleration device will control the flow of workpieces onto the fixed speed linear acceleration device. The fixed speed linear acceleration can be running at a speed greater than the speed required to feed the workpieces with zero gap. This speed to feed the workpieces with zero gap in this case is the speed of the fixed speed planer. The flow of workpieces to the fixed speed linear acceleration device is modulated by controlling the speed of the variable speed lug transfer and the variable speed transverse acceleration device. The position and/or velocity and/or acceleration of each workpiece is continuously sensed as they are delivered to the variable speed planer infeed transport device from the fixed speed linear acceleration. The minimum gap time between workpieces may have been established by the modulation of the variable speed lug transfer and variable speed transverse acceleration device as the workpieces were fed onto the fixed speed linear acceleration device. If so or even if not so, the position and/or velocity and/or acceleration of each individual workpiece is continuously sensed as it travels on the variable speed planer infeed transport device. The computerized process control system will continuously update the velocity and/or acceleration of each individual roller in the variable speed planer infeed transport device to ensure that the minimum required gap is established and/or controlled and/or corrected for each individual workpiece as it is being fed into the fixed speed planer.

Variable Speed Planer Used for Gap Optimization

A variable speed planer is a planer that has its speed controlled automatically by the computerized process control system in an effort to maximize throughput and establish and/or control and/or correct the minimum required gap between workpieces.

Additional Gap Optimization Strategies

In a closed loop optimized planer infeed system it is possible for the computerized process control system and/or the workpiece optimization system to determine a predicted workpiece trim decisions through the use of sensing devices prior to planing. A trim decision is the decision to trim a workpiece after planing to its optimum length, cutting off defective or unwanted material from one or both ends of the workpiece. The trim decision information for each workpiece once fed to the process control system can then be used to reduce and/or eliminate the minimum required gap time by allowing the guiding and/or, cutting elements to reposition while they are in the area of the workpiece designated to be trimmed. This is illustrated in FIG. 27. Essentially the process control system will direct the planer's guiding and cutting elements to reposition while machining within a given workpiece. The repositioning will most likely cause a planing defect in the area of the workpiece designated to be trimmed off and discarded.

Optimized Planer Infeed System Combinations

There are many combinations of planer infeed system components that can be configured to operate as a gap producing planer infeed system. Some examples may be:

The sheet fed fixed speed linear acceleration device in combination with a fixed speed planer infeed transport device and a fixed speed planer is one possible combination. In this example, the fixed speed linear acceleration device is set to run slower than the fixed speed planer infeed transport device so that the workpieces are accelerated away from the fixed speed linear acceleration device by the fixed speed (high speed) infeed transport device. The amount of gap that is established between workpieces is dependent upon the speed difference between the two devices. This is an example of open loop non optimized gapping.

A sheet fed fixed speed linear acceleration device in combination with a variable speed planer infeed transport device and a variable speed planer. In this example, the fixed speed linear acceleration device is set at a speed necessary to feed a certain number of workpieces per unit of time. The variable speed planer infeed transport device working in conjunction with the variable speed planer are controlled to run at speeds and accelerations that establish and/or control and/or correct for the minimum required gap between workpieces. Work piece sensing along with computerized process controls would be used in this example of closed loop non optimized gapping.

One can imagine that by adding a linear workpiece interrogator and change to a variable speed linear acceleration device in the configuration in the previous example, and determining the minimum required gap between each individual workpiece, the system could be changed from a non optimized system to a fully optimized system.

Another example may be, a lug loader feeding a variable speed lug transfer that feeds a variable speed linear acceleration device that feeds a variable speed planer infeed transport device feeding a variable speed planer. This combination along with a transverse workpiece interrogator, workpiece sensing, computerized process controls and workpiece optimization could be configured to operate as a closed loop optimized system.

There are many more combinations of planer infeed devices that can be set up and controlled to operate as gapping infeed systems. The matrix of combinations shown in FIG. 28 is a representative list of many but not all possible combinations of devices. The fact that many combinations exist does not diminish the uniqueness or the importance of this invention.

Maximizing Throughput

The production speed of the devices leading up to the planer may respond to the control system in such a way as to optimize overall planermill profitability by balancing production speed increases with information contained within the control system regarding how quality and yield are effected as production speeds are changed. The information correlating production speed with the resulting quality and yield of finished workpieces may either be retrieved from actual real-time measurement of quality and yield after the planer through workpiece interrogation or from historical data stored within the control system or associated databases.

Optimized Planer System

An optimized planer receives and responds to information from the process control system corresponding to an individual workpiece on how to most optimally position and reposition the desired cross-sectional profile during the planing operation based on the characteristics of the incoming rough workpiece. This set of control instructions sent to the planer is called the optimized planing solution.

FIG. 29 shows examples of typical cross-sectional geometric profile defects found in workpieces being fed into a planer. In reality workpieces fed to a planer will typically have a combination of these defects.

Figure 33:
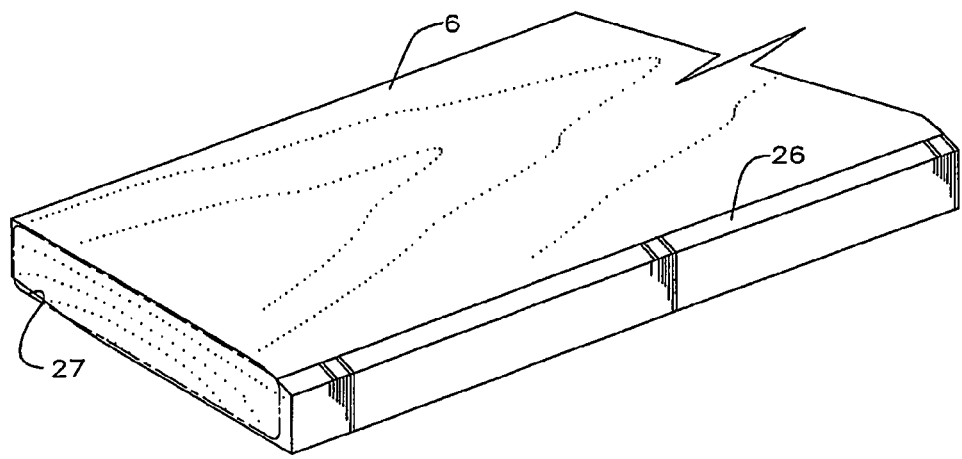
FIG. 33 is, in perspective view, the finished workpiece following the non-optimized planing of the workpiece of FIG. 30.

FIGS. 30 through 36 show an example of a single rough workpiece with two common shape defects found on material entering a planer. This example workpiece has both wane and wedge defects running its length. The desired cross-sectional profile is shown. FIGS. 30 through 33 depict the planing operation with a conventional non-optimized planer where the desired cross-sectional profile is located in a fixed position within the workpiece. FIG. 33 shows the finished workpiece retaining the wane and wedge defects.

Figure 34:
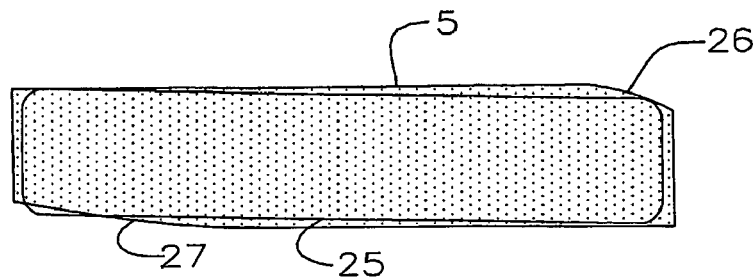
FIG. 34 is, in elevation view, a rough workpiece prior to optimized planing.
Figure 35:
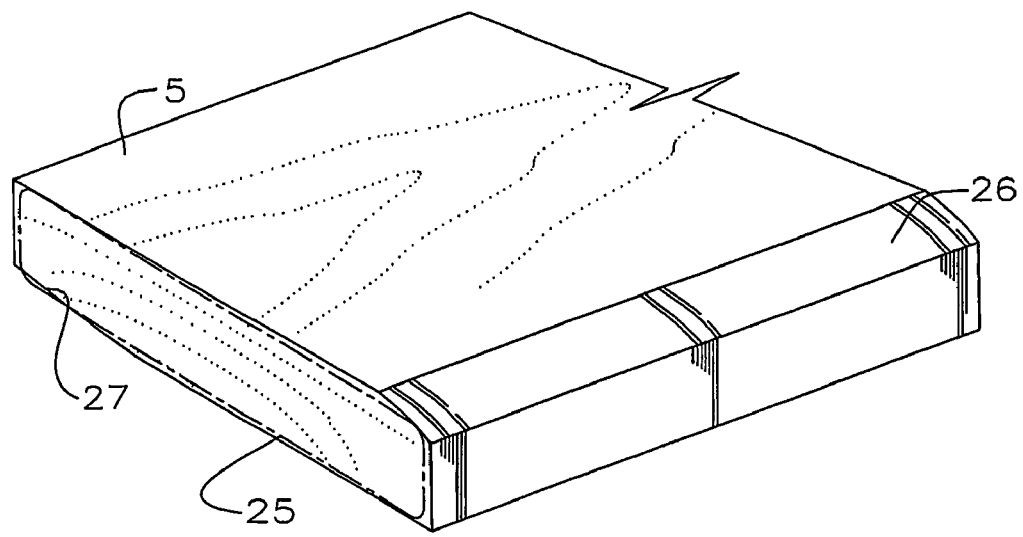
FIG. 35 is, in perspective view, the rough workpiece of FIG. 34.
Figure 36:
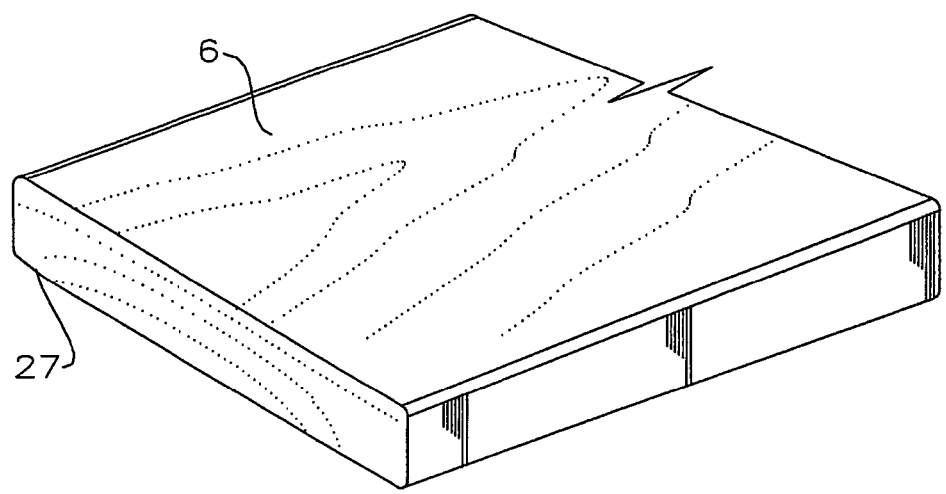
FIG. 36 is, in perspective view, the finished workpiece following optimized planing of the rough workpiece of FIG. 35.

FIGS. 34 through 36 depict the planing of the same rough workpiece using an optimized planer where the piece's geometric and defect profile is known prior to planing. In this example the best quality finished workpiece is most optimally obtained by slightly rotating the desired cross-sectional profile within the piece being planed. This operation best utilizes the available wood present in the workpiece while avoiding its shape defects. The resulting finished workpiece, shown in FIG. 36, has no wane defect and only a small wedge defect.

To produce the most optimized finished workpiece the planer will preferably need to adjust the location of the desired cross-sectional profile both workpiece-to-workpiece and within a single workpiece. To achieve optimized planing, the location of the desired cross-sectional profile, moving through the X axis, may move in any of the following ways relative to the workpiece being planed (refer to FIG. 31 for orientation of coordinates):

up-and-down linear movements (Z axis)
side-to-side linear movements (Y axis)
twisting movements, or rotating about the center of the workpiece (X axis rotation)

Again these movements may happen once (if needed) for each individual workpiece or more that once through the planing operation within a given workpiece.

FIGS. 37a through 37d show a rough workpiece with wane defects located mostly on opposite edges at opposite ends of the piece. The outline of the intended finished workpiece shows how it is best positioned within the rough workpiece to most optimally plane a finished piece. Note that both side-to-side (Y axis) and up-and-down (Z axis) movements are required through the piece (moving in the X axis).

As the process control system repositions the location of the desired cross-sectional profile within the workpiece it will have constraints to balance the amount of self-produced defects (such as twist, bow, snipe, etc.) with improvements made to surface and edge quality so that the finished workpiece stays most optimally within standard grading tolerances while obtaining the highest value possible. Feedback from the grading scanner may be especially helpful in this regard.

The process control system may optionally make gross profile changes to trim or split a given workpiece that is determined to be a good candidate for such modified treatment. This usually occurs when the modified treatment will create a higher value finished product from a particular rough workpiece. The process control system will initiate the introduction of cutting equipment to make this desired cut on individual or multiple workpieces. For example, the process control system can direct cutting components of the planer to either (1) cut off a portion of the workpiece before the side heads thus permitting the side heads to plane the piece into a smaller nominal size or (2) split the workpiece into two usable pieces with a cutter located after the side heads. For example, while planing a 2×8 piece of lumber the existence of a knot near or along an edge in the rough piece is detected by a color variation monitor. This defect information may then be used to modify the optimized planing solution so that after planing the knot in the finished workpiece is not located near the edge of the workpiece. Optionally the planer could be instructed to remove a nominal two inches from one side and produce a 2×6 instead of a 2×8 thereby eliminating the knot completely.

Optimized Planer Apparatus:

FIGS. 38 through 44 show various optimized planer configurations that use geometric and defect profile data to optimally position the desired cross-sectional profile while planing each individual rough workpiece. Planers can be of three general classifications, designs with movable workpiece positioning or guiding module(s), designs with movable cutting elements, and systems that use a combination of movable workpiece positioning or guiding modules and movable cutting elements.

The terms "movable", "guiding", "repositioning", and "positioning" are terms used to describe planer components that are controlled in response to geometric profile or defect data of each individual incoming workpiece. "Fixed" and "stationary" are terms used to describe components that may be adjustable but would typically move only while the machine is not in operation and would not be controlled in response to upstream profile or defect data.

An optimized planer may be constructed of traditional design where the top and bottom heads are positioned horizontally or an alternative design where the main planer heads are positioned other than horizontal including vertical. Planers designed with the main planer heads not aligned horizontally may seek to provide better infeed workpiece positioning compared to traditionally designed planers. Gravity could assist in keeping a workpiece aligned against the infeed guides. For simplicity all designs are shown constructed with the main planer heads oriented horizontally.

FIGS. 38a and 38b show a preferred embodiment of an optimized planer where the cutting elements are held stationary. Work piece optimization is obtained by guiding each individual workpiece through two separate stationary planer head stations.

First the workpiece is guided through the top and bottom heads by a multiple axis infeed positioning module. This infeed module has three axes of control to properly guide the workpiece through the stationary heads. This includes:
- up-and-down (Z axis linear movement via simultaneous actuation of all four linear positioners),
- pitch (Y axis rotation via movement of the two linear positioners on the module's entrance differently from movement of the two linear positioners on the module's exit.), and
- twist (X axis rotation via movement of the linear positioners on one side differently from any movement of the linear positioners on the other side).

The second cutting station, the intermediate feed module with side steering anvils and the inside and outside planer heads, requires only Y axis movement to guide the workpiece through the stationary planer heads.

The optimized planer shown in FIGS. 38a and 38b may alternatively have an infeed positioning module with fewer axes of control. The infeed module may have any one or a combination of Z-axis linear movement, X axis rotation, and/or Y-axis rotation.

FIGS. 39a and 39b show a variation similar to that shown in FIGS. 38a and 38b. This design uses a multiple axis infeed positioning module where the intermediate feed module uses steering anvils that run nearly parallel to the workpiece to provide a better guiding edge as opposed to the pivoting steering anvils of FIG. 38.

Figure 41:
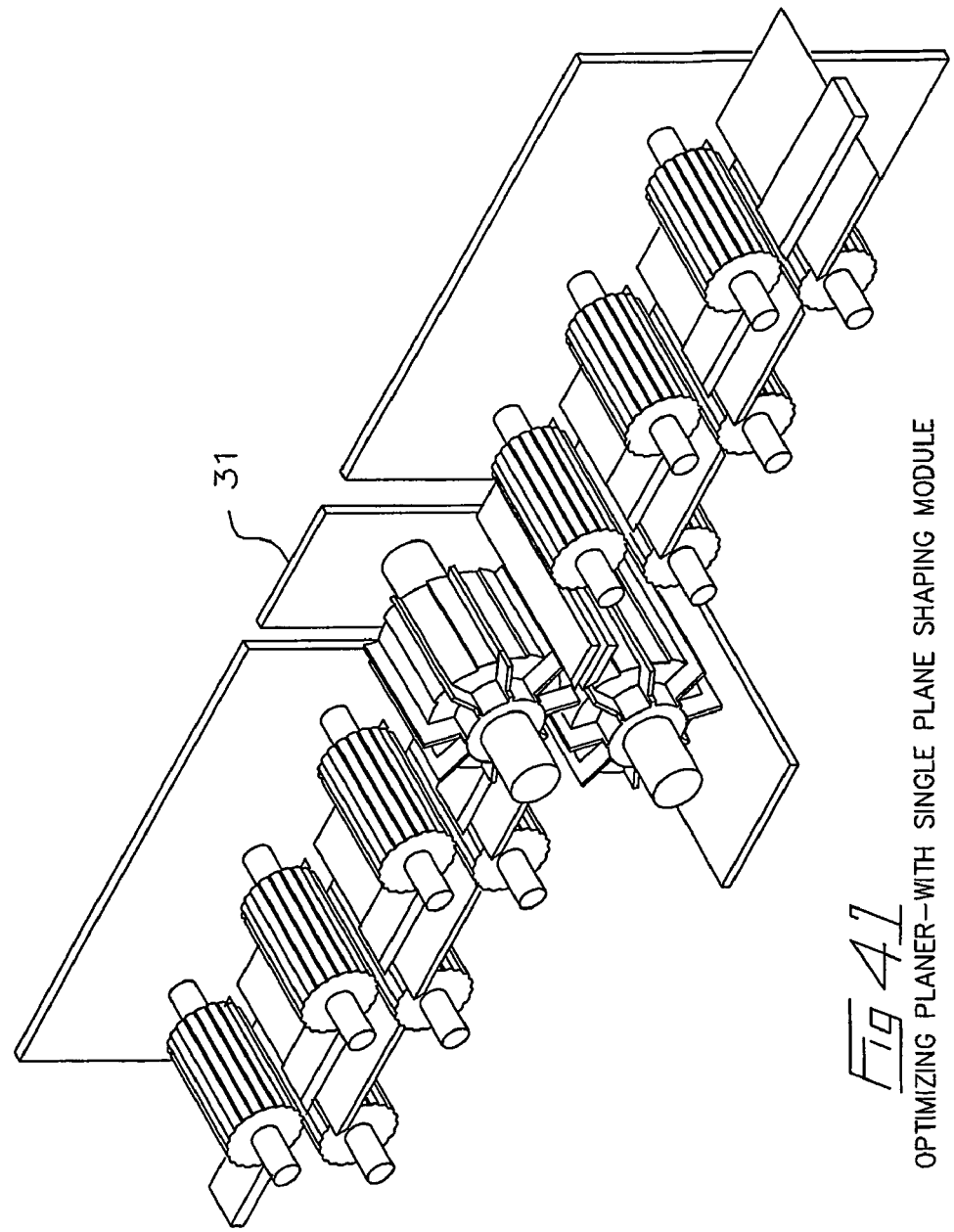
FIG. 41 is, in perspective view, the embodiment of the optimizing planer according to the present invention having a single plane shaping module.

FIGS. 40a, 40b and 41 show an alternative embodiment of an optimized planer where the infeed and outfeed guide and feed roll modules are held stationary during operation. Work piece optimization is obtained in this case by moving the cutting elements, pressure bar and tail plate as the workpiece moves through the planer. Up to six axes of control can be used to most optimally produce the desired finished workpiece. This includes control of:
- forward and backwards (X axis movement),
- side-to-side (Y axis linear movement),
- up-and-down (Z axis linear movement),
- twist (X axis rotation),
- pitch (Y axis rotation) and
- skew (Z axis rotation).

This embodiment uses top and bottom planer heads with integrated side cutters. These combination heads require a linkage system to provide for their timed movements so that the side cutting elements do not interfere with each other. This design profiles a workpiece in approximately a single plane. This design has the benefits of a more compact design with simpler controls.

FIGS. 42a and 42b show an embodiment similar to FIGS. 40a and 40b but in which the modules 31 and 41 have been combined into a single plane workpiece shaping module with attached outfeed components (multiple axis).

FIGS. 43 and 44 show an alternative embodiment of an optimized planer similar to that as shown in FIGS. 40 through 42 where the infeed and outfeed guides and feed rolls are again held stationary during operation but the top and bottom cutting elements are offset. This design provides better workpiece support during planing by the top and bottom heads. This design would not need a mechanism to time the two heads with each other.

FIGS. 45a and 45b show an alternative embodiment of an optimized planer that is similar to the preferred embodiment as shown in FIG. 7 where the cutting elements are held stationary during operation. This design differs in that the infeed positioning module is controlled by actuators that provide up to six axes of control. This includes control of:
- forward and backwards (X axis movement),
- side-to-side (Y axis linear movement),
- up-and-down (Z axis linear movement).
- twist (X axis rotation),
- pitch (Y axis rotation) and
- skew (Z axis rotation).

These additional degrees of control may help to provide more optimum workpiece orientation with cutting and outfeed components.

FIGS. 46a and 46b show an alternative embodiment of an optimized planer that is similar to the embodiment as shown in FIGS. 45a and 45b. Again up to six axes of control are used with stationary cutting elements. This design differs in that the side cutting heads are located just after the top and bottom heads. The workpiece is positioned in the Y-axis by the infeed positioning module rather than the intermediate positioning module with side head steering anvils. Again an infeed positioning module is used with up to six axes of control.

Figure 47A:
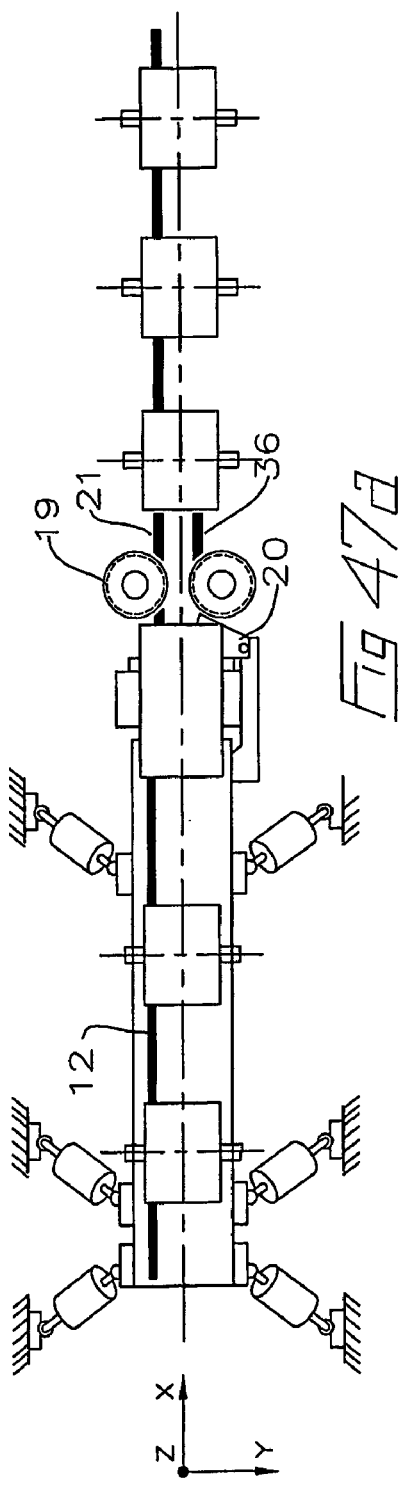
FIG. 47a is, in side elevation view, a further embodiment of the optimizing planer according to the present invention having a six axis infeed positioning module with inline top and bottom heads.
Figure 47B:
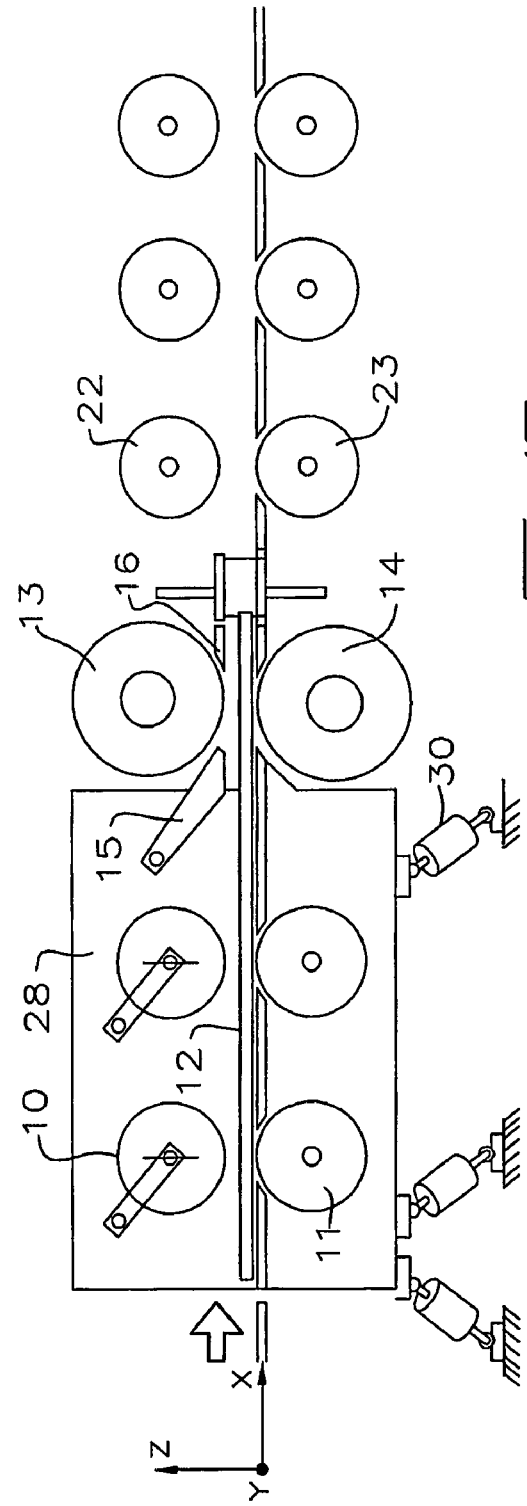

FIGS. 47a and 47b show an alternative embodiment of an optimized planer that is similar to the embodiment as shown in FIGS. 46a and 46b. Again up to six axes of control are used with stationary cutting elements. This design differs in that the top planer head is located directly above the bottom planer head.

An alternative embodiment of an optimized planer (not shown) is possible similar to the embodiment shown in FIGS. 47a and 47b where an infeed positioning module is used with stationary planer heads except that the workpiece is shaped in approximately a single plane with combination top/side and bottom/side planer heads as shown in FIGS. 40 through 44.

Figure 48A:
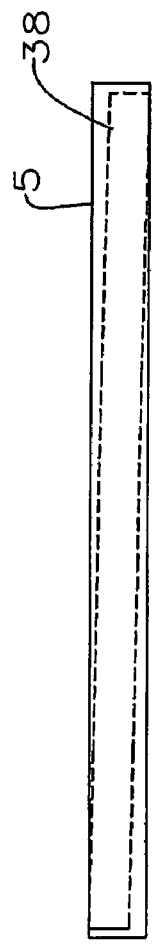
FIG. 48a is, in plan view, the rough workpiece of FIG. 48.
Figure 48:
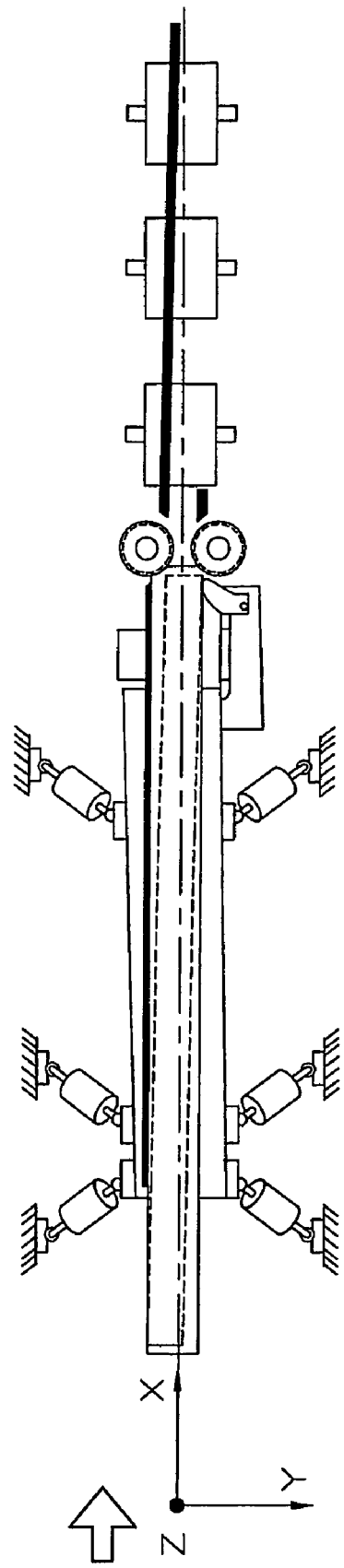
FIG. 48 is, in plan view, an optimizing planer according to one embodiment of the present invention illustrating one infeed embodiment.
Figure 49A:
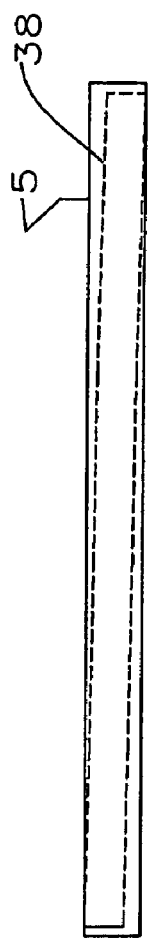
FIG. 49a is, in plan view, the rough workpiece of FIG. 49.
Figure 49:
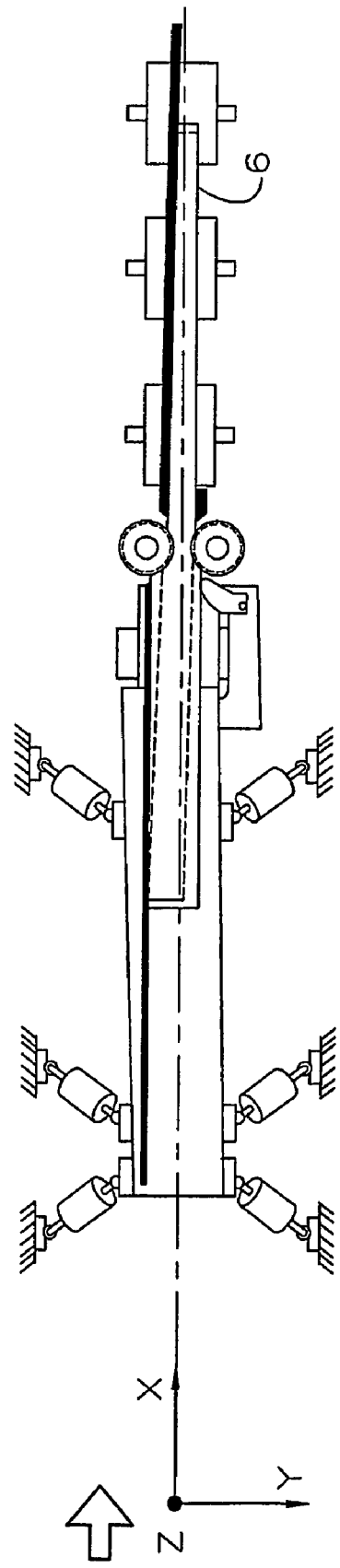
FIG. 49 is, plan view, the optimized planer of FIG. 48.

FIGS. 48 through 51 show an example of a single workpiece moving through an optimized planer with a six axis infeed positioning module and stationary cutting elements. FIGS. 48a and 49a show the top view of the optimized planing operation. The rough workpiece is shown with the intended finished piece outlined with a dashed line. In this example, the infeed positioning module rotates (about the Z axis) and translates (Y axis linear) to line up the edge of the intended finished piece with the tail guide located in the outfeed section. As the workpiece moves through the planer the infeed positioning module continues to rotate and translate to maintain the lineup of the edge of the intended finished workpiece with the tail guide. FIGS. 50a and 51a show the side view of the same workpiece as it moves through the same optimized planer. The infeed positioning module rotates (about the Y axis) and translates (Z axis linear) to line up the bottom edge of the intended finished piece with the tail plate and outfeed rolls (FIG. 50a). Again, as the workpiece moves through the planer the infeed positioning module continues to rotate and translate to maintain the lineup of the bottom edge of the intended finished workpiece with the outfeed components (FIG. 51a).

FIGS. 52a and 52b show an alternative embodiment of an optimized planer where the cutting elements and the outfeed components are moved together in a single module with up to six axes of control. Side steering anvils are used to control the workpiece into the side heads.

FIGS. 53a and 53b show an alternative embodiment of an optimized planer similar to the embodiment shown in FIGS. 52a and 52b except the location of the side heads is moved to just after the top and bottom heads. Independently actuated steeling anvils are not used in this case.

Figure 54:
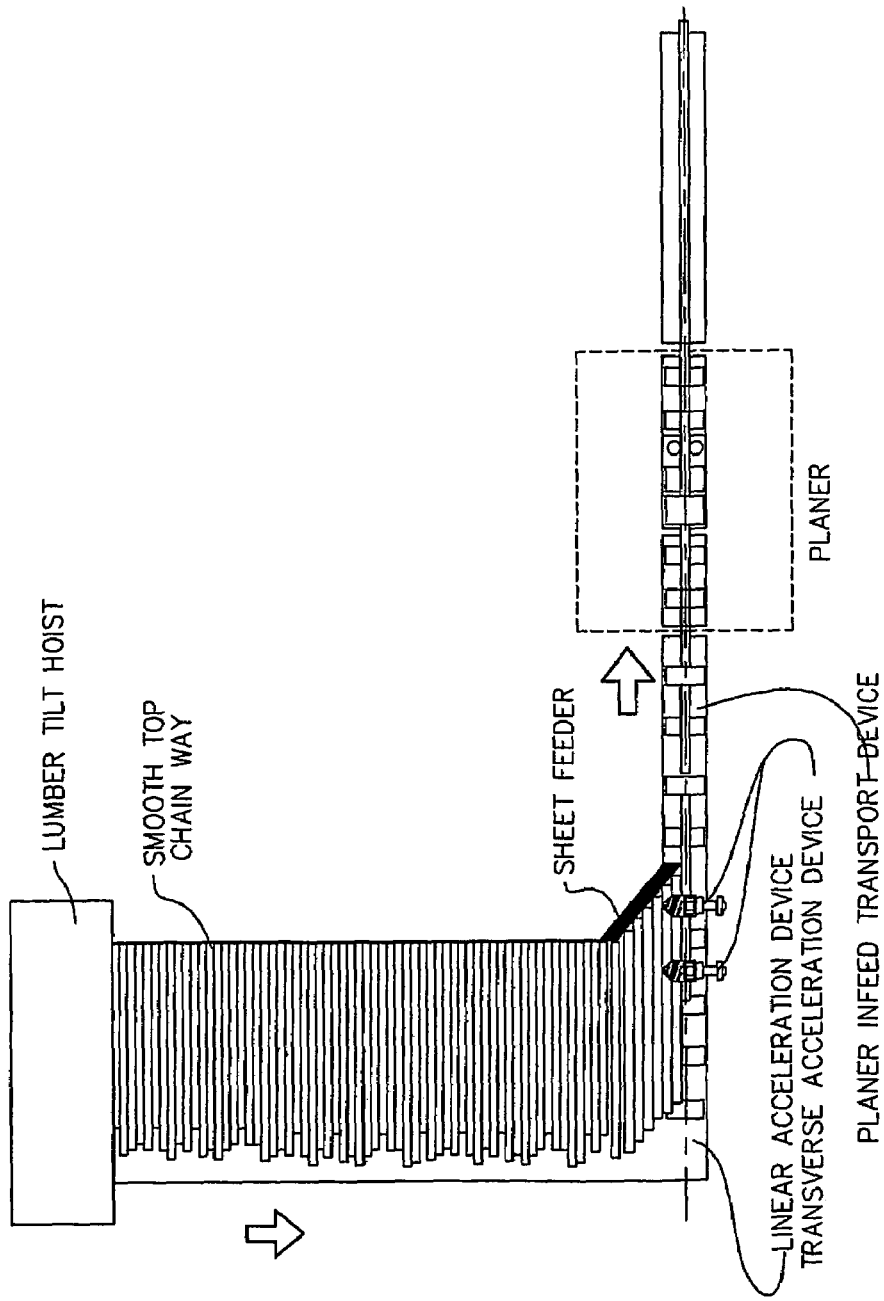
Figure 62A:
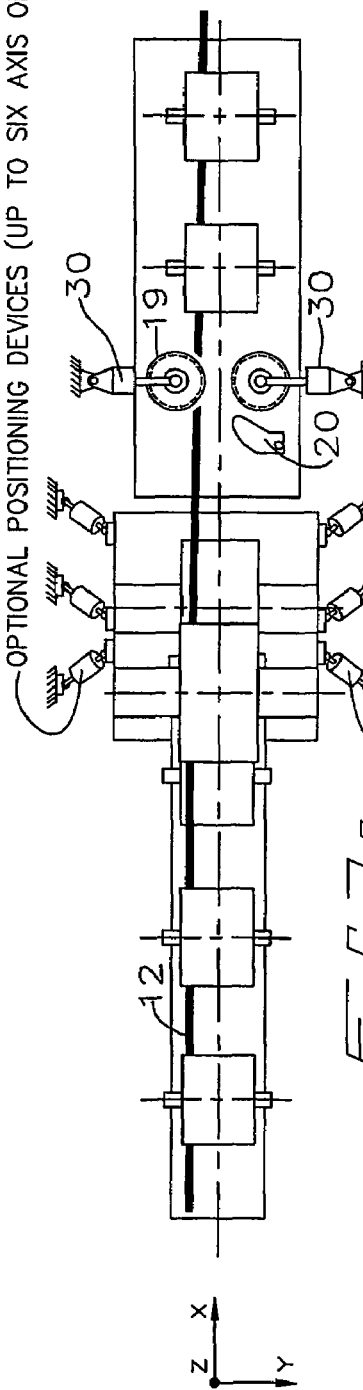
FIG. 62a is, in side elevation view, a further embodiment of the optimizing planer according to the present invention having movable cutting elements and offset main planer heads.
Figure 62B:
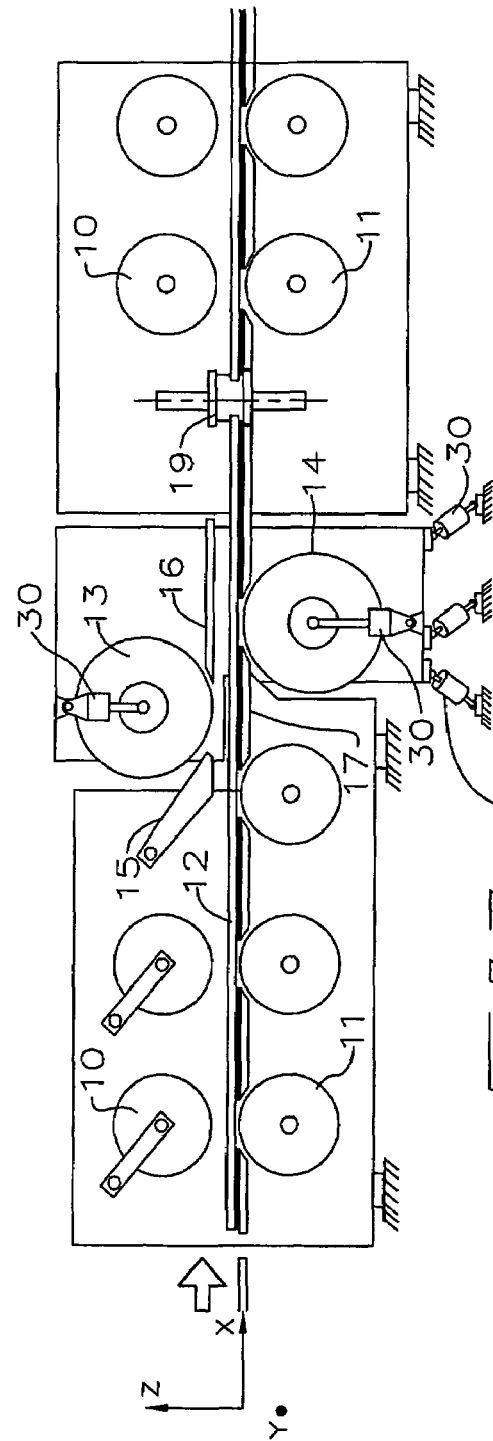

FIGS. 54a and 54b show an alternative embodiment of an optimized planer similar to the embodiment shown in FIGS. 53a and 53b except the top and bottom heads are positioned inline.

FIGS. 55a and 55b show an alternative embodiment of an optimized planer similar to the embodiment shown in FIGS. 54a and 54b except the infeed module is also moved with up to six degrees of control.

FIGS. 56a and 56b show an alternative embodiment of an optimized planer similar to the embodiment shown in FIGS. 55a and 55b except the cutting elements are held stationary.

An additional embodiment is also possible (not shown) similar to the embodiment shown in FIGS. 56a and 56b except that only a portion of the cutting elements are stationary.

Figure 57:
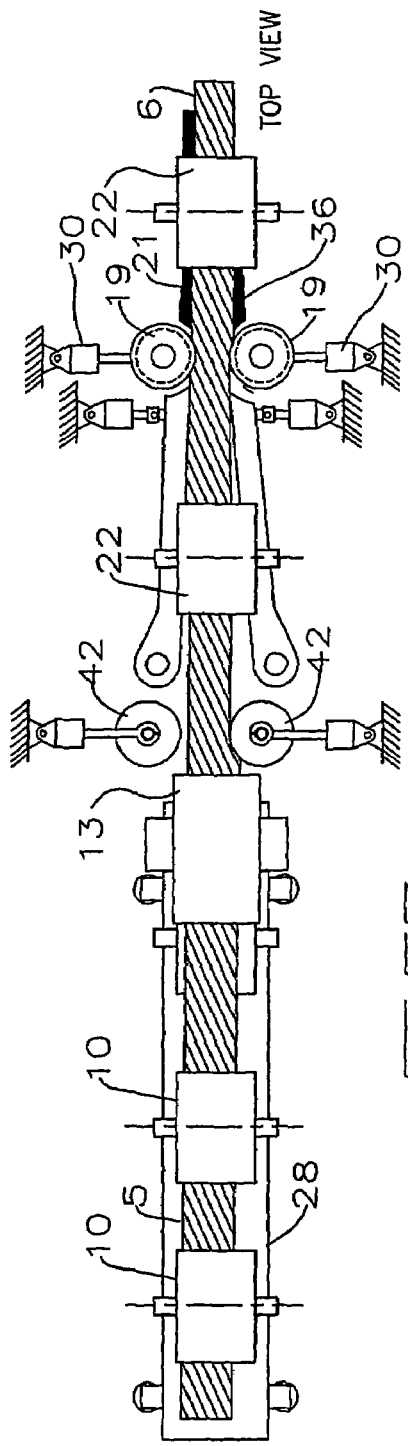
FIG. 57 is, in plan view, a further embodiment of the optimizing planer according to the present invention having upstream side pre-cut so as to reduce a workpiece to a smaller nominal size.
Figure 58:
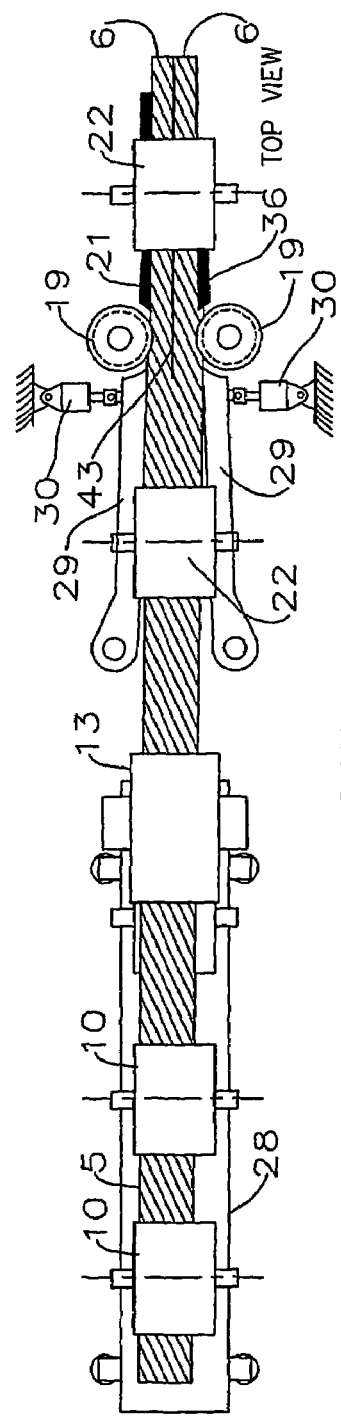
FIG. 58 is, in plan view, a further embodiment of the optimizing planer according to the present invention having interior profiling so as to split a workpiece into two pieces.

FIGS. 57 and 58 show alternative embodiments of an optimized planer similar to the preferred embodiment shown in FIGS. 38a and 38b except these designs allow gross size changes to be made to selective workpieces being processed. These gross size changes are typically made for the purpose of extracting the highest value finished piece or pieces from each incoming rough workpiece.

FIG. 57 shows an alternative embodiment where side chipper heads are selectively used after the top and bottom planer heads to make significant size reductions to specific workpieces before they are fed into the side planer head portion of the machine. For example, an individual rough 2×8 piece of lumber that was predicted to produce a low grade finished product could be converted into a high grade 2×6 if this would result in the highest achievable value for that particular piece. The narrower piece would then get directed out of the main flow of finished workpieces.

FIG. 58 shows an alternative embodiment where an internal cutter, such as one or more circular saw blades, is selectively positioned at the interior of a given workpiece for the purpose of splitting the piece into two pieces. The intent may be to produce two usable finished workpieces or one usable and one discardable workpiece from a selected rough workpiece. For example, producing two 2×4 s may be the most optimized way to process a given 2×8. Two cutters or saw blades may be used where one is positioned from above and the other is positioned from below the workpiece in order to permit certain profile geometries.

Variable Speed Planer for Throughput Optimization

Just as with the planer infeed transport device the line speed of the planer itself may respond to the control system in such a way as to optimize overall planermill profitability by balancing line speed increases through the planer with information contained within the control system regarding how quality and yield are effected as the planer throughput and feed speed are changed.

Optimized Trimmer

The trimmer within an optimized planermill uses the packet of information assigned to each workpiece containing the instructions for optimally trimming each piece. This information will control how each piece is aligned within the trimmer fence section and where each cut is made within the trimmer. Several cuts may be required to most optimally process each piece.

Final Assignment of Grade

As discussed previously the optimization system computer preferably assigns the final grade of each workpiece prior to planing. However, in certain situations it may be beneficial to update or modify this grade assignment associated with each workpiece with additional information contained within the process control system such as:

the actual location of the guiding and cutting elements in relation to the workpiece during the planing and/or trimming operations as sensed by feedback sensors within the planing and trimming devices, Process information concerning other measurable parameters throughout the planermill that may play a part in final grade selection, including for example, motor current levels on cutter heads and feed rolls and information concerning machine upsets or jam-ups, any physical property data that may be available from post-planer workpiece interrogators that may aid in final grade determination and any grade overrides that may need to be made by grading personnel.

Optimized Grade Marking System

The grade marking system within an optimized planermill uses the packet of information assigned to each workpiece to properly mark and identify each piece. The grade marking system will mark each workpiece with the final grade assignment plus any additional information available within the process control system as desired. This additional information may or may not be specific to each individual workpiece.

One can imagine an optimized grade marking systems that may optionally mark each workpiece with a unique tracking code or serial number. This tracking code may be used to correlate downstream product performance with the process conditions present throughout the manufacturing process. The presence of a unique tracking code on each workpiece could provide vital information for process improvement, for example, if defective workpieces are returned from customers their tracking codes could provide a way to match the unique set of process conditions or data present at the time of production with each individual workpiece. These process conditions or data could include for example:

any information contained within the data packet specific to each workpiece including data from workpiece interrogators, digital images, time stamp information, etc. and information concerning process conditions at the time of production such as, time since last tool change, name of machine operator, line speed, cutting element speed, etc.

One can imagine the increased use of workpiece tracking as described here with the future advancement of processing speeds and data storage capacities of computer systems.

Sorting System

The sorting system within an optimized planermill again uses the packet of information assigned to each workpiece to sort each workpiece according to size, grade and length.

Conversion from a Conventional Planermill System to an Optimized Planermill System Planer Infeed Retrofitting Another aspect of this invention is the recognition that not all existing sawmills and/or planermills will be able to install and operate an optimized planermill system because of one or more of the following reasons:

1. There is not enough space in and around the existing planer system to allow the installation of an optimized planer system, 2. Major foundation modification and/or additional piling has to be driven in an inaccessible location,
3. The cost of modifying the existing site and installing all new planermill equipment is too expensive,
4. The volume produced by the planermill is not large enough to justify the installation of an all new optimized planer system.

Being able to modify the existing non-optimized planer system and converting it into an optimized planer system can potentially save hundreds of thousands of dollars over installing a new optimized planer system. There are many combinations of the components that make up an optimized planer system. Depending on the configuration of the existing non-optimized planer system, the most cost effective and efficient way to convert the system to an optimized system can be determined. Most non-optimized planer systems currently consist of the following devices (see FIG. 59), a tilt hoist feeding sheets of workpieces onto a smooth transfer deck which sheet feeds the workpieces onto a linear acceleration device. The linear acceleration device accelerates the workpieces towards the planer. A short planer infeed transport device is usually located between the linear acceleration device and the planer. The speed of all of these component devices would be fixed speed and are controlled manually. In this example, the fixed speed linear acceleration device is set to run faster than the fixed speed planer infeed transport device and the planer. Setting the system up this way causes the workpieces to be fed end-to-end with no gap.

The non-optimized planer system as shown in FIG. 59 can be converted to a fully optimized planer system using any one of the three methods of gap control, (1) open loop non-optimized, (2) closed loop non-optimized, and (3) closed loop optimized, depending on how the component devices are modified, what other devices are added to the system and the level of workpiece sensing, computerized optimization and process control. The most desirable reconfiguration of the non-optimized planer system might be the following configuration. In this example, the non-optimized planer system has been converted to a fully optimized planer system with closed loop optimized gap control. The conversion process involves the following modifications and additions to the non-optimized system: A short section of the smooth transfer deck is removed to allow the installation of a lug loader. The section of smooth transfer between the lug loader and the linear acceleration device is converted to a lug transfer by either adding lugs to the existing smooth top chain or replacing the chain with one that has lugs already attached. A variable speed drive is added to the smooth transfer deck and a separate variable speed drive is added to the lug transfer. A transverse workpiece interrogator is placed along the lug transfer. The individual rollers or groups of rollers in the linear acceleration device, planer infeed transport device and planer are fitted with variable speed drives. Work piece sensing devices are added to the system on and around the area where the lug transfer delivers the workpieces to the linear acceleration device, along the length of the linear acceleration device and planer infeed transport device and in and around the area of the planer. The necessary modifications are done to the planer machine in order to make the guiding and/or cutting elements movable and able to reposition between workpieces including adding high speed positioning devices to all necessary planer elements. The necessary computerized process controls along with the workpiece optimization and gap optimization systems are added to control the now fully optimized planer system. There are numerous other combinations of modifying or adding devices to this system to convert it to an optimized system. If, for example, non-optimized gap control was desirable then the workpiece sensing and variable speed drives could be eliminated from the converted system. In any non-optimized planer system, it will be necessary if it is to be converted to optimized, to modify existing system devices and/or add new devices in order to establish and/or control and/or correct the minimum required gap between workpieces.

Another example of converting a non-optimized planer system to an optimized planer system may be as shown in FIG. 60 and FIG. 61. The planer system shown in FIG. 60 is a non-optimized system that happens to have a very long planer infeed transport device. All of the speeds of the devices in this system are fixed speed and are set to feed the workpieces basically end-to-end with no gap between workpieces. FIG. 61 shows the system of FIG. 60 converted to an optimized planer system. In this example, there have been no modifications to the tilt hoist or the smooth transfer deck. However, the linear acceleration device along with the planer infeed transport device and planer have been fitted with variable speed drives. Individual rollers or groups of rollers have independent variable speed drives controlling their speed. A linear workpiece interrogator has been added to the system near the midpoint of the planer infeed transport device. Work piece sensing has been added to the system from the linear acceleration device to and through the planer. The necessary planer modifications have been made to allow the moving or relocation of the guiding and/or cutting elements within the planer between workpieces. A computerized optimization system along with a computerized process control system are added to provide the workpiece optimized planer solutions and generally control the flow of workpieces going through the system including establishing and/or controlling and/or correcting the minimum required gap between workpieces.

Planer Retrofitting

FIG. 63 shows an alternative embodiment where the planer infeed and outfeed rollers are stationary and only the cutting elements and the guiding elements behind the cutting elements are movable. Controlling the movements of only the cutting elements and the guiding elements behind the cutting elements lends itself to possibly converting an existing non-optimized planer into an optimized planer. In order to convert a non-optimized planer into an optimized planer it may be necessary to modify the cutting element and guiding element adjustment and/or positioning system. It may be necessary to remove the existing top, bottom and side cutting elements, guiding elements, positioning or adjusting system and slide ways and replace them with high speed linear positioners and precision guided low friction slide ways. Some examples of high speed linear positioners might include hydraulic linear actuators, ball screw actuators driven by any number of drive methods including, stepper motors, AC vector drives, DC drives, servo motors, hydraulic motors, or AC motors. An example of precision guided low friction slide ways may include Thompson linear bearings, Thompson roll way bearings, or possibly THK linear bearings and track as is commonly used for slide ways on CNC machine tools. The guiding elements behind the cutting elements may be attached to and move with the cutting element assembly that is associated with, or it may be possible that the guiding elements could have their own high speed linear positioners and precision low friction slide ways. In some instances it may be more cost effective to modify and convert an existing non-optimized planer to an optimized planer than to replace the entire planer with a new optimized planer.

An additional alternative embodiment of the optimized planer that also lends itself as a possible conversion from a non-optimized planer is one where the inside guide (straight edge leading up to the side heads) is the exclusive movable optimized device.

An additional alternative embodiment of the optimized planer that also lends itself as a possible conversion from a non-optimized planer is one where the bed plate, and possibly the chip breaker above, is the exclusive movable optimized devices.

There may be many benefits to converting a non-optimized planer to an optimized planer. Some examples may include, the cost to convert an existing planer may be hundreds of thousands of dollars less than the cost of a new optimized planer, the downtime and loss of production associated with removing one planer and replacing it with an optimized planer will be greater than the downtime and loss of production associated with converting the non-optimized planer to an optimized planer. The overall cost of installing a new planer will be higher than the installation cost of a planer conversion.

The steps taken to convert a non-optimized planer into an optimized planer will depend on the actual configuration of the planer to be converted. Some older planers will require replacement of large amounts of component parts while newer fabricated planers like the Coastal™ or USNR™ planers will require much less modification to convert them to optimized planers. In general, however, all non-optimized planers will at minimum need modifications to their positioning devices controlling the cutting and/or guiding elements.

Modification and variation can be made to the disclosed embodiments without departing from the subject of the invention.

Any and all patents, applications, and printed publications referred to above are incorporated by reference.

As used herein, the following list of reference numerals, and the corresponding elements, denote corresponding elements in some of the views forming part of this specification:

1. Conventional planer
2. Optimizing planer
3. Planer infeed conveyor
4. Outfeed table conveyor
5. Rough workpiece
6. Finished workpiece
7. Grading scanner
8. Linear geometric scanner
9. Transverse geometric scanner
10. Top feed rolls
11. Bottom feed rolls
12. Inside guide
13. Top planer head
14. Bottom planer head
15. Top chip breaker
16. Pressure bar
17. Bed plate
18. Tail plate
19. Inside and outside planer heads
20. Side chip breaker
21. Tail guide
22. Top outfeed rolls
23. Bottom outfeed rolls
24. Control system
25. Desired cross-sectional profile (within the workpiece)
26. Wane defect
27. Wedge defect
28. Multiple axis infeed positioning module
29. Intermediate feed module with side head steering anvils
30. Linear positioner
31. Single plane workpiece shaping module (multiple axis)
32. Outfeed module (multiple axis)
33. Offset workpiece shaping module (multiple axis)
34. Combination top/side head
35. Combination bottom/side head
36. Side head guide
37. Single plane workpiece shaping module with attached outfeed components (multiple axis)
38. Desired outline of the finished workpiece (end-to-end)
39. Offset workpiece shaping module with attached outfeed components (multiple axis)
40. Infeed guide and feed roll module
41. Outfeed guide and feed roll module
42. Side chipper heads
43. Internal cutter As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An optimizing planermill system comprising:
    a) a control system;
    b) a workpiece feed path for feeding an array of workpieces downstream to an optimizing planer, wherein the optimizing planer comprises at least one of movable cutting elements and movable guiding elements;
    c) means, operably coupled to the workpiece feed path, for setting the size of gaps between successive workpieces in the array of workpieces being fed into the planer, such that each gap provides enough time for relative movement of the at least one of the movable cutting elements in the planer and the movable guiding elements so as to obtain optimized positioning corresponding to the workpiece being next fed into the planer;
    d) the optimizing planer operably coupled to the control system, and further having an entrance, for receipt of a rough workpiece, and an exit, for discharge of an at least partially finished workpiece;
    e) a workpiece interrogator situated along the workpiece feed path upstream of the optimizing planar entrance and operably coupled to the control system so as to provide the control system with workpiece property information for each workpiece entering the optimizing planer;
    wherein the control system provides the optimizing planer with control information based upon the workpiece property information for each workpiece; and
    wherein the optimizing planer moves at least one of the movable guiding elements and the movable cutting elements as the workpiece passes through the optimizing planer according to the control information for each workpiece.

2. The system of claim 1 wherein said each gap is optimized individually so that said enough time for relative movement of at least one of the movable cutting elements in the planer and the movable guiding elements is only enough time for the individual optimization of the next successive workpiece in the array of workpieces.

3. The system of claim 1 wherein said means for setting the size of gaps includes means for accelerating the workpiece along, and cooperating with, said workpiece feed path so as to control said size of gaps.

4. The system of claim 3 wherein said workpiece feed path includes workpiece transportation means for transporting the workpiece downstream from said means for accelerating the workpiece to the planer.

5. The system of claim 4 further comprising:
   a) workpiece interrogation means for interrogating the workpiece to determine workpiece data corresponding to attributes of the workpiece; and
   b) a workpiece optimization system that receives workpiece data corresponding to attributes of the workpiece from said workpiece interrogation means, determines an optimized cutting solution for the workpiece, and sends control instructions to said means for accelerating the workpiece.

6. The system of claim 3 wherein said means for accelerating the workpiece includes one or more of a fixed speed transverse acceleration device, a variable speed transverse acceleration device, a vertical acceleration device, a fixed speed linear acceleration device, and a variable speed linear acceleration device.

7. The system of claim 5 wherein said workpiece interrogation means includes one or more of a linear workpiece interrogator and a transverse workpiece interrogator.

8. The system of claim 4 wherein said workpiece transportation means includes one or more of a fixed speed intermediate transport device, and a variable speed intermediate transport device.

9. The system of claim 3 wherein said workpiece feed path means includes one or more of a sheet feeder, a fixed speed lug transfer and a variable speed lug transfer.

10. The system of claim 1 further comprising a trimmer, wherein said size of gaps includes wood to be trimmed downstream in the trimmer according to an optimized trim solution.

11. The system of claim 1 further comprising:
    a) workpiece sensing means to sense one or more of the position, velocity and acceleration of a workpiece in the array of workpieces upstream of the planer; and
    b) means for the control system to receive data from said workpiece sensing means and using said data from said workpiece sensing means, to control said size of gaps to establish, control and/or to correct a minimum required gap between each successive workpiece of the array of workpieces.

12. The system of claim 5 wherein said control system and said workpiece optimization system are combined into a singular gap optimization system.

13. The system of claim 1 further comprising means for determining in-piece gap-reduction for a successive series of workpieces in the array of workpieces wherein said means for setting the size of gaps between successive workpieces cooperates with said means for determining in-piece gap-reduction so as to reduce said size of gaps where an optimized planning solution for a downstream workpiece in said successive series of workpieces provides for in-piece setting of the cutting elements within said downstream workpiece so as to pre-position the cutting elements for commencing an optimized planing solution for a next adjacent upstream workpiece in said successive series of workpieces, whereby said size of gap between said downstream and upstream workpieces is a reduced size of gap.

14. The system of claim 13 wherein said reduced size of gap is reduced to substantially zero gap.

15. The system of claim 10, wherein the trimmer is contained within the optimizing planer.

16. An optimizing planermill system comprising:
    a) a workpiece feedpath, operatively coupled to an optimizing planer, for feeding an array of workpieces downstream to the optimizing planer;
    b) an optimizing planer comprising at least one of movable cutting elements and movable guiding elements;
    c) an interrogator that senses physical properties of each individual rough workpiece and collects data about one or more of the rough workpiece's physical properties;
    d) one or more workpiece sensors that sense one or more of the position, velocity and acceleration of a workpiece in the array of workpieces;
    e) an optimizer that receives data collected by the interrogator and determines an optimized planing solution for each individual workpiece;
    f) one or more workpiece acceleration devices, operatively coupled to the workpiece feedpath, for adjusting the speed of a workpiece in the array of workpieces; and
    g) a control system that receives input from the optimizer and the one or more workpiece sensors,
       wherein the control system controls the at least one of movable cutting elements and movable guiding elements of the optimizing planer, and
       wherein the control system further controls the one or more workpiece acceleration devices to establish, control and/or correct a minimum required gap between workpieces feeding into the optimizing planer.

17. The system of claim 16, wherein the minimum required gap between workpieces is set to provide enough time for relative movement of at least one of the movable cutting elements and the movable guiding elements in the planer, so as to obtain optimized positioning corresponding to the workpiece being next fed into the planer.

18. The system of claim 16, wherein the minimum required gap between workpieces is set individually so that said enough time for relative movement of at least one of the movable cutting elements and the movable guiding elements in the planer is only enough time for the individual optimization of the next successive workpiece in the array of workpieces.

19. The system of claim 15 further comprising a trimmer, wherein said minimum required gap includes wood to be trimmed downstream in the trimmer according to an optimized trim solution.

20. The system of claim 15, wherein the trimmer is contained within the optimizing planer.

* * * * *

UNITED STATES PATENT AND TRADEMARK OFFICE
CERTIFICATE OF CORRECTION

| | | |
|---|---|---|
| PATENT NO. | : 7,681,610 B2 | |
| APPLICATION NO. | : 10/552873 | |
| DATED | : March 23, 2010 | |
| INVENTOR(S) | : Ronald W. McGehee and Patrick Doyle | |

It is certified that error appears in the above-identified patent and that said Letters Patent is hereby corrected as shown below:

Column 6
Line 52, "... FIG. 13b is, in side elevation view, the devices of FIG. 13b ..." should read --... FIG. 13b is, in side elevation view, the devices of FIG. 13a ...--.

Figure 16A:
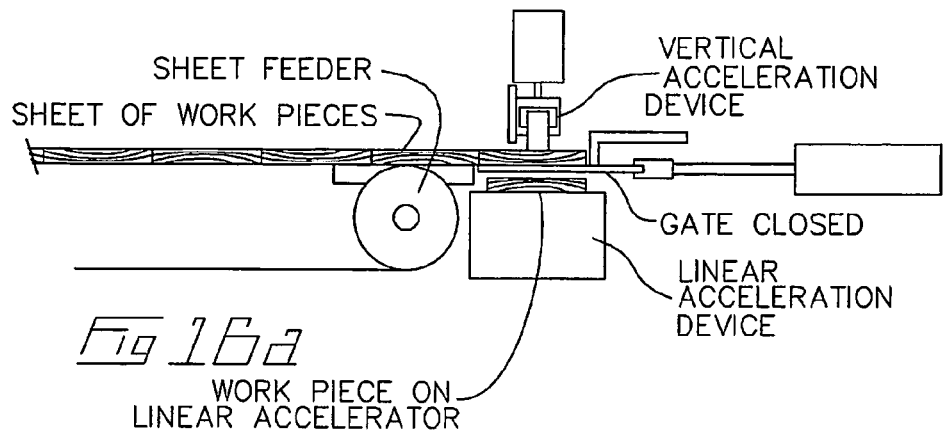
FIG. 16a is, in side elevation view, an example of a sheet fed vertical acceleration device.
Figure 16B:
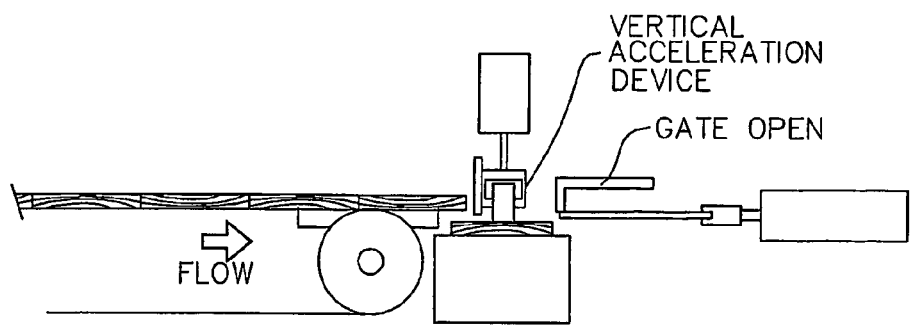
FIG. 16b is, in side elevation view, the device of FIG. 16b with the gate open.

Column 7
Line 5, "... FIG. 16b is, in side elevation view, the device of FIG, 16b ..." should read --... FIG. 16b is, in side elevation view, the device of FIG. 16a ...--.

Column 8
Line 10, "... FIG. 38b is, in plan view, the optimizing planer of FIG. 38b ..." should read --... FIG. 38b is, in plan view, the optimizing planer of FIG. 38a ...--.

Column 34
Line 45, "... the optimizing planar ..." should read -- ... the optimizing planer ...--.

Column 35
Lines 53-54, "... an optimized planning solution ..." should read --... an optimized planing solution ...--.

Signed and Sealed this
Ninth Day of August, 2011

David J. Kappos
*Director of the United States Patent and Trademark Office*